(12) United States Patent  
Kim et al.

(10) Patent No.: US 9,502,034 B2  
(45) Date of Patent: Nov. 22, 2016

(54) MOBILE TERMINAL AND CONTROLLING METHOD THEREOF

(71) Applicant: LG Electronics Inc., Seoul (KR)

(72) Inventors: Samsick Kim, Seoul (KR); Sesook Oh, Seoul (KR); Younhwa Choi, Seoul (KR); Jongin Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/708,777

(22) Filed: May 11, 2015

(65) Prior Publication Data

US 2016/0180845 A1    Jun. 23, 2016

(30) Foreign Application Priority Data

Dec. 18, 2014  (KR) .......................... 10-2014-0183563

(51) Int. Cl.
```
H04N 5/232      (2006.01)
G10L 15/22      (2006.01)
G06F 3/16       (2006.01)
H04M 1/27       (2006.01)
G06F 3/0488     (2013.01)
H04M 1/725      (2006.01)
```

(52) U.S. Cl.
CPC .......... *G10L 15/22* (2013.01); *G06F 3/04883* (2013.01); *G06F 3/167* (2013.01); *H04M 1/271* (2013.01); *H04M 1/72519* (2013.01); *H04N 5/23216* (2013.01); *H04N 5/23293* (2013.01); *G10L 2015/223* (2013.01); *H04M 2250/22* (2013.01); *H04M 2250/52* (2013.01)

(58) Field of Classification Search
CPC ............ G06F 17/30268; G10L 15/26; H04N 1/00403; H04N 1/2112; H04N 1/32117; H04N 2201/3264; H04N 5/23293
See application file for complete search history.

(56) References Cited

U.S. PATENT DOCUMENTS

| | | | |
|---|---|---|---|
| 8,634,712 B1 * | 1/2014 | Mullins .............. | H04N 21/6156 348/14.02 |
| 2005/0151850 A1 * | 7/2005 | Ahn ........................ | G06F 3/017 348/207.99 |
| 2009/0109276 A1 | 4/2009 | Kim | |
| 2010/0077292 A1 | 3/2010 | Harris | |
| 2011/0157420 A1 * | 6/2011 | Bos ........................ | G10L 15/265 348/231.2 |
| 2011/0249073 A1 * | 10/2011 | Cranfill .................. | H04N 7/147 348/14.02 |
| 2012/0081556 A1 | 4/2012 | Hwang et al. | |
| 2012/0142415 A1 * | 6/2012 | Lindsay ............... | H04N 5/2224 463/33 |
| 2012/0169828 A1 | 7/2012 | Lee | |
| 2014/0085487 A1 | 3/2014 | Park et al. | |
| 2014/0160316 A1 * | 6/2014 | Hwang ............. | G06F 17/30268 348/231.99 |

* cited by examiner

*Primary Examiner* — Amy Hsu
(74) *Attorney, Agent, or Firm* — Birch, Stewart, Kolasch & Birch, LLP

(57) ABSTRACT

A mobile terminal including a touchscreen; a camera; a memory; a wireless communication unit; and a controller configured to display a preview image input through the camera on the touchscreen, capture the preview image and execute a voice recognition function, in response to a first touch gesture performed on the touchscreen, and control the wireless communication unit to transmit the captured image to at least one counterpart terminal found through the voice recognition function in accordance with a voice input, in response to a release of the first touch gesture from the touchscreen.

19 Claims, 38 Drawing Sheets

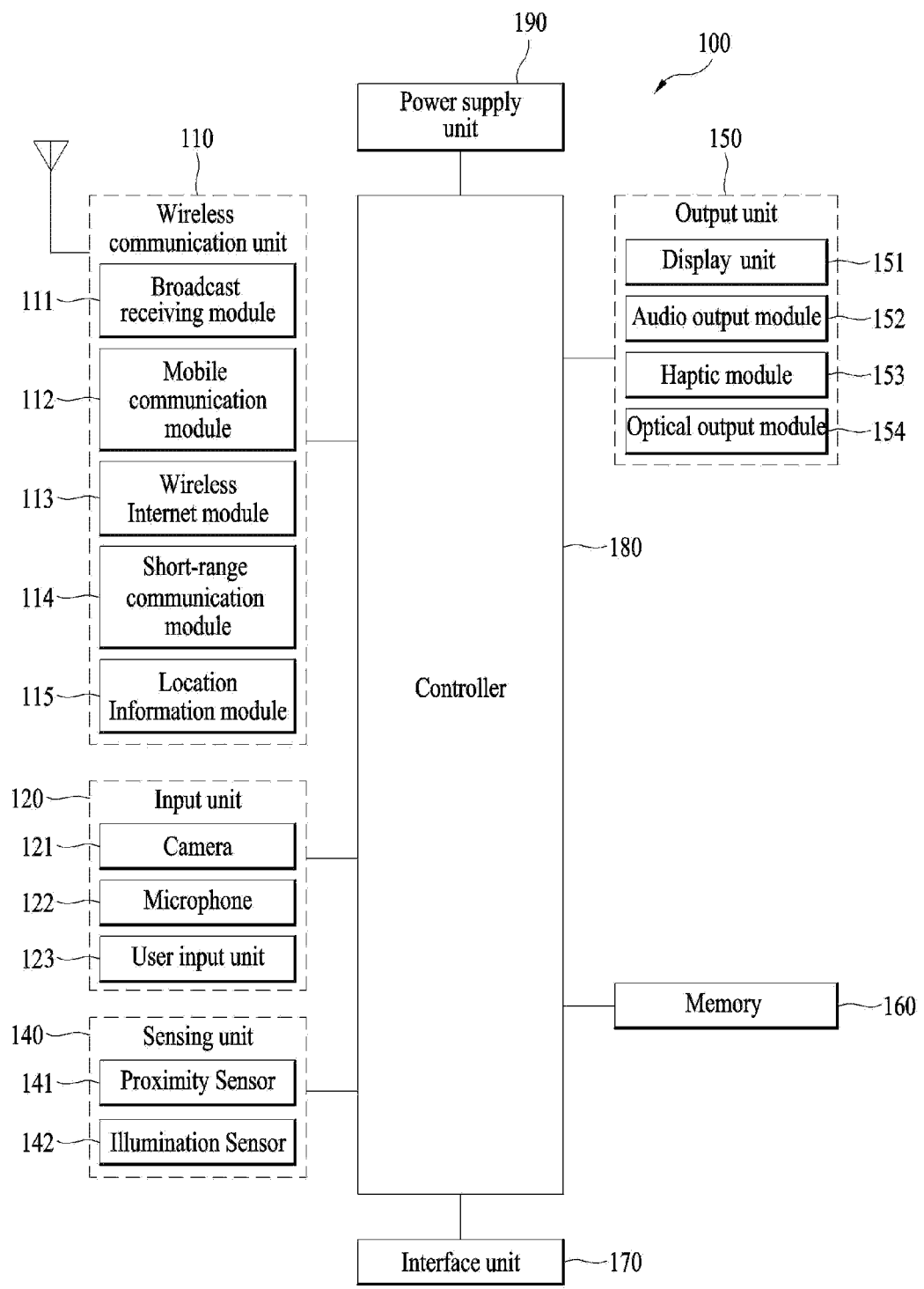

FIG. 4
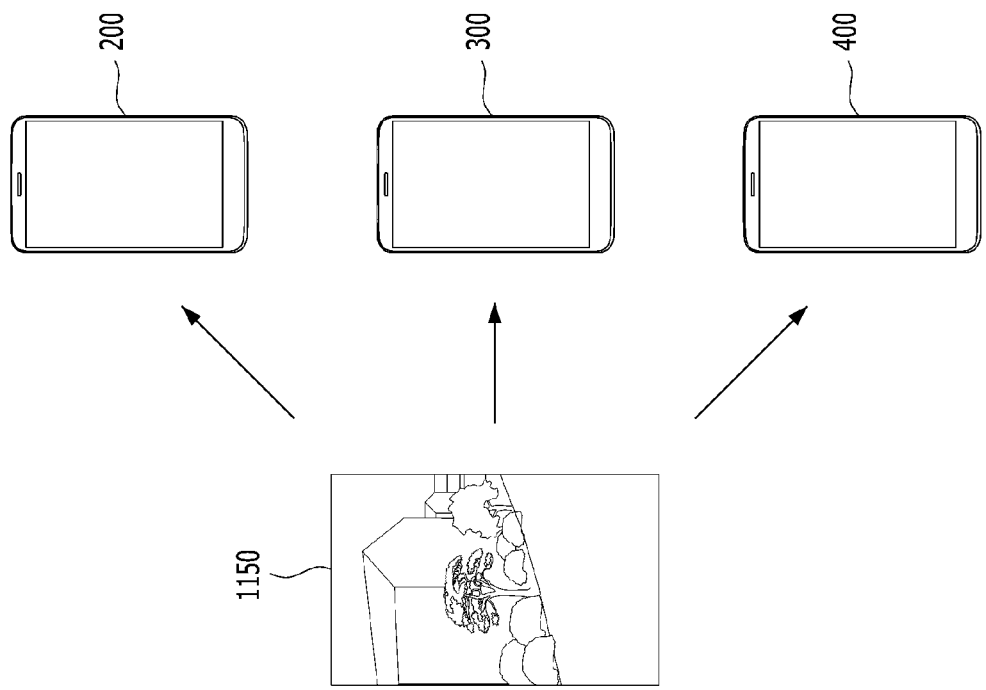
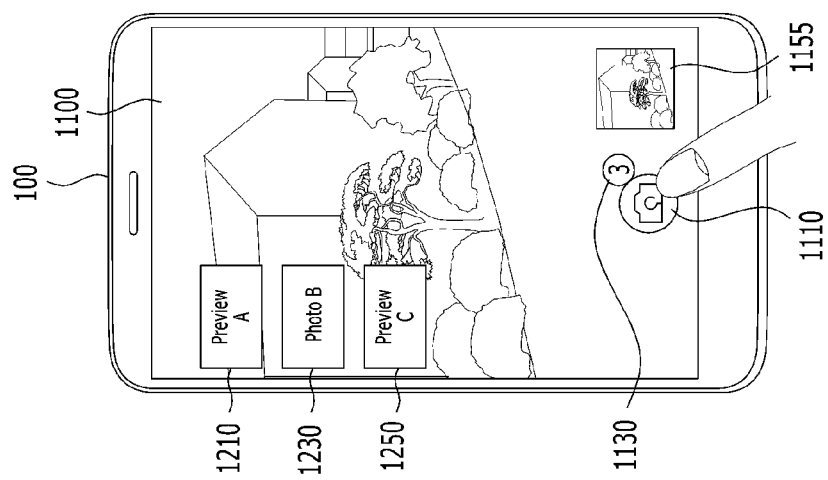

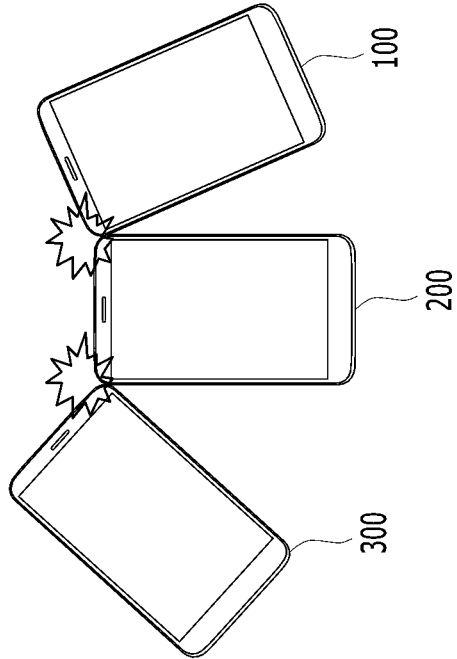
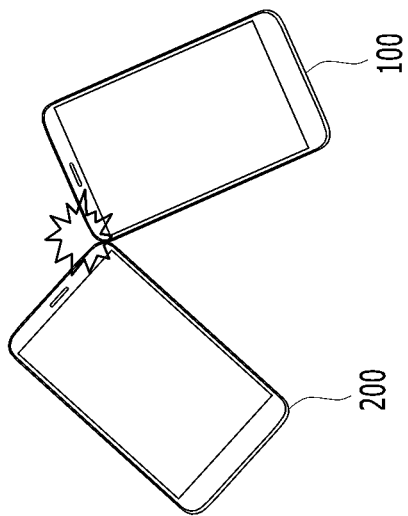
FIG. 20

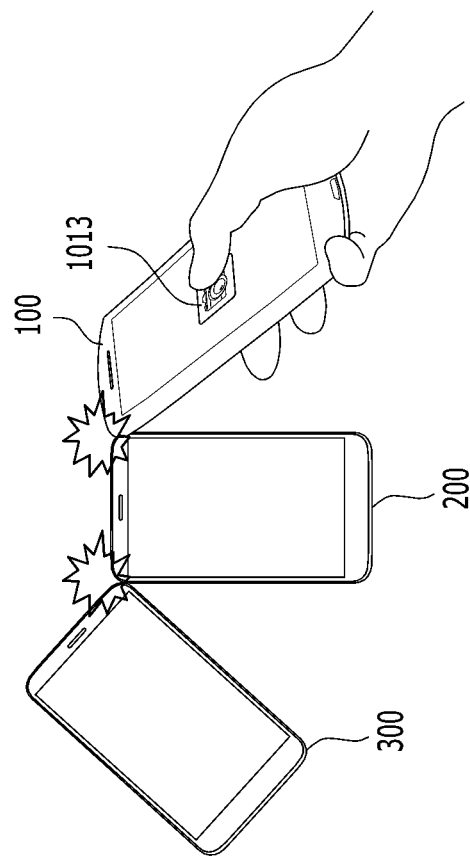
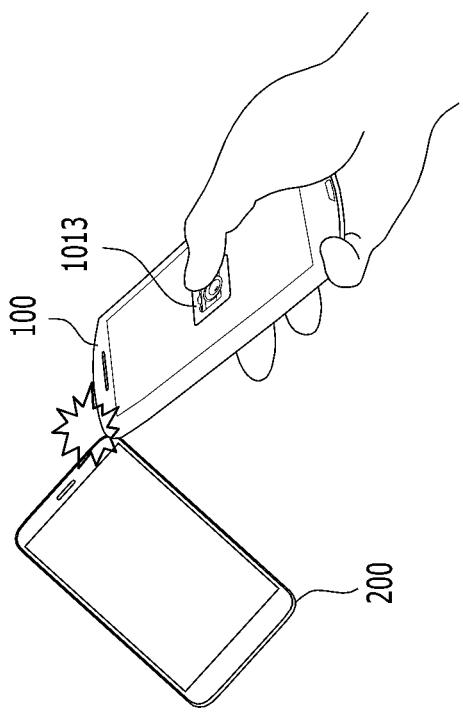
FIG. 23

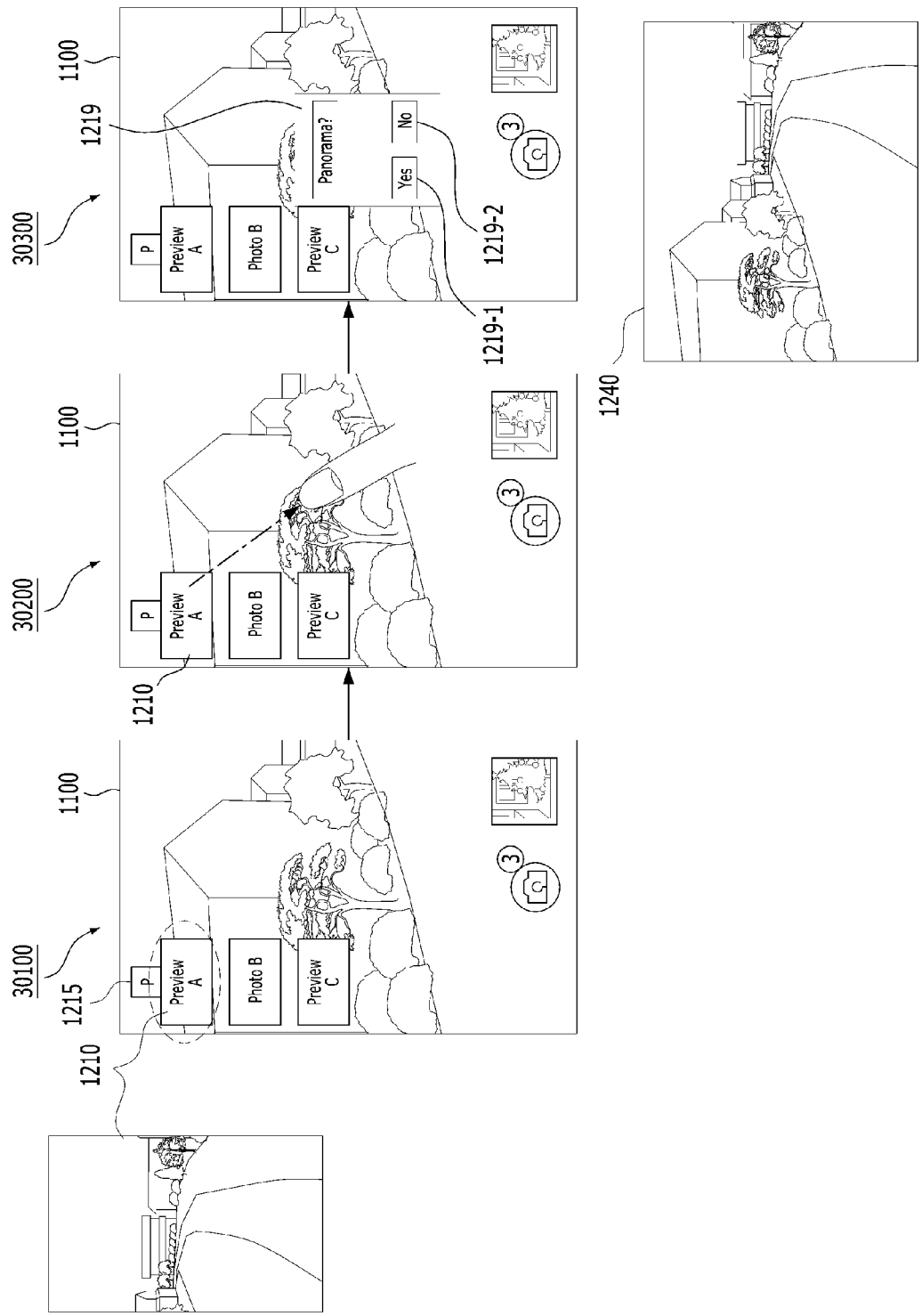

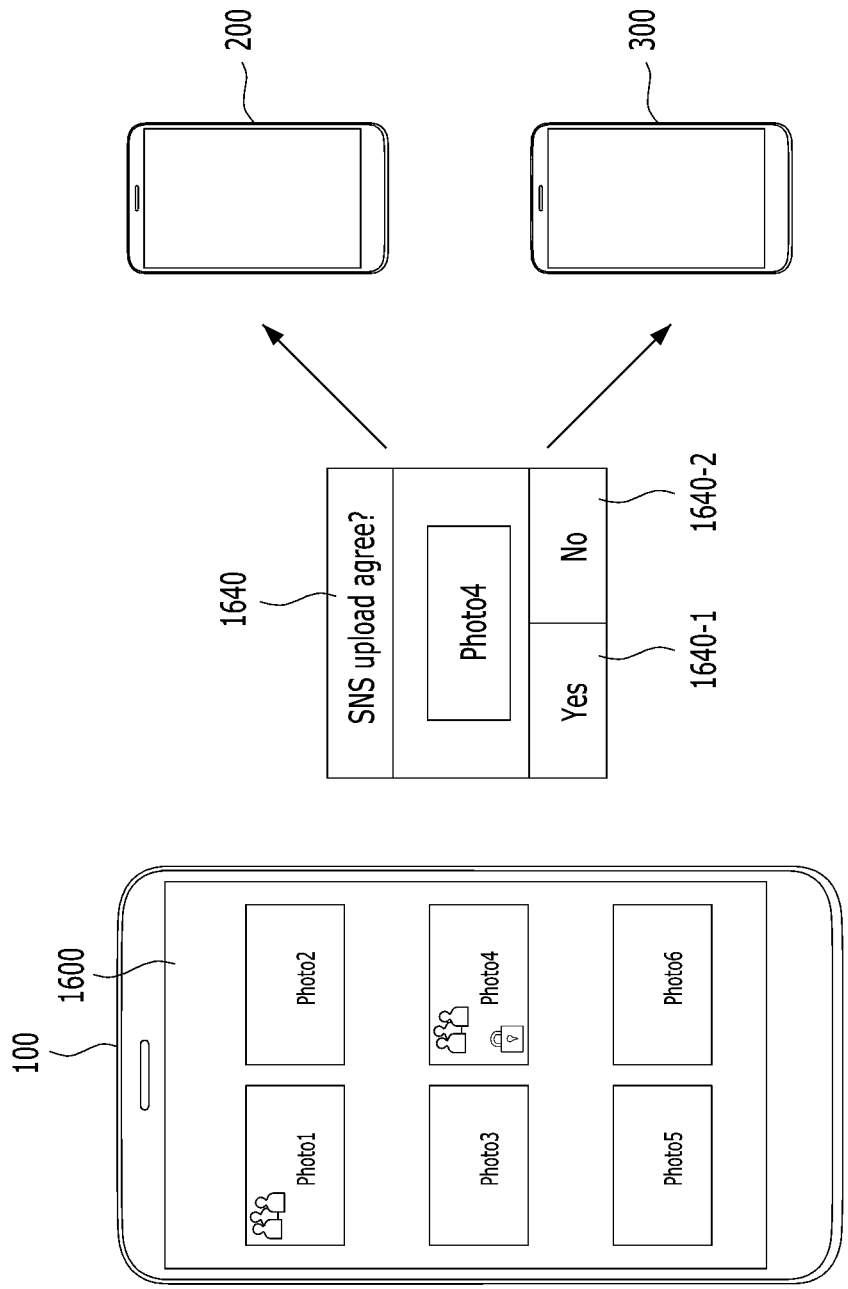

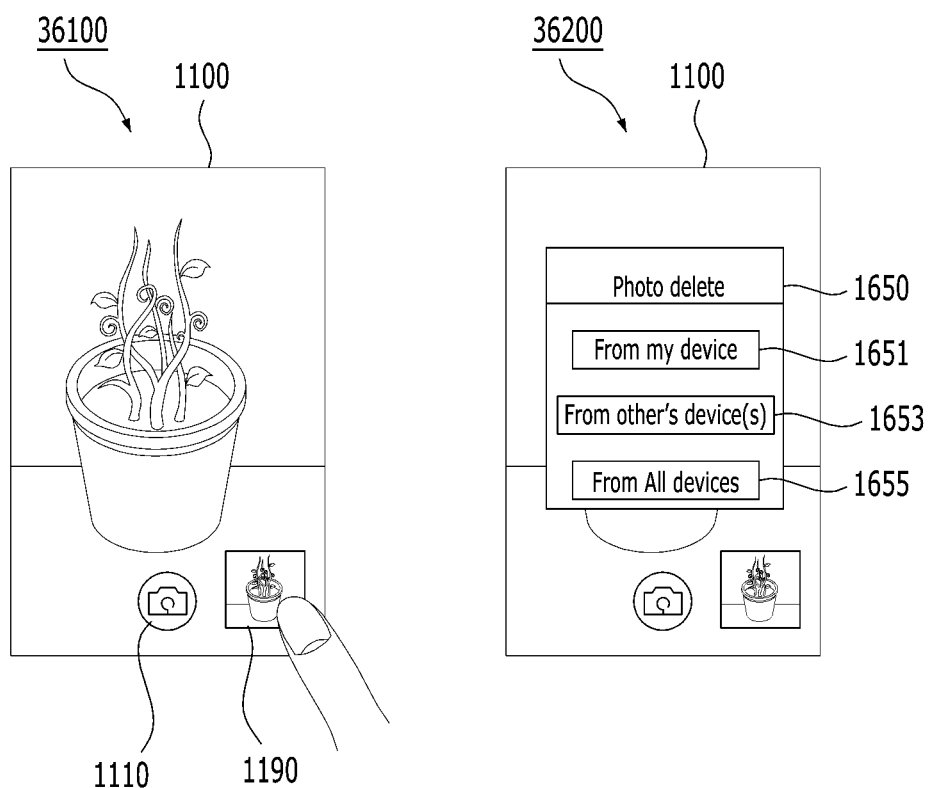

MOBILE TERMINAL AND CONTROLLING METHOD THEREOF

Pursuant to 35 U.S.C. §119(a), this application claims the benefit of earlier filing date and right of priority to Korean Application No. 10-2014-0183563, filed on Dec. 18, 2014, the contents of which are hereby incorporated by reference herein in their entirety.

BACKGROUND OF THE INVENTION

Field of the Invention

Embodiments of the present invention are related to a mobile terminal and method of controlling a mobile terminal.

Discussion of the Related Art

Terminals may be generally classified as mobile/portable terminals or stationary terminals. Mobile terminals may also be classified as handheld terminals or vehicle mounted terminals. Further, mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Mobile terminals also include camera functions. Thus, to take and send a photo to a counterpart, the user has to 1) take a photo through the mobile terminal; 2) execute a communication application (e.g., SMS, MMS, email, etc.) for sending the photo; 3) select the counterpart through the executing communication application; and 4) input a photo send command. This process is complicated and cumbersome for the user

SUMMARY OF THE INVENTION

Accordingly, embodiments of the present invention are directed to a mobile terminal and a method of controlling the mobile terminal that substantially obviate one or more problems due to limitations and disadvantages of the related art.

One object of the present invention is to provide a mobile terminal and controlling method thereof, by which a counterpart terminal for interworking with an application executing in the mobile terminal can be selected conveniently and promptly.

Another object of the present invention is to provide a mobile terminal and controlling method thereof, by which a result of a executing application can be shared with a counterpart terminal promptly and conveniently.

To achieve these objects and other advantages and in accordance with the purpose of the invention, as embodied and broadly described herein, the present invention provides in one aspect, a mobile terminal including a touchscreen; a camera; a memory; a wireless communication unit; and a controller configured to display a preview image input through the camera on the touchscreen, capture the preview image and execute a voice recognition function, in response to a first touch gesture performed on the touchscreen, and control the wireless communication unit to transmit the captured image to at least one counterpart terminal found through the voice recognition function in accordance with a voice input, in response to a release of the first touch gesture from the touchscreen. The present invention also provides a corresponding method of controlling a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with the present disclosure;

FIGS. 3 to 5 are display screen configurations illustrating a method of controlling a mobile terminal according to an embodiment of the present invention;

FIG. 20 is a diagram to illustrate the physical contact between at least two terminals;

FIG. 23 is a diagram to illustrate the physical contact between at least two terminals;

FIGS. 30A and 30B are display screen configurations illustrating a method of controlling a mobile terminal according to an embodiment of the present invention;

FIGS. 34 and 35 are display screen configurations illustrating a method of controlling a mobile terminal according to an embodiment of the present invention; and FIG. 36 is a display screen configuration illustrating a method of controlling a mobile terminal according to an embodiment of the present invention.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
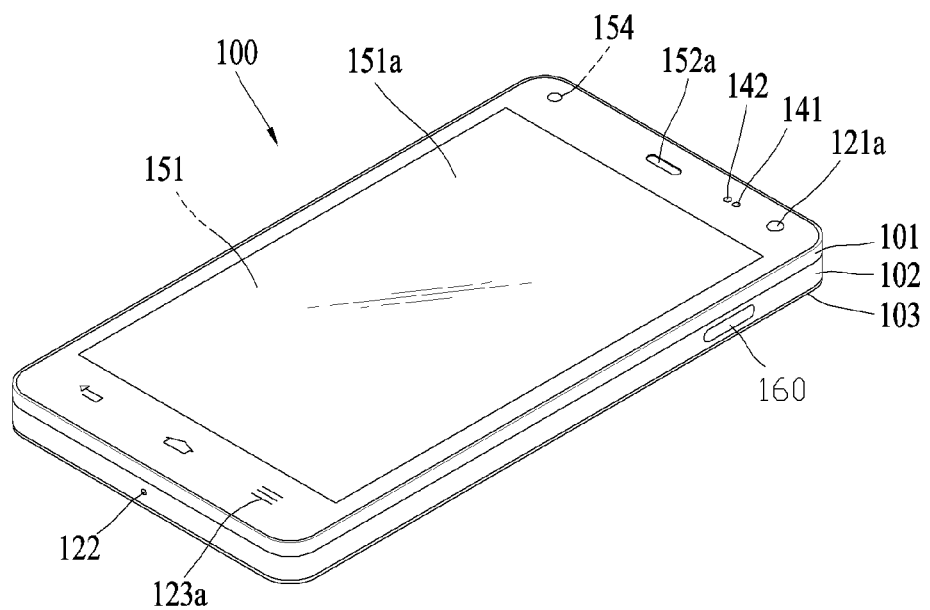
FIGS. 1B and 1C are conceptual views of one example of the mobile terminal, viewed from different directions.
Figure 1C:
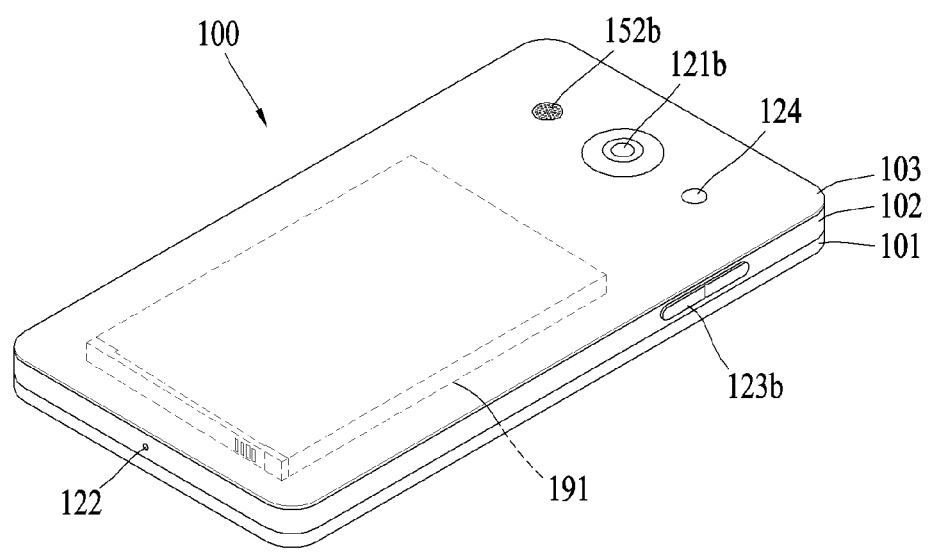

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 170, a memory 160, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 170 serves as an interface with various types of external devices that can be coupled to the mobile terminal 100. The interface unit 170, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 170.

The memory 160 is typically implemented to store data to support various functions or features of the mobile terminal 100. For instance, the memory 160 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 160, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 160. As one example, the controller 180 controls some or all of the components illustrated in FIGS. 1A-1C according to the execution of an application program that have been stored in the memory 160.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least two of the respective components mentioned in the above description can operate together to implement operations, controls and/or controlling methods of the mobile terminals according to various embodiments of the present invention mentioned in the following description. Moreover, the operations, controls and/or controlling methods of the mobile terminals can be implemented by executing at least one or more applications programs stored in the memory 160.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast- Handheld (DVB-H), and the like. Broadcast signals and/or broadcast associated information received via the broadcast receiving module 111 may be stored in a suitable device, such as a memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 160. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof. In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like. If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 160. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 170 serves as an interface for external devices to be connected with the mobile terminal 100. For example, the interface unit 170 can receive data transmitted from an external device, receive power to transfer to elements and components within the mobile terminal 100, or transmit internal data of the mobile terminal 100 to such external device. The interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 170.

When the mobile terminal 100 is connected with an external cradle, the interface unit 170 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 160 can store programs to support operations of the controller 180 and store input/output data (for example, phonebook, messages, still images, videos, etc.). The memory 160 may store data related to various patterns of vibrations and audio which are output in response to touch inputs on the touch screen.

The memory 160 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 160 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 170 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b. The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface. If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output. The proximity sensor 141 and illumination sensor 142 are also shown in FIG. 1B.

The first camera 121a can process image frames such as still or moving images obtained by the image sensor in a capture mode or a video call mode. The processed image frames can then be displayed on the display unit 151 or stored in the memory 160. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 170 may serve as a path allowing the mobile terminal 100 to interface with external devices. For example, the interface unit 170 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 170 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, the second camera 121a may alternatively be located at other locations, or made to be moveable, in order to have a different image capturing direction from that which is shown. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 170. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

If the display module 151 includes a touchscreen, implementation of the following embodiments may be further facilitated. Therefore, the following description is made on the assumption that the display module 151 includes a touchscreen. In addition, touch gestures frequently mentioned in the following description are schematically described as follows.

First of all, a simple touch is applied by touching a prescribed point on a touchscreen with a pointer (e.g., a finger, a stylus pen, etc.) and then releasing the pointer from the touchscreen before an elapse of a prescribed time from a timing point of the touch without dragging the pointer. Secondly, a long touch is applied by touching a prescribed point on a touchscreen with a pointer (e.g., a finger, a stylus pen, etc.) and then releasing the pointer from the touchscreen after an elapse of a prescribed time from a timing point of the touch without dragging the pointer.

Thirdly, a double touch is applied by touching a prescribed point on a touchscreen consecutively twice within a predetermined time. Fourthly, a touch drag is applied by moving a pointer (e.g., a finger, a stylus pen, etc.) touching a first point on a touchscreen to a second point on the touchscreen by maintaining the touch. In addition, touch gestures other than the above-described touch gestures in the present specification shall be separately described later.

A method of conveniently sharing a photo taken through one mobile terminal with another mobile terminal according to an embodiment of the present invention is described in detail with reference to FIG. 2 as follows. In particular, FIG. 2 is a flowchart illustrating a method of controlling a mobile terminal according to an embodiment of the present invention.

Figure 2:
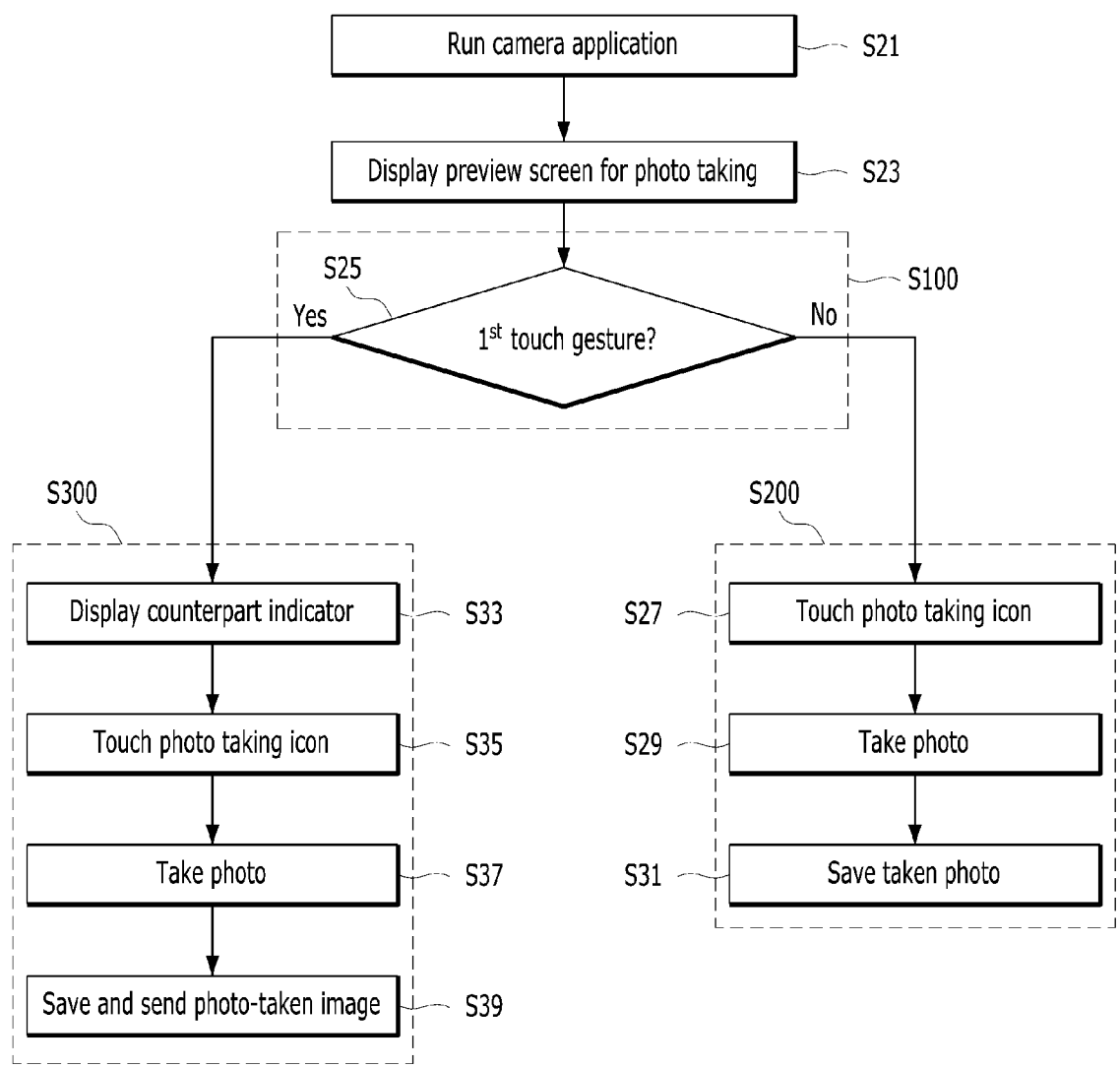
FIG. 2 is a flowchart illustrating a method of controlling a mobile terminal according to an embodiment of the present invention.

Referring to FIG. 2, a camera application for taking a photo is executed or run in the mobile terminal (S21). In particular, the camera application can be executed by touching a camera application icon displayed on the touchscreen 151 of the mobile terminal 100, for example. If the camera application icon is touched, the camera 121 of the mobile terminal 100 is activated and an image input to the activated camera 121 (or an image received by the activated camera 121) can be displayed as a preview image for taking the photo on the touchscreen 151 (S23).

In addition, the controller 180 determines whether a preset first touch gesture is performed on the touchscreen 151 (S25). In this instance, the first touch gesture may correspond to a user command for sending a photo to another mobile terminal if the photo is taken. Also, the first touch gesture shall be described in detail later.

As a result of the determination, while the first touch gesture is not performed (No in S25), a user command for a photo taking may be input. The user command for taking the photo may include and is not limited to an action of touching a photo taking icon displayable on the touchscreen 151 together with the preview image, which is one example of inputting the user command for taking the photo (S27).

If the photo taking icon is touched, for example, the controller 180 can capture the preview image at the timing point of touching photo taking icon. If the preview image is captured, the photographing is done irrespective of whether the captured preview image is saved in the memory 160 temporarily or permanently (S29). In the present specification, if the captured image is photographed, the captured image is saved temporarily or permanently. In this instance, the captured image may correspond to a still image. In addition, the still image is distinguished from a video (or a moving picture) that will be described later.

On the contrary, as a result of the determination, if the first touch gesture is performed (Yes in S25), the controller 180 can control the touchscreen 151 to display an indicator (hereinafter named 'counterpart indicator') indicating a counterpart terminal to which a taken photo will be sent (S33). Hence, if a photo is taken, a user of the mobile terminal 100 can view the counterpart indicator to check that the taken photo will be sent to a prescribed counterpart (or a prescribed terminal) corresponding to the counterpart indicator. However, when the first touch gesture is performed, it is not mandatory for the counterpart indicator to be displayed. If a prescribed photo is taken, since a user may be clearly aware that the taken photo will be sent to a specific person without seeing the counterpart indicator, it may not be necessary to always display the counterpart indicator.

For example, the counterpart terminal to which the taken photo is sent may include one of i) a mobile terminal previously selected for the photo sharing from a phonebook of the mobile terminal 100, ii) a mobile terminal previously registered at the mobile terminal 100 for the photo sharing, iii) a mobile terminal with which a current communication (e.g., a short range communication such as Bluetooth, etc.) having the camera application executed currently therein is established by the mobile terminal 100, and the like. Moreover, although the prescribed communication is established, the corresponding mobile terminal can become the counterpart mobile terminal only if existing within a prescribed distance from the mobile terminal 100. Further, the existence of the counterpart terminal within the prescribed distance can be obtained in a manner that the corresponding terminals send their location information (e.g., location information calculated through the position location module 115, etc.) to each other.

Alternatively, if the first touch gesture is performed, one of a phonebook list, a recent phone call list and a list of terminals located within a prescribed distance from the mobile terminal 100 can be displayed on the touchscreen 151. If a desired terminal is selected from the corresponding list, the selected terminal can become the counterpart terminal.

Subsequently, a user command for a taking a photo in the mobile terminal 100 can be input (S35). As mentioned in the foregoing description, the user command for taking the photo may include a touch to a photo taking icon displayable on the touchscreen 151. If the photo taking icon is touched, the controller 180 can capture the preview image corresponding to the timing point of touching the photo taking icon. Namely, taking the photo is performed (S37).

The mobile terminal 100 saves the captured image (i.e., the photo-taken image) in the memory 160 and can also send the captured image to the counterpart terminal (S39). That is, the photo-taken image can be shared between the mobile terminal 100 and the counterpart terminal as soon as taking the photo is performed. In this instance, the counterpart terminal may include another mobile terminal or such a fixed terminal as a personal computer, a digital television or the like. In the following description, the counterpart terminal is assumed to be another mobile terminal.

According to the above description, once a photo is taken, the taken photo is automatically sent to a counterpart terminal without needing an additional user command, by which the present invention is non-limited. For instance, once a photo is taken, the controller 180 can display a popup window for checking whether to send a taken photo to a counterpart terminal on the touchscreen. If a user inputs a user command for sending the taken photo through the popup window, the taken photo may be sent to the counterpart terminal.

According to the above description, a taken image is saved in the memory 160 and is also sent to a counterpart terminal, by which the present invention is non-limited. For instance, the taken image can be sent to the counterpart terminal without being saved in the memory 160. In addition, the steps S27 to S31 can be called a normal camera mode operating step S200, the steps S33 to S39 (or the steps S35 to S39) can be called a group camera mode operating step S300, and the step S25 can be called a group camera mode entry step S100.

The normal camera mode may correspond to the mode for taking/making a photo/video in the mobile terminal and then saving the taken/made photo/video in the mobile terminal. The group camera mode may correspond to the mode for taking/making a photo/video in the mobile terminal and then directly (or conveniently) sending the taken/made photo/video to a counterpart to facilitate the taken/made photo/video to be shared with the counterpart.

Figure 5:
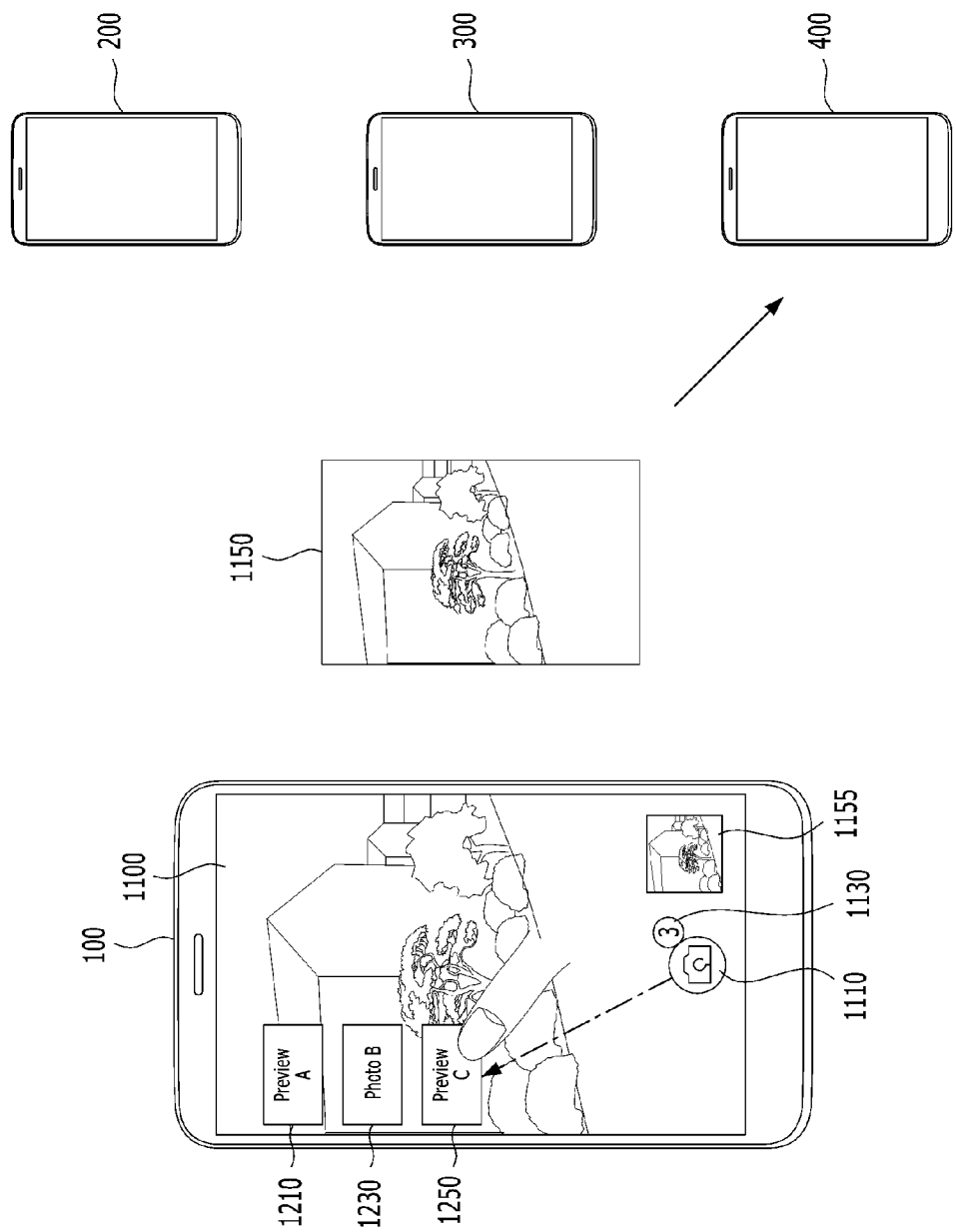

The above-mentioned method of facilitating a photo taken in one mobile terminal to be shared with another mobile terminal according to an embodiment of the present invention is further described in detail with reference to FIGS. 3 to 5 as follows. In particular, FIGS. 3 to 5 are display screen configurations illustrating a method of controlling a mobile terminal according to an embodiment of the present invention.

Figure 3:
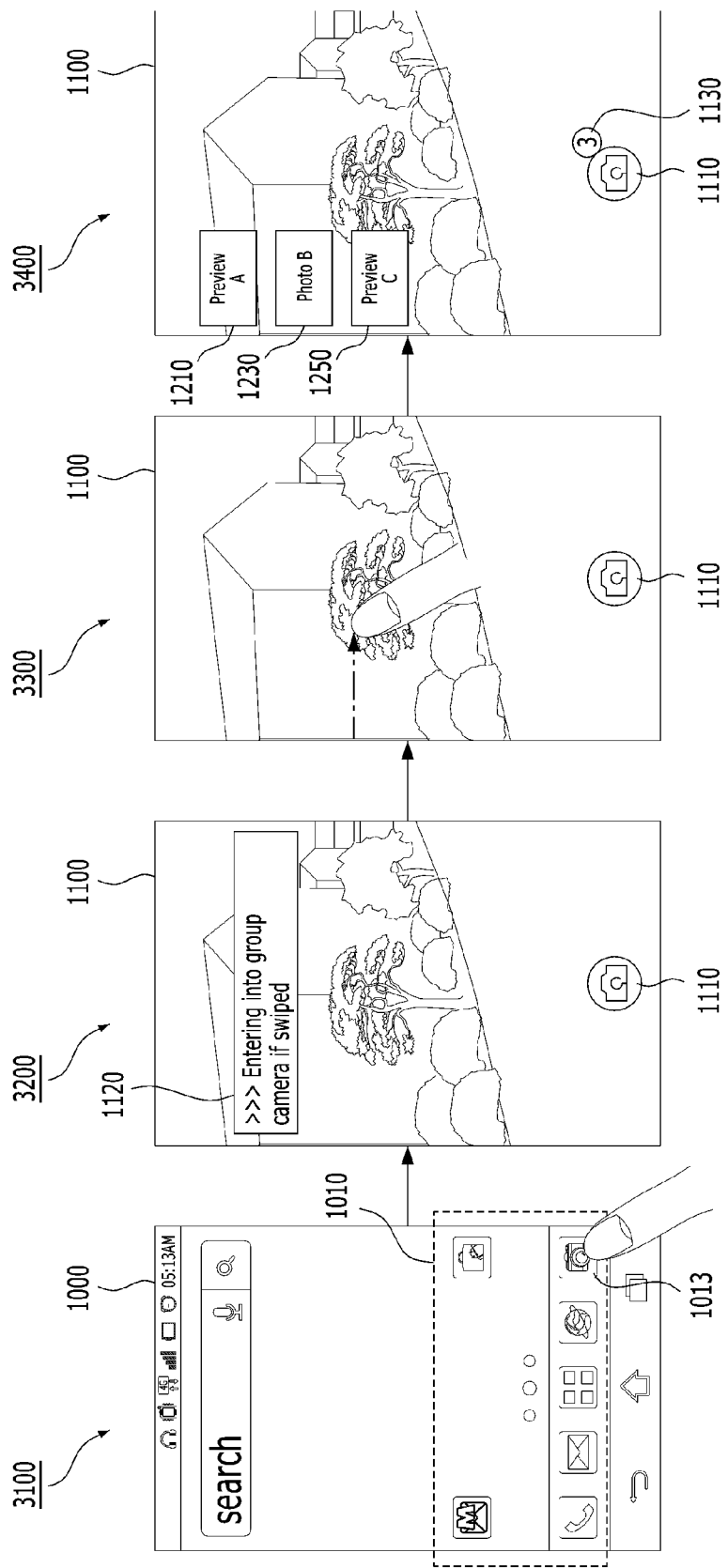

Referring to the reference number 3100 shown in FIG. 3, the controller 180 can display a home screen 1000 on the touchscreen 151. In this instance, the home screen is the screen that can be displayed by turning on a power of the mobile terminal 100 and then unlocking a lock screen (when the mobile terminal is locked). Icons and widget of various applications and the like can be displayed on the home screen. The reference number 3100 indicates one example in which a plurality of application icons 1010 are displayed on the home screen 1000.

A camera application icon 1013 can be selected from a plurality of the application icons 1010 by being touched. Meanwhile, the camera application icon may be displayed on the lock screen of the mobile terminal 100. In this instance, the lock screen may correspond to a screen capable of recognizing only prescribed limited touch gestures while preventing an incorrect manipulation (e.g., an unintended touch gesture input, etc.) on the touchscreen 151 and/or displaying prescribed restricted information for privacy protection only. If the camera application icon is displayed on the lock screen, it can be selected by being touched.

If so, the controller 180 can activate the camera 121. Subsequently, referring to the reference number 3200 shown in FIG. 3, the controller 180 can display an image input to (or received by) the activated camera 121 on the touchscreen 151 as a preview image for a photo-taking.

If the camera 121 is activated, although the preview image for taking the photo is displayed, the preview image can be switched to a preview image for making a video in response to a user command input later. According to the setup of the mobile terminal 100, when the camera 121 is activated, the preview image for making the video may be preferentially displayed.

The preview image 1100 for taking the photo may be displayed together with a description guide 1120 illustrating the first touch gesture. The description guide 1120 describes that the first touch gesture includes a swipe touch action applied in a left-to-right direction in the preview image 1100, for example. In addition, a different touch action may be set as the first touch gesture in advance. Because the description guide 1120 is provided to remind a user of a type of the aforementioned first touch gesture, the description guide 1120 can also not be displayed.

In addition, a photo taking icon 1110 can be displayed on the preview image 1100. Moreover, without performing the first touch gesture on the touchscreen 151, photo taking icon 1110 can be selected by being touched. If the photo taking icon 1110 is selected by being touched, the controller 180 can take a photo by capturing the preview image at the timing point of touching the photo taking icon 1110. Subsequently, the controller 180 can save the photo-taken image in the memory 160. This corresponds to taking the photo in the normal camera mode mentioned in the foregoing description.

Meanwhile, referring to the reference number 3300 shown in FIG. 3, a first touch gesture can be performed on the touchscreen 151 on which the preview image 1100 for taking the photo is displayed. If so, referring to the reference number 3400 shown in FIG. 3, the controller 180 switches the normal camera mode to the group camera mode and can also display a first counterpart indicator 1210, a second counterpart indicator 1230 and a third counterpart indicator 1250 on the touchscreen 151.

The first counterpart indicator 1210, the second counterpart indicator 1230 and the third counterpart indicator 1250 may correspond to a first counterpart terminal 200, a second counterpart terminal 300 and a third counterpart terminal 400, which are shown in FIG. 4, respectively. According to the example shown in FIG. 3, there are three (3) counterpart terminals to send photos to. Further, one (1) counterpart terminal, two (2) counterpart terminals, four (4) counterpart terminals, or more counterpart terminals may exist. A target of the counterpart terminal has been already described and its details are omitted for clarity of the following description.

According to the reference number 3400 shown in FIG. 3, it is assumed that the mobile terminal 100 has already established a preset prescribed communication (e.g., a short range communication such as Bluetooth, etc.) with each of the first counterpart terminal 200 and the third counterpart terminal 400. Further, the first counterpart terminal 200 and the third counterpart terminal 400 are assumed to be executing a camera application.

Referring to the reference number 3400 shown in FIG. 3, as the first counterpart indicator 1210, a camera preview image received in real time from the first counterpart terminal 200 or a thumbnail of the camera preview image received in real time can be displayed on the preview image 1100. As the third counterpart indicator 1250, a camera preview image received in real time from the third counterpart terminal 400 or a thumbnail of the camera preview image received in real time can be displayed on the preview image 1100.

Of course, although the prescribed communication has been already established with each of the first counterpart terminal 200 and the third counterpart terminal 400, it is not mandatory for the corresponding counterpart preview image to be displayed as the corresponding counterpart indicator. Also, a different image or indicator can be displayed as the corresponding counterpart indicator.

Meanwhile, referring to the reference number 3400 shown in FIG. 3, as the second counterpart indicator 1230, a most recently taken photo or a thumbnail of the corresponding photo is received from the second counterpart terminal 300 and can be then displayed on the preview image 1100. Thus, a prescribed communication may or may not be established between the mobile terminal 100 and the second counterpart terminal 300. In addition, the second counterpart terminal 300 may or may not be executing the camera application.

As mentioned in the foregoing description, the first counterpart indicator 1210, the second counterpart indicator 1230 and the third counterpart indicator 1250 may not be displayed on the preview image 1100. Referring to the reference number 3400 shown in FIG. 3, the controller 180 can display a counterpart terminal count indicator 1130, which indicates the number of the counterpart terminals, on the preview image 1100. Although the drawing shows that the count indicator 1130 is located adjacent to photo taking icon 1110, the count indicator 1110 can be displayed at any location on the touchscreen 151. Moreover, the counter indicator 1130 may not be displayed.

Referring to FIG. 4, as a user command for taking a photo, a simple touch can be performed on the photo taking icon 1110. In this instance, the simple touch means touching a prescribed point on the touchscreen 151 with a pointer (e.g., a finger, a stylus pen, etc.) and then releasing the pointer from the touchscreen 151 before an elapse of a prescribed without dragging the pointer.

If the simple touch is performed on the photo taking icon 1110, the controller 180 can capture the preview image 1100 corresponding to the timing point of touching the photo taking icon 1110. Further, the controller 180 can save the captured image 1150 in the memory 160. The controller 180 can display a thumbnail 1155 of the captured image 1150 on the preview image 1100 to indicate that the captured image 1150 has been saved. Optionally, the thumbnail 1155 may not be displayed on the preview image 1100.

Subsequently, the controller 180 can send the captured image 1150 to a first counterpart terminal 200, a second counterpart terminal 300 and a third counterpart terminal 400. Further, if a prescribed communication (e.g., Bluetooth communication, etc.) is established between the mobile terminal 100 and the corresponding counterpart terminal, the captured image 1150 can be sent through the established communication. If the prescribed communication is not established, the captured image 1150 can be sent through other communication (e.g., MMS (multimedia message service) through a mobile/Wi-Fi communication network, an email, etc.). Even if the prescribed communication is established, the captured image 1150 can be sent through the other communication as mentioned above.

The photo saving operation and the photo sending operation can be substantially performed at the same time. In particular, one of the operations may be performed ahead of the other with a small time difference. However, since the time difference is small, the two operations may seem to be performed at the same time.

According to the description with reference to FIG. 4, the user command for taking the photo corresponds to performing the simple touch on the photo taking icon 1110. Instead, referring to FIG. 5, a user command for a taking the photo may be performed by touching the photo taking icon 1110, dragging the touched photo taking icon 1110 to a desired one of first to third counterpart indicators, and then releasing the corresponding touch. According to the example shown in FIG. 5, the touched photo taking icon 1110 is dragged to the third counterpart indicator 1250.

If so, the controller 180 can take the photo by capturing the preview image 1100 corresponding to the timing point of touching the photo taking icon 1110 or the preview image 1100 corresponding to the timing point of releasing the touch after the touch & drag. Subsequently, as mentioned in the foregoing description, the controller 180 can save the captured image 1150 in the memory 160. In addition, the controller 180 can send the captured image 1150 only to the third counterpart terminal 400 corresponding to the touched & dragged third counterpart indicator 1250.

Of course, if the touched photo taking icon is dragged to the first counterpart indicator, the controller 180 can send the captured image to the first counterpart terminal. Moreover, if the touched photo taking icon is dragged to the second counterpart indicator, the controller 180 can send the image to the second counterpart terminal. As mentioned in the foregoing description, the photo saving sending operations can be substantially performed at the same time.

Meanwhile, while the mobile terminal 100 is operating in the group camera mode, as indicated by the reference number 3400 shown in FIG. 3, if a swipe touch action in a right-to-left direction is performed on the preview image 1100, the controller 180 can switch the group camera mode to the normal camera mode.

Moreover, while the mobile terminal 100 is operating in the group camera mode, as indicated by the reference number 3400 shown in FIG. 3, if one of the first counterpart indicator 1210, the second counterpart indicator 1230 and the third counterpart indicator 1250 is touched and then flicked in a right-to-left direction, the controller 180 controls the group camera mode to be maintained, controls the flicked indicator to disappear, and can also control the counterpart terminal, which corresponds to the disappearing indicator, to be excluded from the previously registered targets to which the taken photo will be sent.

The counterpart terminal becoming the target for sending the taken photo thereto can also be determined by a voice input after executing a camera application. This shall be further described in detail with reference to FIG. 6 as follows. In particular, FIG. 6 is a flowchart illustrating a method of controlling a mobile terminal according to an embodiment of the present invention.

Figure 6:
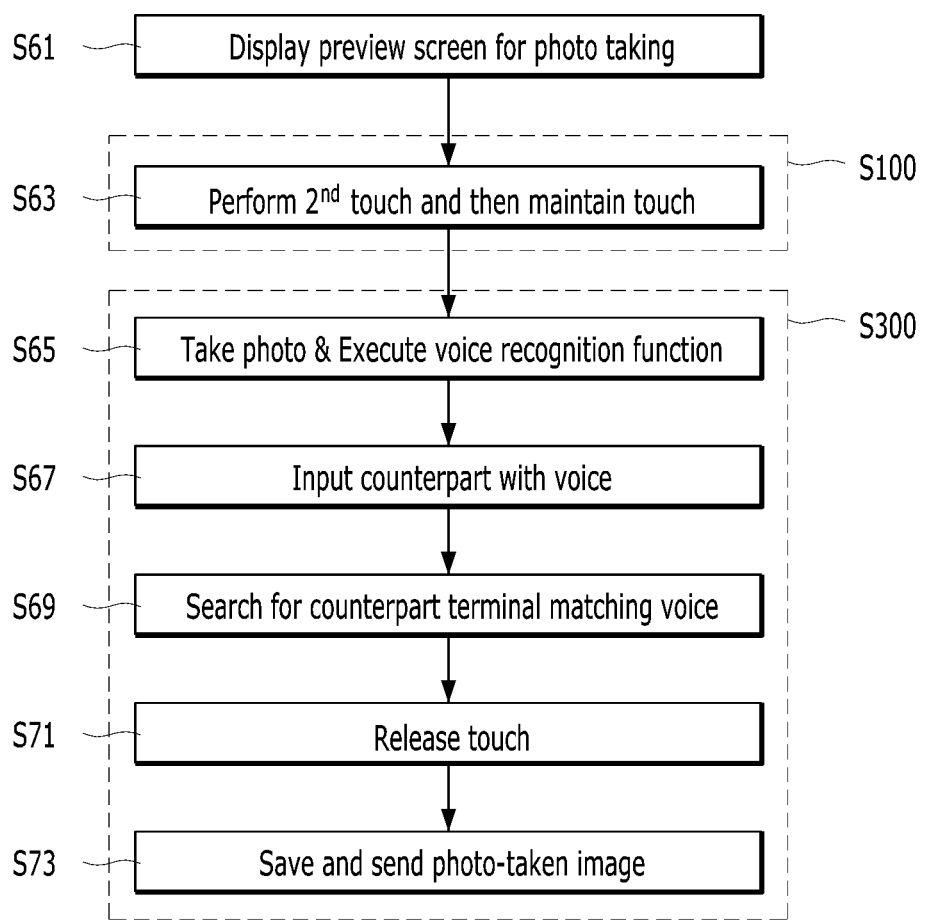
FIG. 6 is a flowchart illustrating a method of controlling a mobile terminal according to an embodiment of the present invention.

Referring to FIG. 6, as a camera application for a photo taking is executed in the mobile terminal 100, the controller 180 can display a preview image on the touchscreen 151 (S61). Since this step is mentioned in the foregoing description, its details are omitted for clarity of the following description (refer to S21 and S23 in FIG. 2).

Subsequently, a preset second touch gesture can be performed on the touchscreen 151 (S63). In particular, the second touch gesture may include an action performed by touching photo taking icon with a pointer and then dragging the pointer in a prescribed direction by maintaining the touch to the touchscreen 151 for example, by which the second touch gesture is non-limited.

If so, the controller 180 activates the microphone 122 and can also execute a voice recognition function (S65). In this instance, the voice recognition function can continue to be executed while the touch with the pointer is maintained after the drag. Also, the controller 180 can take or capture a photo of the preview image at the timing point of touching the photo taking icon with the pointer (S65).

Subsequently, the controller 180 can receive an input of a user's voice through the activated microphone 122 (S67). If so, the controller 180 can search at least one of a phonebook saved in the mobile terminal 100 and a phonebook saved in a preset internet website for a first counterpart terminal corresponding to the input voice (S69). After the first counterpart terminal has been found, as the touch continues to be maintained, the voice recognition function can continue to be executed. If the controller 180 receives an input of an additional voice from the user, the controller 180 can search for a second counterpart terminal corresponding to the input voice. In particular, while the touch is maintained, the controller 180 can search for a plurality of counterpart terminals desired by the user through sequential voice inputs entirely.

Once all the desired counterpart terminals are found, the touch can be released (S71). If the touch is released, the controller 180 saves the taken or captured image in the memory 160 and can also send the taken image to the found counterpart terminals (i.e., the first counterpart terminal and the second counterpart terminal) (S73). Subsequently, the controller 180 deactivates the microphone 122 and can end the execution of the voice recognition function. Since the image saving and sending operations are explained in the description of the step S39 shown in FIG. 2, their details are omitted for clarity of the present specification.

So far, it is described that the preview image at the timing point of touching the photo taking icon with the pointer is captured, by which the present embodiment is non-limited. For instance, if the touch is released, the preview image corresponding to a timing point of releasing the touch can be taken and sent to the found counterpart terminals by being saved in the memory 160. The step S63 may correspond to the group camera mode entering step S100 described with reference to FIG. 3 and the steps S65 to S73 may correspond to the group camera mode operating step S300 described with reference to FIG. 3.

Figure 8:
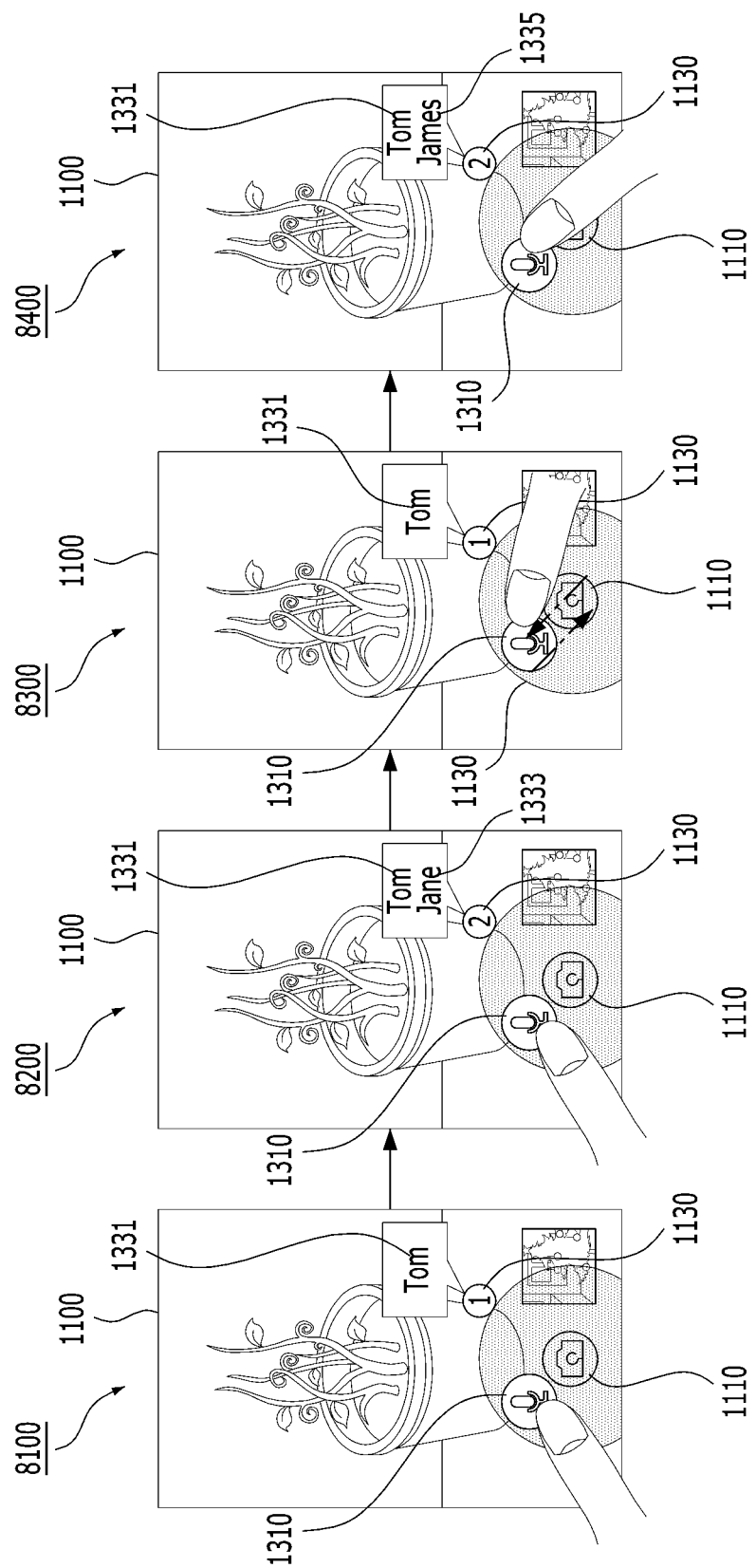
Figure 9:
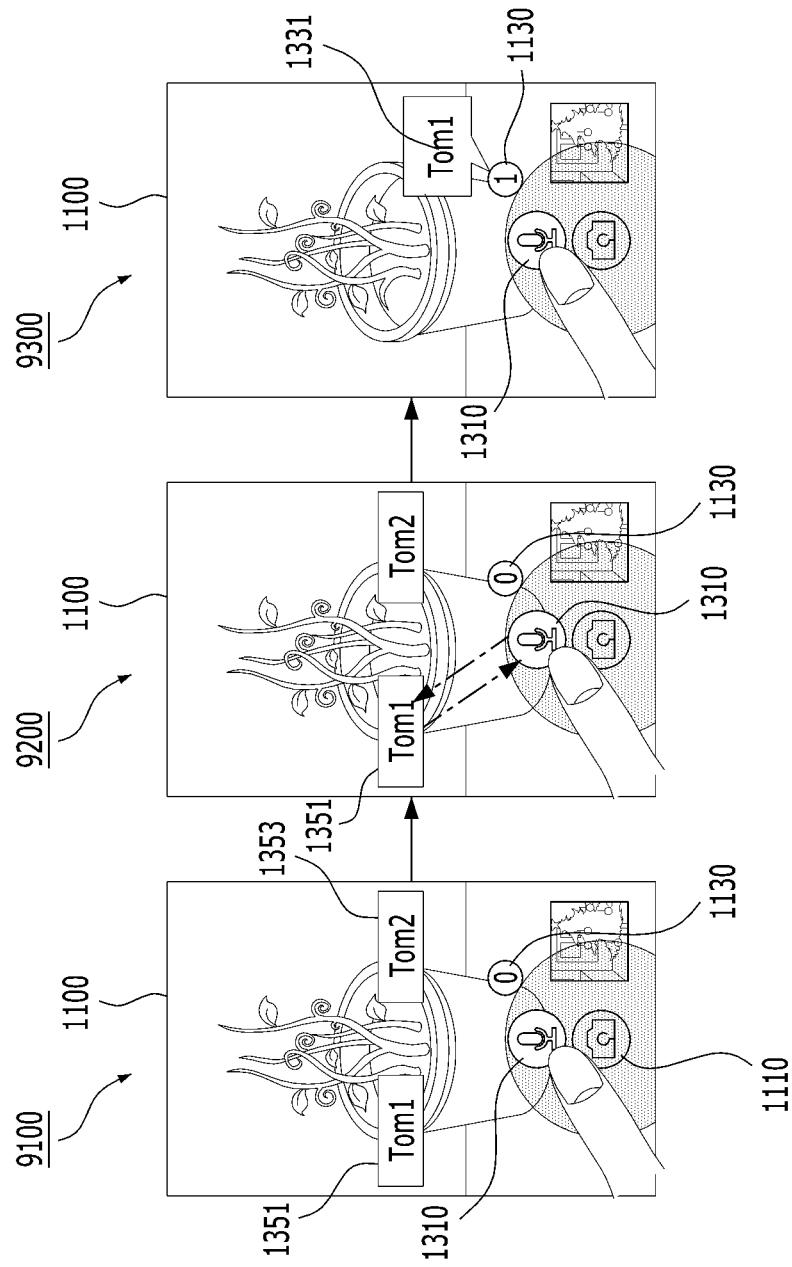

In the following description, an embodiment of the present invention for determining a counterpart terminal becoming a target for sending the taken photo thereto with a voice input after executing a camera application is described in detail with reference to FIGS. 7 to 9. In particular, FIGS. 7 to 9 are display screen configurations illustrating a method of controlling a mobile terminal according to an embodiment of the present invention.

Figure 7:
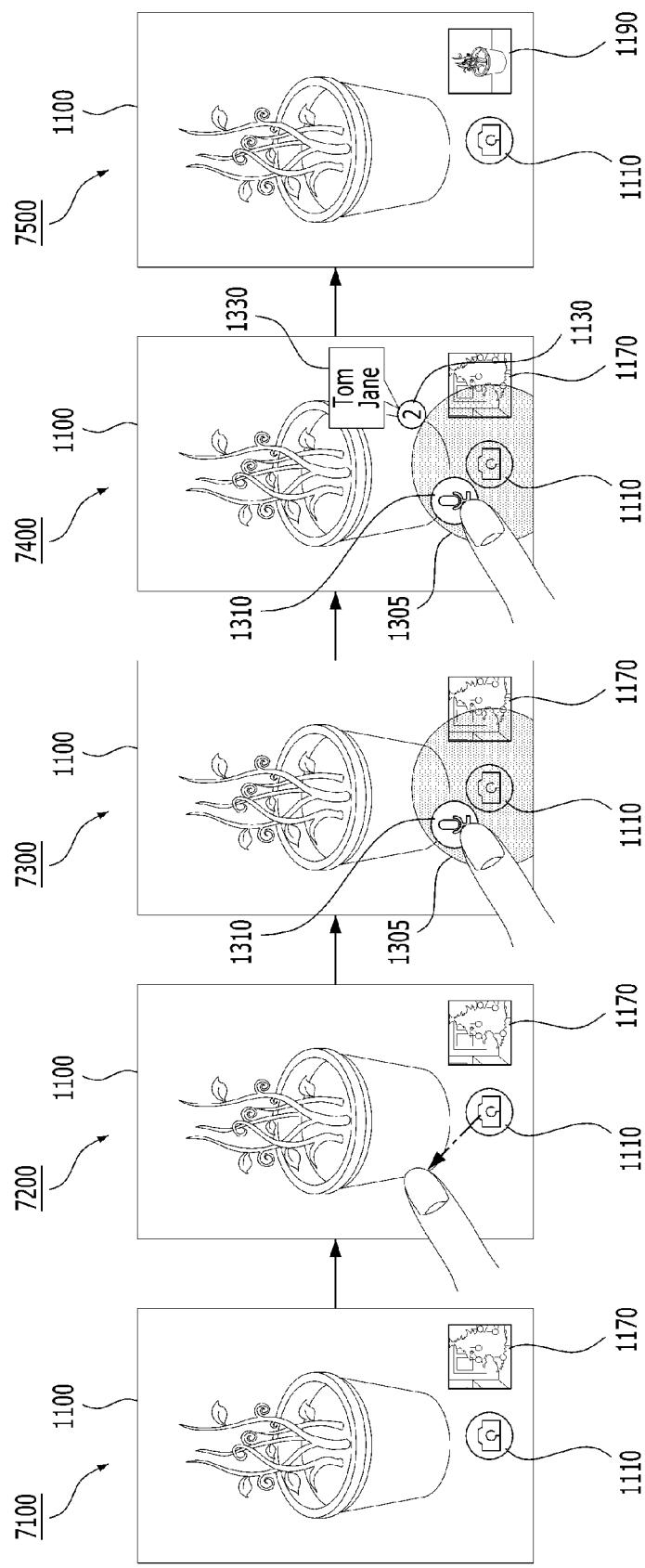
FIGS. 7 to 9 are display screen configurations illustrating a method of controlling a mobile terminal according to an embodiment of the present invention.

Referring to the reference number 7100 shown in FIG. 7, the controller 180 can display a preview image 1100 for a taking a photo on the touchscreen 151. In this instance, a photo taking icon 1110 can be displayed on the preview image 1100. Also, a thumbnail (hereinafter named a first thumbnail) 1170 of a photo most recently taken in the mobile terminal 100 can be also displayed on the preview image 1100. It is not mandatory for the first thumbnail to be displayed.

Referring to the reference number 7100 shown in FIG. 7, it can be observed that the mobile terminal 100 is in the normal camera mode. Hence, if a simple touch is performed on the photo taking icon 1110, a photo taking in the normal camera mode can be performed, which corresponds to the step S200 shown in FIG. 3.

Further, referring to the reference number 7200 shown in FIG. 7, a second touch gesture can be performed by touching the photo taking icon 1110 with a pointer and then dragging the pointer in a first prescribed (threshold) distance in an outer direction of photo taking icon 1110 by maintaining the corresponding touch. As mentioned in the foregoing description, the above-mentioned second touch gesture is just one example only, by which the second touch gesture is non-limited. By the second touch gesture, the mobile terminal 100 can be regarded as switched to the group camera mode from the normal camera mode.

Subsequently, referring to the reference number 7300 shown in FIG. 7, if the pointer is dragged in a second prescribed (threshold) distance or more, the controller 180 activates the microphone 122 and can also execute a voice recognition function. The second prescribed distance may be the same as or longer than the first prescribed distance. In addition, the controller 180 can create and display a voice recognition icon 1310 indicating that the voice recognition function is executed. In this instance, the voice recognition icon 1310 can be displayed on any place on the touchscreen 151.

Particularly, according to the example indicated by the reference number 7300 shown in FIG. 7, the voice recognition icon 1310 is displayed at a touched point of the dragged pointer. Alternatively, the voice recognition icon 1310 may be located on the photo taking icon 1110. Optionally, the voice recognition icon 1310 may not be displayed. According to the example indicated by the reference number 7300 shown in FIG. 7, as the pointer is dragged, a circle graphic 1305 indicating a drag distance of the pointer is further created and displayed. Optionally, the circle graphic 1305 may not be displayed. In addition, a radius of the circle graphic 1305 can be created in proportion to the drag distance of the pointer.

The controller 180 can take a photo of the preview image at the timing point of touching the photo taking icon with the pointer. The exposure and focus adjustments for taking the photo may be performed at the timing point of the touch with the pointer. Alternatively, the exposure and focus adjustments for taking the photo may have been already performed before the touch with the pointer. Thereafter, although an orientation direction of the mobile terminal 100 is changed, the photo-taken preview image can continue to be displayed on the touchscreen 151 by being frozen until it is sent to a counterpart terminal mentioned in the following description.

If the voice recognition function is executed, the controller 180 can receive an input of a user voice through the activated microphone 122. If the input of the user voice is received, referring to the example indicated by the reference number 7400 shown in FIG. 7, the controller 180 searches for counterpart terminals corresponding to the input voice and can then create and display identifiers 1330 of the found counterpart terminals on the touchscreen 151. According to the example indicated by the reference number 7400 shown in FIG. 7, as voice 'Tom' is input, an identifier 'Tom' of a first counterpart terminal corresponding to the voice is displayed. Subsequently, as voice 'Jane' is input, an identifier 'Jane' of a second counterpart terminal corresponding to the voice is displayed. Moreover, on the preview image 1100, a counterpart terminal count indicator 1130 indicating the number of the counterpart terminals can be displayed. According to the example indicated by the reference number 7400 shown in FIG. 7, the count indicator 1130 is located at an edge of the circle graphic 1305.

Instead of or together with the identifiers, counterpart indicators indicating the found counterpart terminals may be displayed on the touchscreen 151. Since the counterpart indicators are mentioned in the foregoing description, their details are omitted for clarity of the present specification. After all the desired counterpart terminals have been found, if the touch is released, the controller 180 saves the captured image in the memory 160 and can also send the captured image to the found counterpart terminals, i.e., the first counterpart terminal and the second counterpart terminal. Subsequently, the controller 180 deactivates the microphone 122 and can end the execution of the voice recognition function.

Referring to the example indicated by the reference number 7500 shown in FIG. 7, as the captured image is saved, the controller 180 stops displaying the count indicator and the identifiers of the counterpart terminals and can also display a thumbnail (hereinafter named a second thumbnail) 1190 of the taken image. According to the example indicated by the reference number 7500 shown in FIG. 7, as the first thumbnail 1170 disappears, the second thumbnail 1190 is displayed at the location of the first thumbnail. Optionally, the second thumbnail 1190 may be displayed together with the first thumbnail 1170.

Referring to the example indicated by the reference number 7500 shown in FIG. 7, as the execution of the voice recognition function ends, the controller 180 can control the voice recognition icon 1310 and the circle graphic 1305 to disappear. According to the example indicated by the reference number 7500 shown in FIG. 7, the mobile terminal 100 can be regarded as returning to the normal camera mode from the group camera mode.

Meanwhile, if a counterpart is input through a voice, a counterpart unintended by a user may be found due to an incorrect pronunciation or a voice recognition error. A process for handling such a case is described in detail with reference to FIG. 8 as follows. Referring to the example indicated by the reference number 8100 shown in FIG. 8, while a voice recognition function is executed, the controller 180 recognizes an input of a first voice from a user, searches for a first counterpart terminal, and can then display a first identifier 1331 of the first counterpart terminal.

Referring to the example indicated by the reference number 8200 shown in FIG. 8, while the voice recognition function continues to be executed, the controller 180 recognizes an input of a second voice from the user, searches for a second counterpart terminal, and can then display a second identifier 1333 of the second counterpart terminal together with the first identifier 1331.

In this instance, the second counterpart terminal is not desired or intended by the user. If so, referring to the example indicated by the reference number 8100 to 8300 shown in FIG. 8, after the pointer has been dragged to the photo taking icon 1110 from the location of the voice recognition icon 1310 on the touchscreen 151 by maintaining the touch, the pointer can then return to the location of the voice recognition icon 1310 by maintaining the touch.

If so, the controller 180 cancels the search for the last found second counterpart terminal and can delete the second identifier 1333. Despite deleting the second identifier 1333, the controller 180 can continue to execute the voice recognition function. In particular, once the voice recognition function is executed, the voice recognition function can continue to be executed until the touch with the pointer is released.

Subsequently, referring to the example indicated by the reference number 8400 shown in FIG. 8, the controller 180, which continues to execute the voice recognition function, recognizes an input of a third voice from the user, searches for a third counterpart terminal, and can then display a third identifier 1335 of the third counterpart terminal together with the first identifier 1331.

After all the desired counterpart terminals have been found, if the touch is released, the controller 180 saves the captured image in the memory 160 and can also sequentially or simultaneously send the captured image to the found counterpart terminals, i.e., the first counterpart terminal and the third counterpart terminal. Since such an operation has been explained in the foregoing description, its details are omitted for clarity of the present specification.

Besides, if a counterpart is input through a voice, at least two counterparts corresponding to the input voice may be found. A process for handling this case is described in detail with reference to FIG. 9 as follows. Referring to the example indicated by the reference number 9100 shown in FIG. 9, the controller 180, which currently executes the voice recognition function, recognizes an input of a desired voice from a user and then searches for a counterpart terminal.

Further, if there are at least two counterpart terminals corresponding to the desired voice (i.e., the same voice), the controller 180 can display the at least two counterpart terminals as icon candidates on the touchscreen 151. According to the example indicated by the reference number 9100 shown in FIG. 9, there are two counterpart terminals (i.e., first counterpart terminal and second counterpart terminal) corresponding to the desired voice. And, a first icon candidate 1351 corresponding to the first counterpart terminal and a second icon candidate 1353 corresponding to the second counterpart terminal are displayed on the touchscreen 151.

If so, referring to the example indicated by the reference number 9200 shown in FIG. 9, after a pointer has been dragged to a location of a desired one (e.g., the first icon candidate 1351) of the two icon candidates from a location of the voice recognition icon 1310 on the touchscreen 151 by maintaining the touch, the pointer can then return to the location of the voice recognition icon 1310 again by maintaining the touch.

If so, referring to the example indicated by the reference number 9300 shown in FIG. 9, the controller 180 selects the first counterpart terminal corresponding to the first icon candidate 1351 from the found first and second counterpart terminals and can display a first identifier 1331 of the first counterpart terminal.

If the touch is released, as mentioned in the foregoing description, the captured image can be sent to the selected first counterpart terminal by being saved. Also, if a counterpart is input through a voice, a counterpart corresponding to the input voice may not be found. A process for handling this case is described in detail with reference to FIG. 10 as follows.

Figure 10:
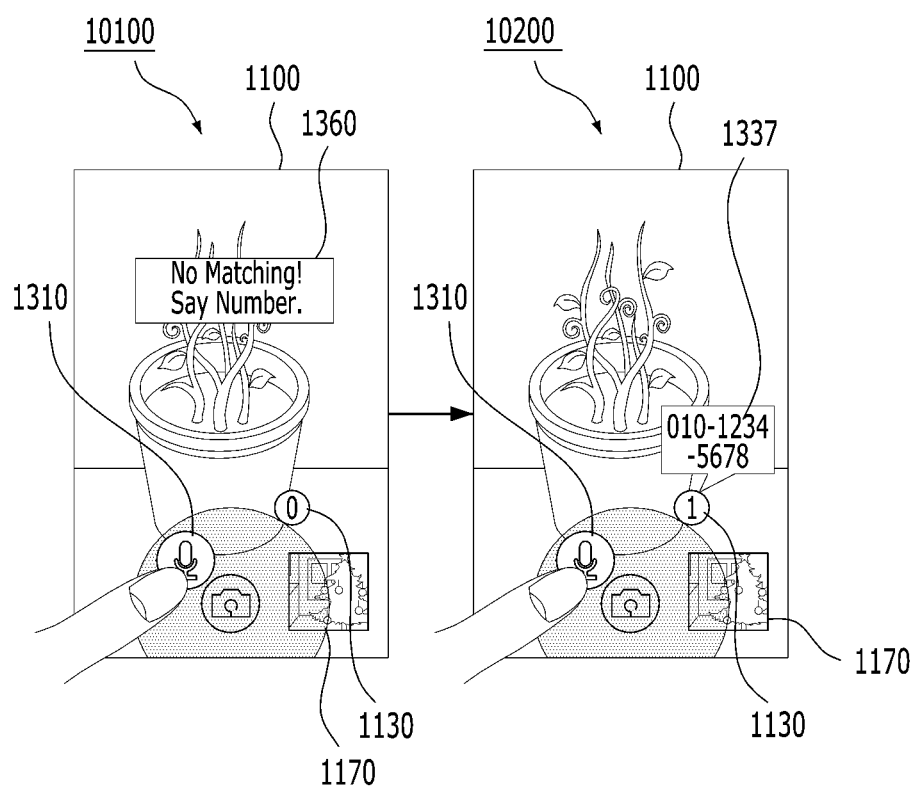
FIG. 10 is a display screen configuration illustrating a method of controlling a mobile terminal according to an embodiment of the present invention.

FIG. 10 is a display screen configuration illustrating a method of controlling a mobile terminal according to an embodiment of the present invention. Referring to the example indicated by the reference number 10100 shown in FIG. 10, the controller 180, which currently executes the voice recognition function, recognizes an input of a desired voice from a user and then searches for a counterpart terminal. Further, if a counterpart terminal corresponding to the desired voice is not found, the controller 180 can display a search failure guide 1360 to indicate that the counterpart terminal corresponding to the desired voice is not found. In the search failure guide 1360, a guide for guiding the user to input a contact information (e.g., a phone number, an email address, etc.) through a voice in direct can be included.

If a phone number of a desired counterpart terminal is input through a voice from the user for example, referring to the example indicated by the reference number 10200 shown in FIG. 10, the controller 180 can display the voice-input phone number as an identifier 1337 of the desired counterpart terminal. If the touch is released, as mentioned in the foregoing description, the captured image can be sent to the selected desired counterpart terminal by being saved. Also, when a captured image is sent to a counterpart terminal, a voice message can be configured to be sent together with the captured image. This is described in detail with reference to FIG. 11 as follows.

Figure 11:
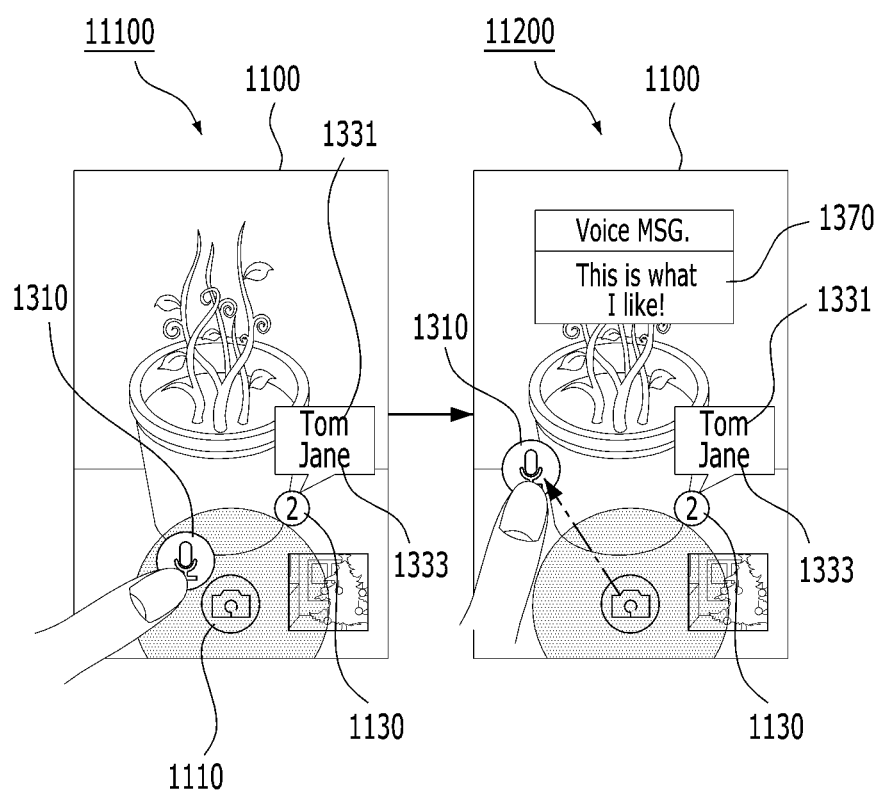
FIG. 11 is a display screen configuration illustrating a method of controlling a mobile terminal according to an embodiment of the present invention.

FIG. 11 is a display screen configuration illustrating a method of controlling a mobile terminal according to an embodiment of the present invention. Referring to the example indicated by the reference number 11100 shown in FIG. 11, the controller 180, which currently executes the voice recognition function, recognizes a sequential input of a first voice and a second voice from a user, searches for a first counterpart terminal and a second counterpart terminal sequentially, and can then display a first identifier 1331 of the first counterpart terminal and a second identifier 1333 of the second counterpart terminal.

Subsequently, referring to the example indicated by the reference number 11200 shown in FIG. 11, on the touchscreen 151, the pointer can be dragged from a location of a voice recognition icon 1310 over a predetermined (threshold) distance by maintaining a touch in order to get farther from the photo taking icon 1110. Once the pointer is dragged over the predetermined distance, referring to the example indicated by the reference number 11200 shown in FIG. 11, the controller 180 can create and display a popup window 1370, which is provided to compose a voice message (or a voice memo), on the touchscreen 151.

If a voice message is input through the microphone 122 from a user, the controller 180 converts the input voice message to a text message by STT (speech to text) and can then display the converted text message within the popup window 1370. If the touch is released, as mentioned in the foregoing description, a captured image can be saved and sent to the selected first counterpart terminal and the selected second counterpart terminal. When the captured image is sent, the converted text can be sent together with the captured image. Moreover, the voice message may be intactly recorded and sent together with or instead of the text message.

Also, if the captured image and the voice or text message are sent, the popup window may disappear from the touchscreen 151 together with the first identifier 1331, the second identifier 1333 and the count indicator 1130. According to the above description, a captured image (i.e., a still image) is sent to a counterpart terminal, by which the present invention is non-limited. For instance, a video can be made and sent to a counterpart terminal. This is described in detail with reference to FIG. 12 as follows.

Figure 12:
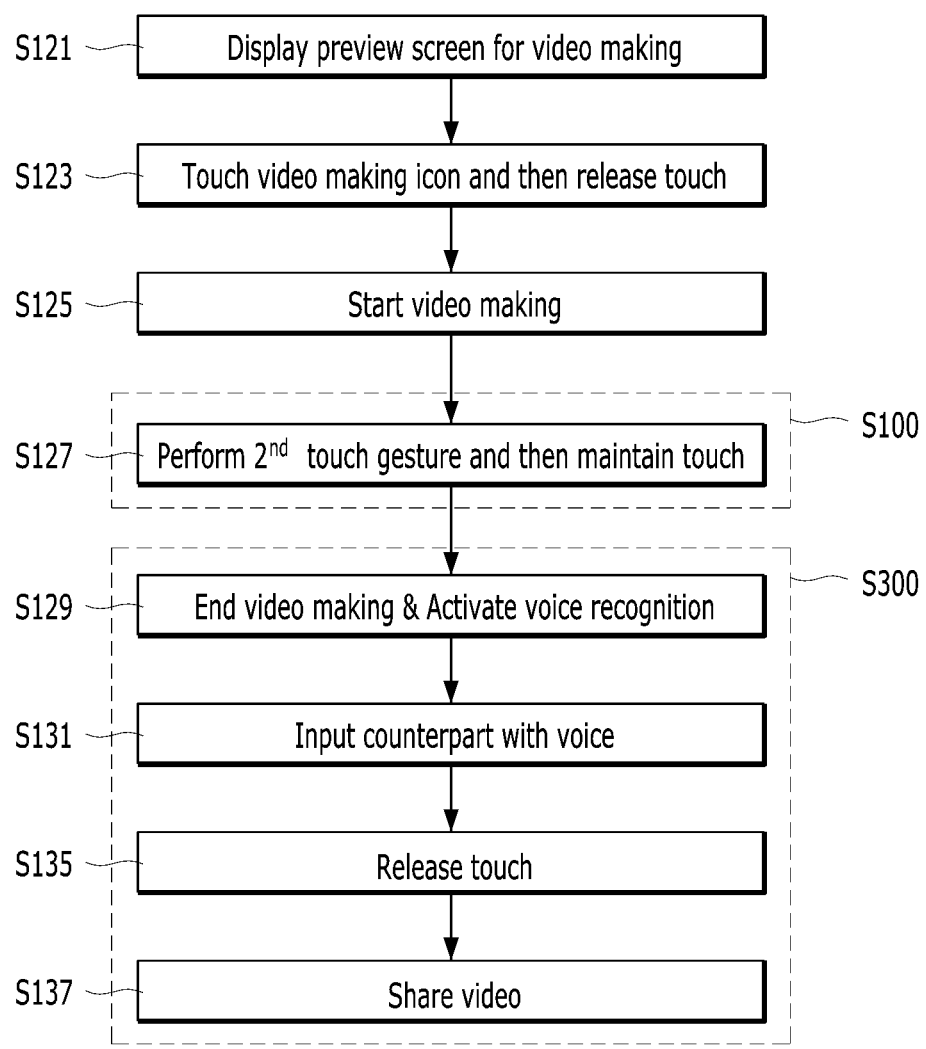
FIG. 12 is a flowchart illustrating a method of controlling a mobile terminal according to an embodiment of the present invention.

FIG. 12 is a flowchart illustrating a method of controlling a mobile terminal according to an embodiment of the present invention. Referring to FIG. 12, as a camera application is executed in the mobile terminal 100 and a video making mode is entered, the controller 180 can display a preview image for a video making on the touchscreen 151 (S121). Subsequently, a simple touch can be performed on a video making start icon displayed on the touchscreen 151 together with the preview image (S123).

If the simple touch is performed, the controller 180 can start capturing the video (S125). Further, the video capturing start icon is changed into a video capturing end icon and can be then displayed together with the preview image. Thus, if the video capturing end icon is displayed, a user can be aware that the video capturing is currently in progress. The video capturing start may be executed from a timing point of touching the video capturing start icon with a pointer by the simple touch or a timing point of releasing the pointer from the video capturing start icon after the simple touch to the video capturing start icon with the pointer.

Subsequently, a preset second touch gesture may be performed on the touchscreen 151 (S127). For example, the second touch gesture may be performed by touching the video capturing end icon with the pointer and then dragging the pointer in a prescribed direction on the touchscreen 151 by maintaining the touch, by which the second touch gesture is non-limited. Once the second touch gesture is performed, the controller 180 activates the microphone 122 and can also execute a voice recognition function (S129).

In this instance, the voice recognition function can continue to be executed while the touch with the pointer is maintained after the drag. Further, the controller 180 can end the video capturing at the timing point of touching the video capturing end icon with the pointer (S129). Alternatively, the controller 180 can end the video capturing at the timing point of dragging the pointer from the video capturing end icon.

Subsequently, the controller 180 can receive an input of a user's voice through the activated microphone 122 (S131). If so, the controller 180 can search at least one of a phonebook saved in the mobile terminal 100 and a phonebook saved in a preset internet website for a first counterpart terminal corresponding to the input voice.

After the first counterpart terminal has been found, as the touch continues to be maintained, the voice recognition function can continue to be executed. If the controller 180 receives an input of another voice from the user, the controller 180 can search for a second counterpart terminal corresponding to the input voice. In particular, while the touch is maintained, it can search for a plurality of counterpart terminals desired by the user through sequential voice inputs entirely.

Once all the desired counterpart terminals are found, the touch can be released (S135). If the touch is released, the controller 180 saves the made video in the memory 160 and can also send the made video to the found counterpart terminals (i.e., the first counterpart terminal and the second counterpart terminal) (S137). Subsequently, the controller 180 deactivates the microphone 122 and can end the execution of the voice recognition function. Alternatively, the controller 180 can save the video in the memory 160 in response to performance of the second touch gesture before releasing the touch.

In addition, the step S127 may correspond to the group camera mode entering step S100 described with reference to FIG. 3 and the steps S129 to S137 may correspond to the group camera mode operating step S300 described with reference to FIG. 3. In the following description, an embodiment of the present invention for making a video and then sending the made video to a counterpart terminal directly is described in detail with reference to FIGS. 13 and 14.

Figure 13:
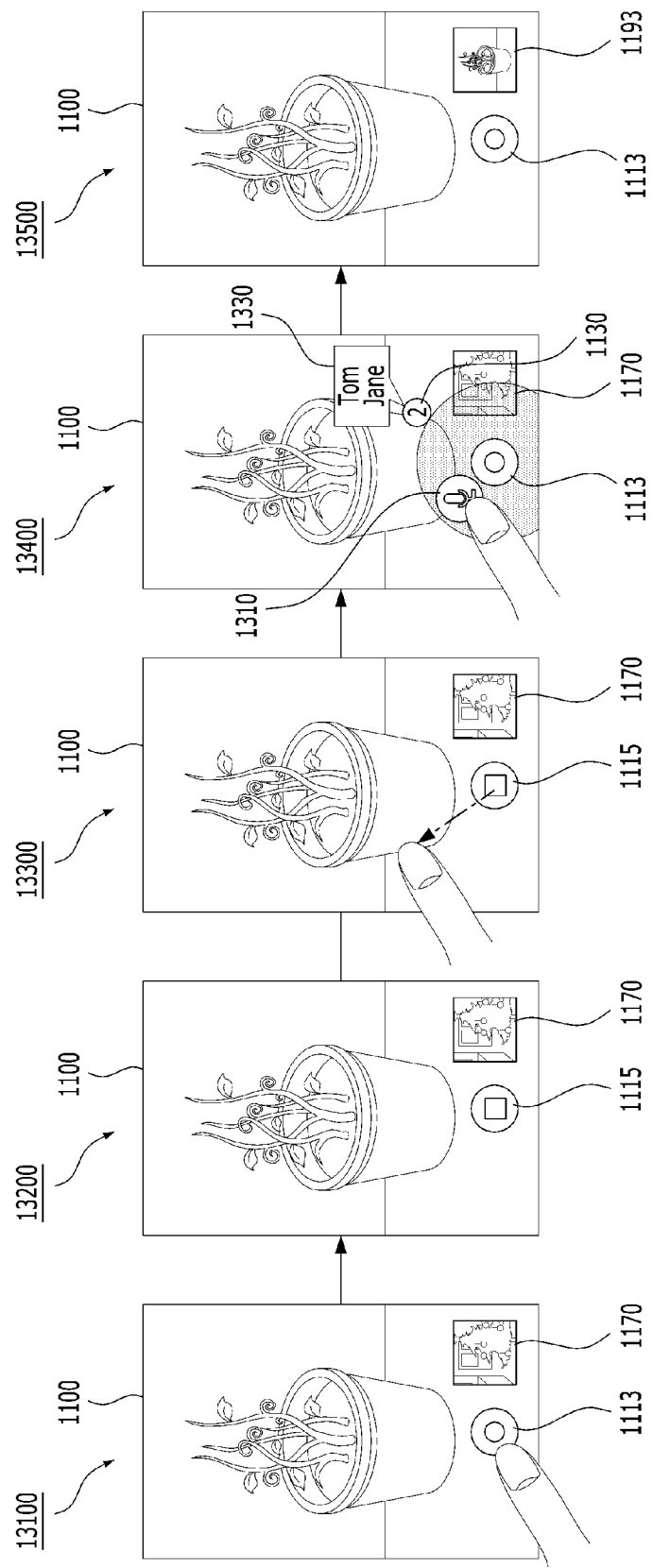
FIGS. 13 and 14 are display screen configurations illustrating a method of controlling a mobile terminal according to an embodiment of the present invention.
Figure 14:
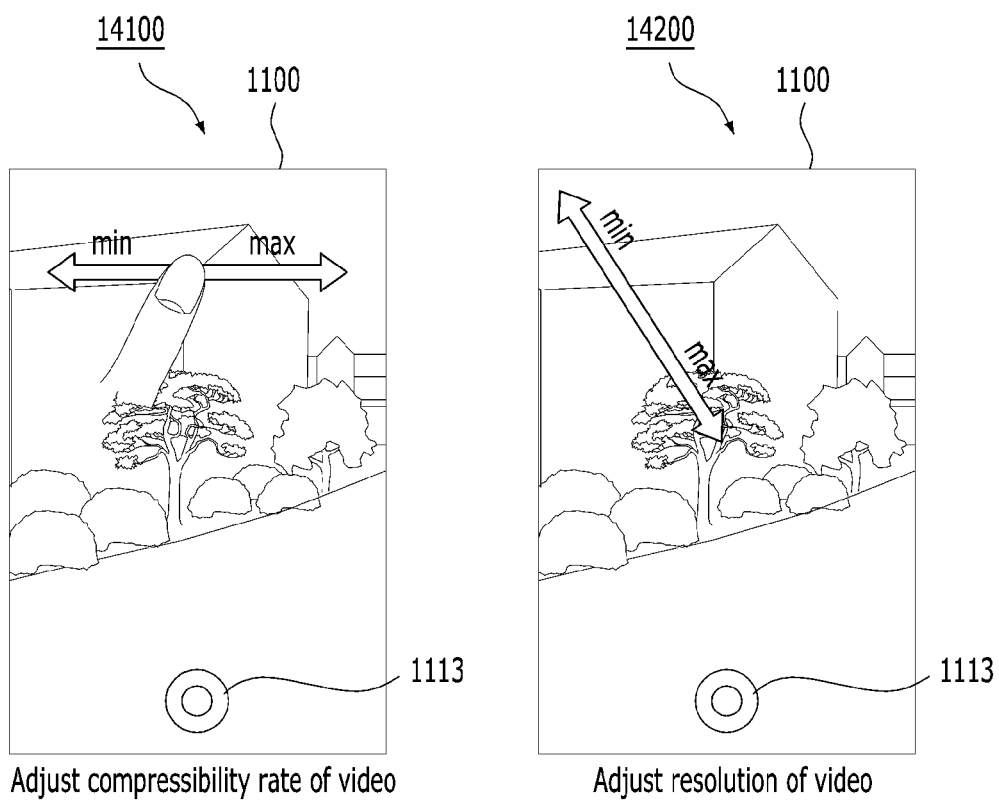

FIGS. 13 and 14 are display screen configurations illustrating a method of controlling a mobile terminal according to an embodiment of the present invention. Referring to the reference number 13100 shown in FIG. 13, the controller 180 can display a preview image 1100 for a video making on the touchscreen 151. In this instance, a video capturing start icon 1113 can be displayed on the preview image 1100. Further, a thumbnail (hereinafter named a first thumbnail) 1170 of a photo most recently taken in the mobile terminal 100 or a video most recently made in the mobile terminal 100 can be also displayed on the preview image 1100. It is not mandatory for the first thumbnail to be displayed. Referring to the reference number 13100 shown in FIG. 13, it can be observed that the mobile terminal 100 is in the normal camera mode for the video making.

If a simple touch is performed on the video capturing start icon 1113, referring to the example indicated by the reference number 13200 shown in FIG. 13, the controller 180 can start capturing the video. Further, the video capturing start icon 1113 is changed into a video capturing end icon 1115 and can be then displayed together with the preview image 1100. An indicator indicating that the video capturing is currently in progress can be separately displayed on the preview image 1100. Although the indicator is not displayed separately, a user can be aware that the video capturing is currently in progress by watching the displayed video capturing end icon 1115.

Further, referring to the reference number 13300 shown in FIG. 13, a second touch gesture can be performed by touching the video capturing end icon 1115 with a pointer and then dragging the pointer in an outer direction of the video capturing end icon 1115 by maintaining the corresponding touch. As mentioned in the foregoing description, the above-mentioned second touch gesture is just one example only, by which the second touch gesture is non-limited. By the second touch gesture, the mobile terminal 100 can be regarded as switched to the group camera mode from the normal camera mode.

Subsequently, referring to the reference number 1300 shown in FIG. 13, if the pointer is dragged in a prescribed distance or more, the controller 180 activates the microphone 122 and can also execute a voice recognition function. Further, the controller 180 can create and display a voice recognition icon 1310 indicating that the voice recognition function is executed. In this instance, the voice recognition icon 1310 can be created on any place on the touchscreen 151. Particularly, according to the example indicated by the reference number 13400 shown in FIG. 13, the voice recognition icon 1310 is displayed at a touched point of the dragged pointer.

Optionally, the voice recognition icon 1310 may not be displayed. Further, the controller 180 can end the video capturing at the timing point of touching the video capturing end icon 1115 with the pointer. As the video capturing is ended, referring to the example indicated by the reference number 13400 shown in FIG. 13, the video capturing end icon 1115 is changed into the video capturing start icon 1113 and the video capturing start icon 113 can be then displayed together with the preview image 1100.

If the voice recognition function is executed, the controller 180 can receive an input of a user voice through the activated microphone 122. If the input of the user voice is received, referring to the example indicated by the reference number 13400 shown in FIG. 13, the controller 180 searches for counterpart terminals corresponding to the input voice and can then create and display identifiers 1330 of the found counterpart terminals on the touchscreen 151. According to the example indicated by the reference number 13400 shown in FIG. 13, as a voice 'Tom' is input, an identifier 'Tom' of a first counterpart terminal corresponding to the input voice is displayed. Subsequently, as a voice 'Jane' is input, an identifier 'Jane' of a second counterpart terminal corresponding to the input voice is displayed. Moreover, on the preview image 1100, a counterpart terminal count indicator 1130 indicating the number of the counterpart terminals can be displayed.

After all the desired counterpart terminals have been found, if the touch is released, the controller 180 saves the made video in the memory 160 and can also send the made video to the found counterpart terminals, i.e., the first counterpart terminal and the second counterpart terminal. Subsequently, the controller 180 deactivates the microphone 122 and can end the execution of the voice recognition function. Alternatively, the controller 180 can save the video in the memory 160 in response to performance of the second touch gesture before releasing the touch, as described above.

Referring to the example indicated by the reference number 13500 shown in FIG. 13, as the made video is saved or sent, the controller 180 controls the voice recognition icon 1310, the count indicator 1130 and the identifiers 1330 of the counterpart terminals to disappear and can also display a thumbnail (hereinafter named a third thumbnail) 1193 of the made video on the touchscreen 151. According to the example indicated by the reference number 13500 shown in FIG. 13, as the first thumbnail 1170 disappears, the third thumbnail 1193 is displayed at the location of the disappearing first thumbnail 1170. Optionally, the third thumbnail 1193 may be displayed together with the first thumbnail 1170.

Referring to the reference number 13500 shown in FIG. 13, the mobile terminal 100 can be regarded as returning to the normal camera mode from the group camera mode. Meanwhile, before the video capturing is started, while the preview image 1100 for the video capturing is displayed, the controller 180 can adjust a compressibility rate and resolution of a video, which is to be made, in response to a touch gesture input to the touchscreen 151 by a user. This process is described in detail with reference to FIG. 14 as follows.

Referring to the example indicated by the reference number 14100 shown in FIG. 14, while a preview image 1100 for a video capturing is displayed, a third touch gesture may be input to the touchscreen 151. According to the example indicated by the reference number 14100 shown in FIG. 14, the third touch gesture includes a touch drag performed in parallel with a short side of a rectangular shape of the touchscreen 151, by which the third touch gesture is non-limited.

The controller 180 can raise the compressibility rate of a video to be made if a touch drag is performed in a prescribed direction along the short side. The controller 180 can also lower the compressibility rate of a video to be made if a touch drag is performed in a direction opposite to the prescribed direction along the short side.

Referring to the example indicated by the reference number 14200 shown in FIG. 14, while a preview image 1100 for a video capturing is displayed, a fourth touch gesture may be input to the touchscreen 151. According to the example indicated by the reference number 14200 shown in FIG. 14, the fourth touch gesture includes a touch drag performed in a diagonal direction of a rectangular shape of the touchscreen 151, by which the fourth touch gesture is non-limited.

The controller 180 can raise the compressibility rate of a video to be made if a touch drag is performed in a prescribed direction along the diagonal direction. The controller 180 can also lower the compressibility rate of a video to be made if a touch drag is performed in a direction opposite to the prescribed direction along the diagonal direction. In particular, while a preview image for making a video is displayed, it is convenient for a user to directly adjust a compressibility rate and resolution of a video, which is to be made in the future, in the preview image without entering a separate menu screen.

The video, which is to be made in the future, can be saved in the mobile terminal 100 and can be also sent to the counterpart terminals, in accordance with the adjusted compressibility rate and resolution. Alternatively, the video, which is to be made in the future, is saved in the mobile terminal 100 in accordance with a compressibility rate and resolution originally determined through menu settings of the camera of the mobile terminal and can be also sent to the counterpart terminals in accordance with the adjusted compressibility rate and resolution.

According to the above description, a counterpart terminal, which becomes a target for sending a taken photo thereto, is determined by a voice input applied after executing a camera application. In the following description, a different method of determining a counterpart terminal, which becomes a target for sending a taken photo thereto, are described in detail with reference to FIG. 15.

Figure 15:
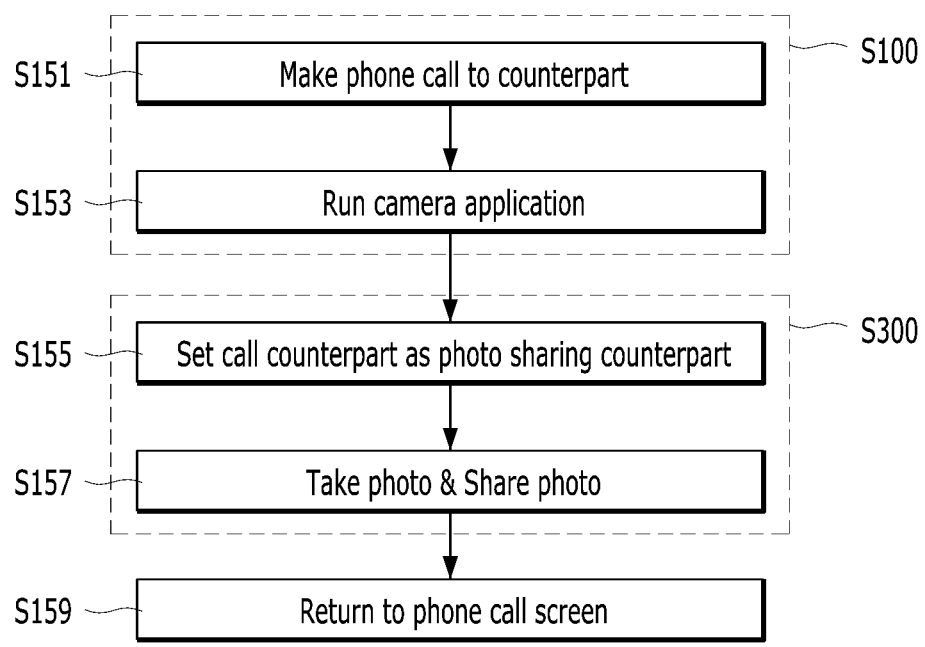
FIG. 15 is a flowchart illustrating a method of controlling a mobile terminal according to an embodiment of the present invention.

FIG. 15 is a flowchart illustrating a method of controlling a mobile terminal according to an embodiment of the present invention. Referring to FIG. 15, the mobile terminal 100 can make a phone call to a counterpart terminal currently (S151). As the phone call is currently made, a screen for the phone call can be displayed on the touchscreen 180 of the mobile terminal 100.

In this instance, the phone call may conceptually include one of a general phone call (that is, a voice phone call), a general video call, a conference voice or video call, and the like. When the general phone call or the general video call, there may exist a single counterpart terminal of the phone call. For the conference call, there may exist a plurality of counterpart terminals of the phone call. Since it is apparent to those skilled in the art that the mobile terminal can make a phone call to the counterpart terminal, details of the phone call are omitted for clarity of the present specification.

While the mobile terminal 100 is making a phone call to the counterpart terminal, the controller 180 can execute the camera application in response to a user's request (S153). In particular, the camera application can be executed while the phone call to the counterpart terminal is maintained. As the camera application is executed, a screen for the phone call can be switched to a preview image on the touchscreen 180. In response to the camera application executing by maintaining the phone call to the counterpart terminal, the controller 180 can set the counterpart terminal of the phone call as a target to which a photo to be taken in the future will be sent (S155). When a plurality of counterpart terminals of the phone call exist, all of the counterpart terminals can be set as targets to which a photo to be taken in the future will be sent.

Subsequently, a photo/video can be taken/made through the executed camera application in the mobile terminal 100 (S157). If so, the controller 180 saves the taken photo in the memory 160 and can also send the taken photo to the set counterpart terminal (S159). Having sent the taken photo, the controller 180 can control the preview image to be automatically switched to the phone call screen on the touchscreen 180.

Further, with reference to FIG. 15, the step S151 and the step S153 may correspond to the group camera mode entering step S100 described with reference to FIG. 3 and the step S155 and the step S157 may correspond to the group camera mode operating step S300 described with reference to FIG. 3.

Figure 16:
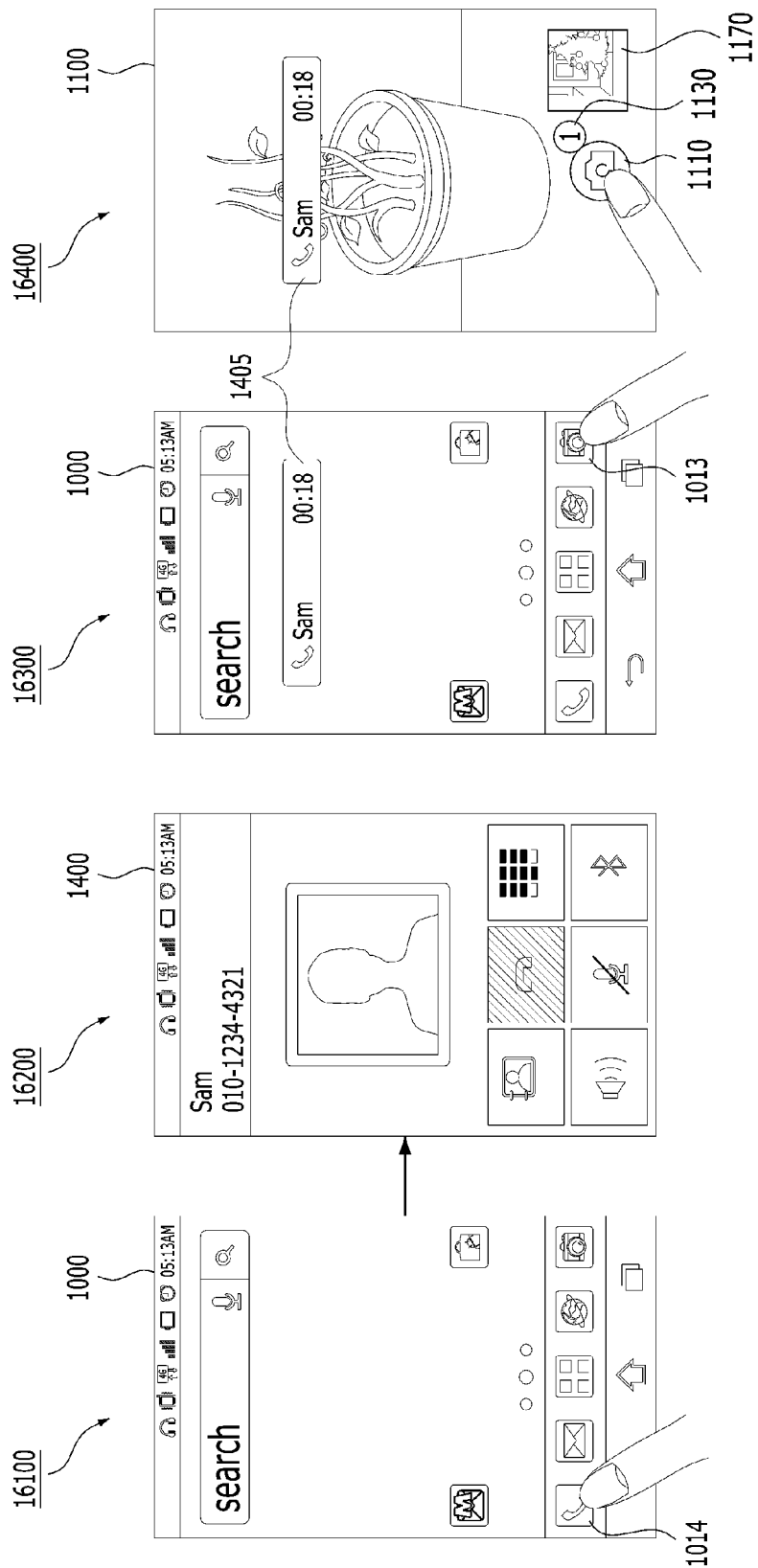
FIG. 16 is a display screen configuration illustrating a method of controlling a mobile terminal according to an embodiment of the present invention.

A method of taking a photo during a phone call and then sending the taken photo to a counterpart terminal directly according to an embodiment of the present invention is described in detail with reference to FIG. 16 as follows. FIG. 16 is a display screen configuration illustrating a method of controlling a mobile terminal according to an embodiment of the present invention.

Referring to the example indicated by the reference number 16100 shown in FIG. 16, a home screen 1000 can be displayed on the touchscreen 151 of the mobile terminal 100. Further, a phone call icon 1014 can be displayed on the home screen. As the phone call icon 1014 is touched, if a desired phone call counterpart terminal is selected, the controller 180 can control a phone call to be made to the counterpart terminal. As the phone call is made, referring to the example indicated by the reference number 16200 shown in FIG. 16, the controller 180 can display the phone call screen 1400 on the touchscreen 151.

Subsequently, while the mobile terminal 100 is making the phone call to the counterpart terminal, referring to the example indicated by the reference number 16300 shown in FIG. 16, the controller 180 can display the home screen 1000 on the touchscreen 151 again in response to a user's request. Further, a phone call indicator 1405 indicating that the phone call is in progress can be displayed on the home screen 1000.

If a camera application icon 1013 is touched and selected from the home screen 1000, the controller 180 executes the camera application by maintaining the phone call and can display a preview image 1100, as indicated by the reference number 16400 shown in FIG. 16, on the touchscreen 151 instead of the home screen 1000. The controller 180 can display the phone call indicator 1405 on the preview image 1100 so as to indicate that the phone call is in progress. Optionally, the phone call indicator 1405 may not be displayed on the preview image 1100.

Since a photo taking icon 1110, a counterpart terminal count indicator 1130 and a thumbnail 1170, which are displayed on the preview image 1100, have been described already, their details are omitted from the following description. The controller 180 sets the phone call counterpart terminal as a counterpart terminal, to which a captured image will be sent, and can also executed the camera application. Hence, the mobile terminal 100 can be understood as entering a group camera mode as soon as the camera application is run.

If a simple touch is applied to the photo taking icon 1110, the controller 180 takes a photo of the preview image at the timing point of applying the simple touch, saves the captured image in the memory 160, and can send the captured image to the counterpart terminal. Once the preview image is sent to the counterpart terminal, the controller 180 can control the preview image 1100 to be automatically switched to the phone call screen 1400 on the touchscreen 151. Alternatively, once the preview image is sent to the counterpart terminal, the controller 180 can control the preview image 1100 to keep being displayed on the touchscreen 151 until a separate user command for switching the preview image 1100 to the phone call screen 1400 is input. As mentioned in the foregoing description, the counterpart terminal count indicator 1130 and the thumbnail of the captured image, which was sent, can continue to be displayed on the preview image 1100.

According to the above description, a captured image is sent to a counterpart terminal during a phone call. Further, a method of sending an image of an internet browser to a counterpart during a phone call is described in detail with reference to FIG. 17 as follows. In particular, FIG. 17 is a flowchart illustrating a method of controlling a mobile terminal according to an embodiment of the present invention.

Figure 17:
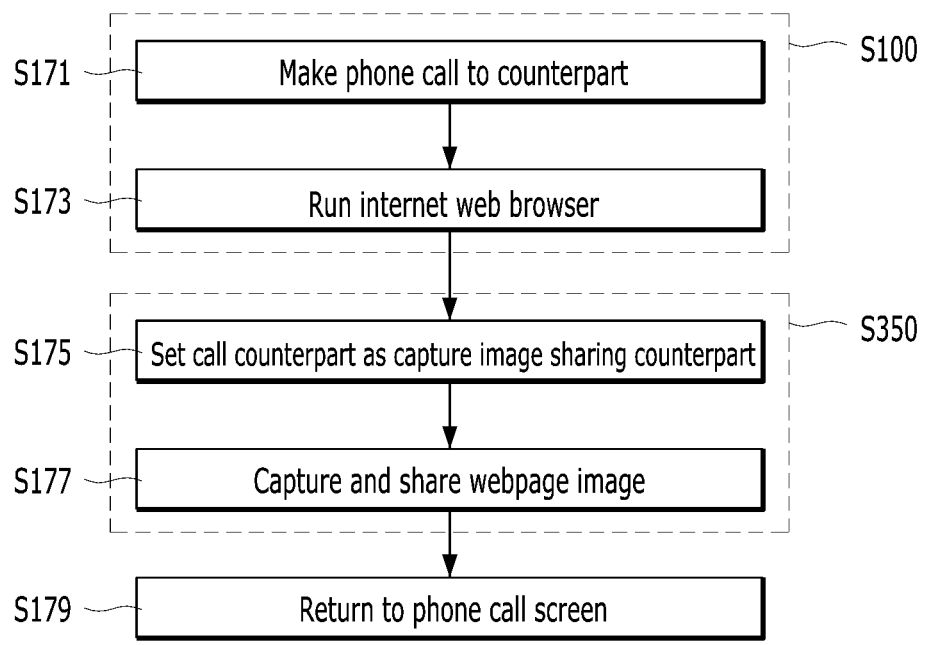
FIG. 17 is a flowchart illustrating a method of controlling a mobile terminal according to an embodiment of the present invention.

Referring to FIG. 17, the mobile terminal 100 can make a phone call to a counterpart terminal (S171). As the phone call is made, a screen for the phone call can be displayed on the touchscreen 180 of the mobile terminal 100. While the mobile terminal 100 is making a phone call to the counterpart terminal, the controller 180 can execute an internet web browser in response to a user's request (S173). In particular, the internet web browser can be executed while the phone call to the counterpart terminal is maintained.

As the internet web browser is executed, the screen for the phone call can be switched to an internet web browser image on the touchscreen 180. In response to a user request, the mobile terminal 100 can display a desired webpage as the internet web browser image through the internet web browser. In response to the internet web browser executing by maintaining the phone call to the counterpart terminal, the controller 180 can set the counterpart terminal of the phone call as a target to which an image to be captured from the webpage in the future will be sent (S175). When a plurality of counterpart terminals of the phone call exist, all of the counterpart terminals can be set as targets to which an image to be captured in the future will be sent.

Subsequently, a desired image of a webpage displayed in the executed internet web browser can be captured in the mobile terminal 100 (S177). If so, the controller 180 sends the captured image to the set counterpart terminal (S179). When the captured image is sent to the set counterpart terminal, it may be saved in the memory 160 of the mobile terminal 170.

Having sent the captured image, the controller 180 can control the internet browser image to be automatically switched to the phone call screen on the touchscreen. Alternatively, once the captured image is sent to the counterpart terminal, the controller 180 can control the internet browser image to keep being displayed on the touchscreen 151 until a separate user command for switching the internet browser image to the phone call screen is input.

With reference to FIG. 17, the step S171 and the step S173 configure a group image sharing mode entering step and may correspond to the group camera mode entering step S100 described with reference to FIG. 3. The step S175 and the step S177 configure a group image sharing mode operating step and may correspond to the group camera mode operating step S300 described with reference to FIG. 3.

The aforementioned method of directly sending the image of the internet web browser to the counterpart terminal during the phone call according to an embodiment of the present invention is described in detail with reference to FIG. 18 as follows. In particular, FIG. 18 is a display screen configuration illustrating a method of controlling a mobile terminal according to an embodiment of the present invention.

Figure 18:
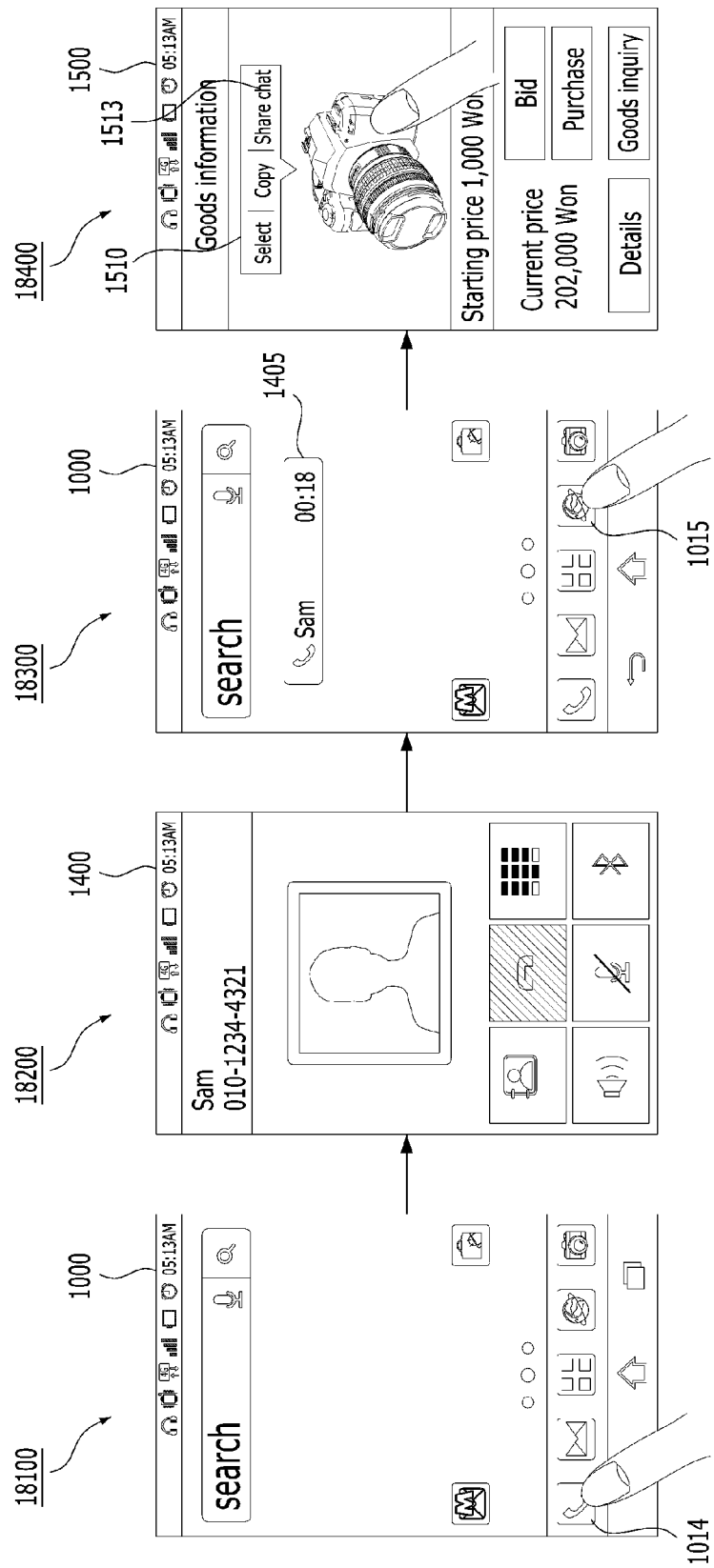
FIG. 18 is a display screen configuration illustrating a method of controlling a mobile terminal according to an embodiment of the present invention.

Referring to the example indicated by the reference number 18100 shown in FIG. 18, a home screen 1000 can be displayed on the touchscreen 151 of the mobile terminal 100. Further, a phone call icon 1014 can be displayed on the home screen. As the phone call icon 1014 is touched, if a desired phone call counterpart terminal is selected, the controller 180 can control a phone call to be made to the counterpart terminal.

As the phone call is made, referring to the example indicated by the reference number 18200 shown in FIG. 18, the controller 180 can control a phone call screen 1400 to be displayed on the touchscreen 151. Subsequently, while the mobile terminal 100 is making the phone call to the counterpart terminal, referring to the example indicated by the reference number 18300 shown in FIG. 18, the controller 180 can display the home screen 1000 on the touchscreen 151 again in response to a user's request. Further, a phone call indicator 1405 indicating that the phone call is in progress can be displayed on the home screen 1000.

If an internet web browser icon 1015 is touched and selected from the home screen 1000, the controller 180 runs the internet web browser by maintaining the phone call and can control an internet web browser image 1500, as indicated by the reference number 18400 shown in FIG. 18, to be displayed on the touchscreen 151 instead of the home screen 1000. The controller 180 can display the phone call indicator 1405 on the internet web browser image 1500 so as to indicate that the phone call is in progress.

In response to a user request, the mobile terminal 100 can display a desired webpage as the internet web browser image 1500 through the executed internet web browser. When the prescribed webpage is displayed on the touchscreen 151, if a desired image of the desired webpage is long touched, referring to the example indicated by the reference number 18400 shown in FIG. 18, the controller 180 can display a menu window 1510, which is provided to utilize the desired image, on the touchscreen 151.

If a menu 1513 for sharing the desired image is selected from the menu window 1510 by a simple touch, the controller 180 captures the desired image and can send the captured image to the counterpart terminal. When the captured image is sent to the set counterpart terminal, it may be saved in the memory 160 of the mobile terminal 100.

After sending the captured image, the controller 180 can control the internet web browser image to be automatically switched to the phone call screen on the touchscreen 151. Alternatively, once the captured image is sent to the counterpart terminal, the controller 180 can control the internet browser image to keep being displayed on the touchscreen 151 until a separate user command for switching the internet browser image to the phone call screen is input, as described above.

According to the above description, if a prescribed application is executed during a phone call, a result or output of the executed application is sent to a counterpart of the phone call. This is not limited to a camera application and an internet web browser. For instance, if an audio play application is executed during a phone call, a played audio may be sent to a counterpart terminal by real time during the phone call. According to the foregoing description, a counterpart of a phone call is determined as an interworking implementation target of a prescribed application (e.g., a camera application, an internet web browser application, etc.).

A different method of determining a counterpart terminal as an interworking implementation target (or, simply an interworking or cooperating target) of a prescribed application is described in detail with reference to FIG. 19. In particular, FIG. 19 is a flowchart illustrating a method of controlling a mobile terminal according to an embodiment of the present invention.

Figure 19:
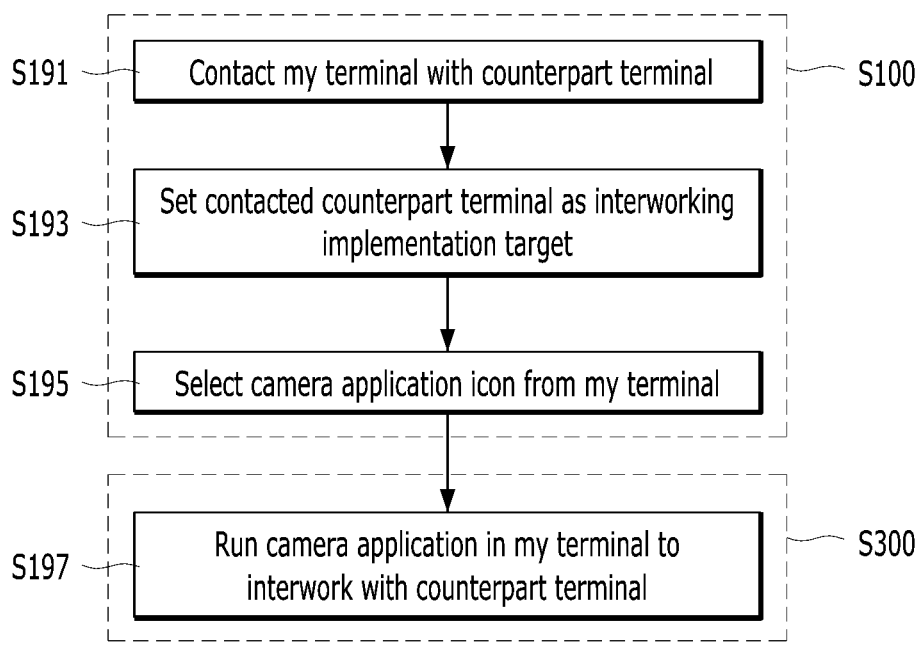
FIG. 19 is a flowchart illustrating a method of controlling a mobile terminal according to an embodiment of the present invention.

Referring to FIG. 19, the mobile terminal 100 may physically contact (or impact) a counterpart terminal. Alternatively, the mobile terminal 100 and the counterpart terminal are gripped with a user's hand and may be then shaken together a predetermined number of times and/or for a predetermined time (S191). If so, each of the mobile terminal 100 and the counterpart terminal can sense a prescribed vibration value depending on the physical impact or the physical shaking The mobile terminal 100 recognizes that a vibration with a magnitude equal to that of the vibration sensed by the counterpart terminal is sensed simultaneously and can then set the counterpart terminal as an interworking implementation target of a prescribed application (S193).

Moreover, the counterpart terminal recognizes that the vibration with the magnitude equal to that of the vibration sensed by the mobile terminal 100 is sensed simultaneously within a prescribed time interval and can then set the mobile terminal as the interworking implementation target. In particular, the mobile terminal 100 and the counterpart terminal can mutually recognize each other as the interworking implementation targets. This principle is identically applicable to at least two or more counterpart terminals. In particular, the mobile terminal 100 and the at least two counterpart terminals (e.g., 3 terminals or more) can mutually recognize one another as the interworking implementation targets. In this instance, the mobile terminal 100 and the at least one counterpart terminal, which recognize each other as the interworking implementation targets, can be understood as grouped together.

A camera application icon may be selected from the mobile terminal 100 for example (S195). If so, the mobile terminal 100 can control a camera application to be executed by interworking (or cooperating) with the counterpart terminal (S197). In addition, with reference to FIG. 19, the steps S191 to S195 may correspond to the group camera mode entering step S100 described with reference to FIG. 3 and the step S197 may correspond to the group camera mode operating step S300 described with reference to FIG. 3.

In the following description, a process for grouping a plurality of terminals (e.g., a mobile terminal and at least one or more counterpart terminals) is explained in detail. First of all, each of a plurality of the terminals can sense a vibration value attributed to a physical movement such as a contact, an impact, a shaking, or the like. If so, a prescribed one of a plurality of the terminals becomes a master terminal and can then broadcast the sensed vibration value with a terminal identifier of its own. A reference for selecting the master terminal from a plurality of the terminals is described as follows. First of all, wireless communication connection (e.g., Bluetooth, etc.) has been already established among a plurality of the terminals. Secondly, priorities are given to a plurality of the terminals in advance, respectively. Thirdly, a terminal having the highest priority among the terminals can become the master terminal.

Another terminal becomes a slave terminal and then receives a broadcasted signal. If the received signal indicates the same vibration value sensed by the slave terminal, the slave terminal can transmit its identifier to the master terminal. The master terminal gathers the slave terminals having responded to the broadcasted signal, groups the gathered slave terminals, and then delivers the grouping information to each of the slave terminals. Hence, a plurality of the terminals can recognize that they are grouped together.

According to the above description, a plurality of terminals are grouped together for the mutual interworking implementation of the camera application, by which the present embodiment is non-limited. A plurality of terminals can be grouped together by the above-described method for the mutual interworking implementation of other applications.

In the following description, the aforementioned grouping for the mutual interworking implementation of a prescribed application of a plurality of the terminals are described in detail with reference to FIGS. 20 and 21. In the following description, assume that the application for the mutual interworking implementation includes a camera application.

FIG. 20 is a diagram to illustrate the physical contact between at least two terminals. Further, FIG. 21 is a display screen configuration illustrating a method of controlling a mobile terminal according to an embodiment of the present invention. Referring to the example indicated by the reference number 21100 shown in FIG. 21, the controller 180 can display a first icon 1013 of the camera application on the home screen 1000. In this instance, the first icon 1013 may be an icon for executing the camera application in the normal camera mode when applying a simple touch to the corresponding icon.

Subsequently, the mobile terminal 100, as shown in FIG. 20, can physically contact a first counterpart terminal 200. Alternatively, the mobile terminal 100 may physically contact the first counterpart terminal 200 and a second counterpart terminal 300 at the same time or within a prescribed time interval in sequence. In the following description, assume that the mobile terminal 100 physically contacts the first counterpart terminal 200 and the second counterpart terminal 300.

Figure 21:
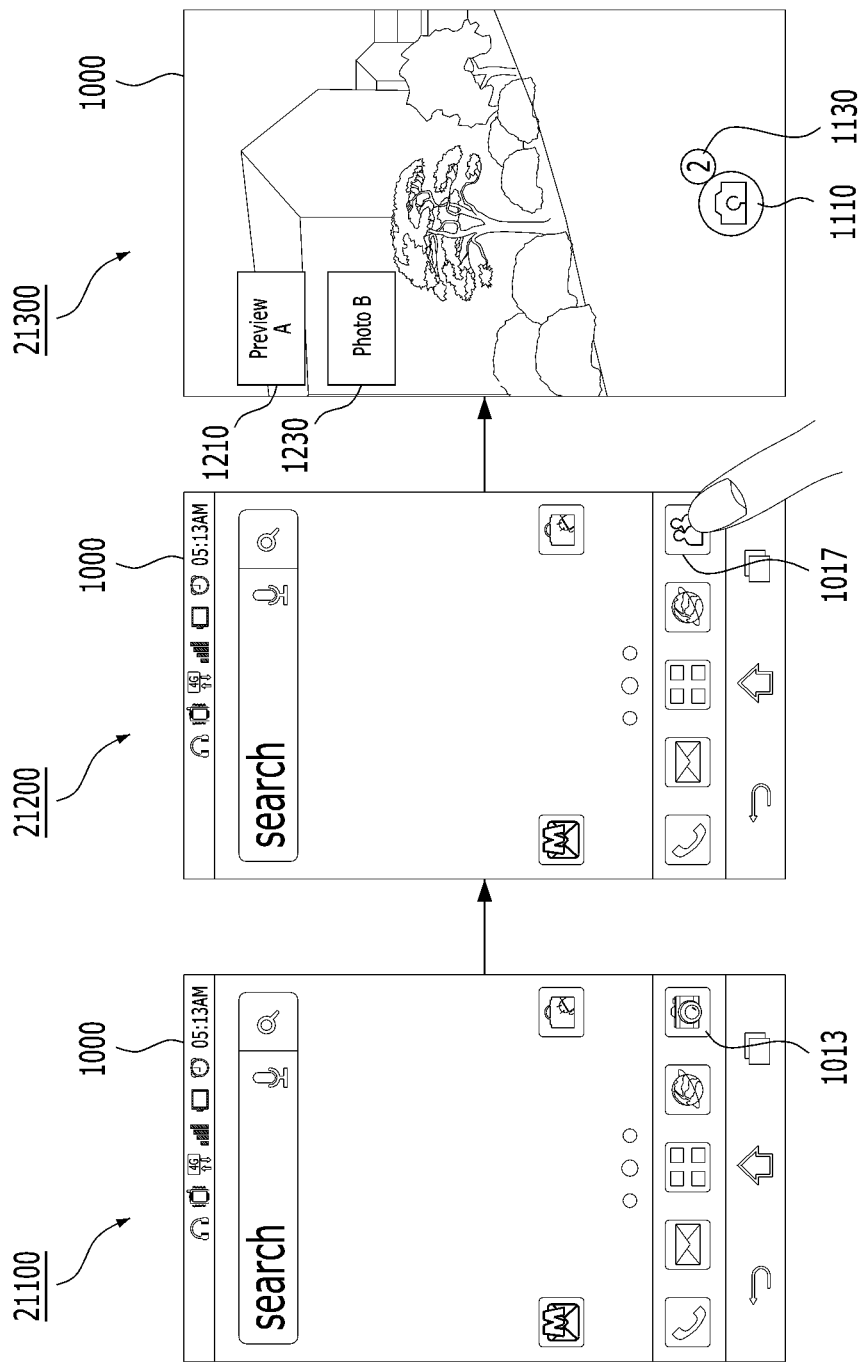
FIG. 21 is a display screen configuration illustrating a method of controlling a mobile terminal according to an embodiment of the present invention.

If so, referring to the example indicated by the reference number 21200 shown in FIG. 21, the controller 180 can display a second icon 1017 of the camera application on the home screen 1000 instead of the first icon 1013. In this instance, the second icon 1017 may be an icon for executing the camera application in the group camera mode when applying a simple touch to the corresponding icon.

According to the example shown in FIG. 21, after the physical contact, the second icon 1017 is displayed instead of the first icon 1013, by which the present embodiment is non-limited. For instance, after the physical contact, the second icon 1017 can be displayed together with the first icon 1013. When the second icon 1017 is displayed instead of the first icon 1013, the controller 180 can control the second icon 1017 to disappear and can also control the first icon 1013 to be displayed again, in response to a user's prescribed touch gesture. For instance, the prescribed touch gesture may include a long touch performed on the second icon 1017.

If a simple touch is applied to the second icon 1017, referring to the example indicated by the reference number 21300 shown in FIG. 21, the controller 180 executes the camera application in the group camera mode and can control a preview image 1000 to be displayed on the touchscreen 151. If a photo taking icon 1110 is touched and selected from the preview image 1100, as mentioned in the foregoing description, a photo of the preview image 1100 is captured and the captured image can be sent to the first counterpart terminal and the second counterpart terminal. This is already described and its details are omitted for clarity of the present specification.

After the camera application has stopped being executed in the mobile terminal 100, although the home screen 1000 is displayed on the touchscreen 151, the controller 180 can control the second icon 1017 to be still displayed. Further, the controller 180 can control a shape of the second icon 1017 to be changed into a thumbnail of the photo most recently taken in the group camera mode. Alternatively, after the camera application has stopped being executed in the mobile terminal 100, when the home screen 1000 is displayed on the touchscreen 151, the controller 180 changes second icon 1017 into the first icon 1013 and can control the first icon 1013 to be displayed.

This may apply to other embodiments disclosed in the present specification. In particular, after taking the photo in the group camera mode in the group camera mode operating step S300 in the mobile terminal 100, if the home screen 1000 is displayed on the touchscreen 151, the controller 180 can control the second icon 1017 to continue to be displayed. Alternatively, after taking the photo in the group camera mode in the group camera mode operating step S300 in the mobile terminal 100, if the home screen 1000 is displayed on the touchscreen 151, the controller 180 changes second icon 1017 into the first icon 1013 and can control the first icon 1013 to be displayed.

According to the above description, it is assumed that the application for the mutual interworking implementation includes the camera application, by which the embodiments of the present invention are non-limited. For instance, the application for the mutual interworking implementation may include an audio play application. Hence, after a plurality of the terminals have been grouped, if the audio play application is executed in the mobile terminal, a played audio may be transmitted to a first counterpart terminal and a second counterpart terminal in real time or with a prescribed time difference.

According to the above description, after a grouping has been performed through physical movements among a plurality of terminals, an application is selected for the mutual interworking implementation, by which the embodiment of the present invention is non-limited. For instance, after an application for the mutual interworking implementation has been selected (or while the application for the mutual interworking implementation is being selected), the grouping may be performed through the physical movements among a plurality of the terminals. This is described in detail with reference to FIG. 22 as follows.

Figure 22:
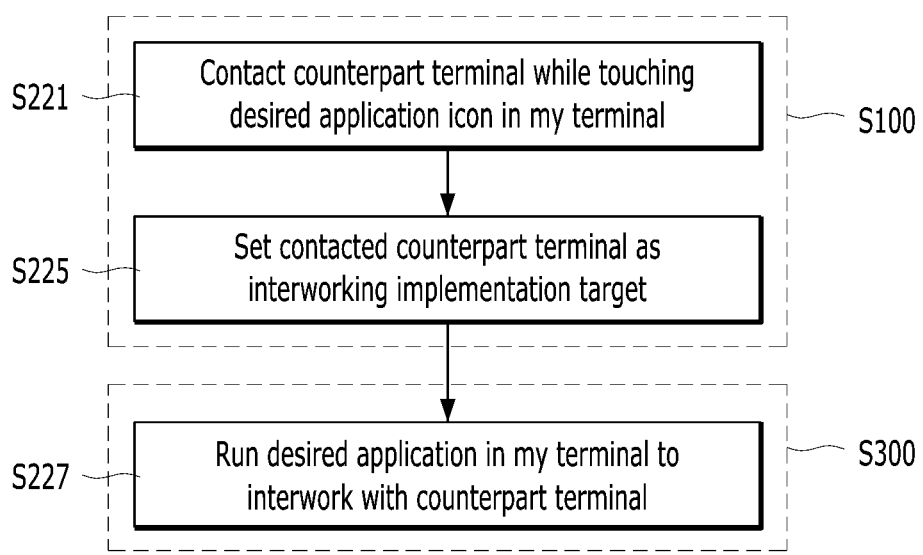
FIG. 22 is a flowchart illustrating a method of controlling a mobile terminal according to an embodiment of the present invention.

FIG. 22 is a flowchart illustrating a method of controlling a mobile terminal according to an embodiment of the present invention. Referring to FIG. 22, while or after an icon for executing a prescribed application displayed on the touchscreen 151 of the mobile terminal 100 is touched, the mobile terminal 100 may physically contact at least one counterpart terminal or may be shaken together with the at least one counterpart terminal. Since the physical contact and shaking are mentioned in the foregoing description, their details are omitted from the following description.

If so, the controller 180 controls the mobile terminal 100 to be grouped with the at least one counterpart terminal for the mutual interworking implementation and can also control an application corresponding to the touched icon to be run. Since the grouping with the at least one counterpart terminal is mentioned in the foregoing description, its details are omitted from the following description.

In particular, the physical contact or shaking enables both of the grouping step S225 and the application executing step S227 to be performed. FIG. 22 shows that the application executing step S227 is performed after the grouping step S225, by which the present embodiment is non-limited. For instance, both of the grouping step S225 and the application executing step S227 can be performed simultaneously. In another instance, after the application executing step S227, the grouping step S225 may be performed.

With reference to FIG. 22, the step S221 and the step S225 may correspond to the group camera mode entering step S100 described with reference to FIG. 3 and the step S227 may correspond to the group camera mode operating step S300 described with reference to FIG. 3. The aforementioned grouping for the mutual interworking implementation of a prescribed application of a plurality of the terminals are further described in detail with reference to FIGS. 23 and 24 as follows.

FIG. 23 is a diagram to illustrate the physical contact between at least two terminals. Further, FIG. 24 is a display screen configuration illustrating a method of controlling a mobile terminal according to an embodiment of the present invention.

Figure 24:
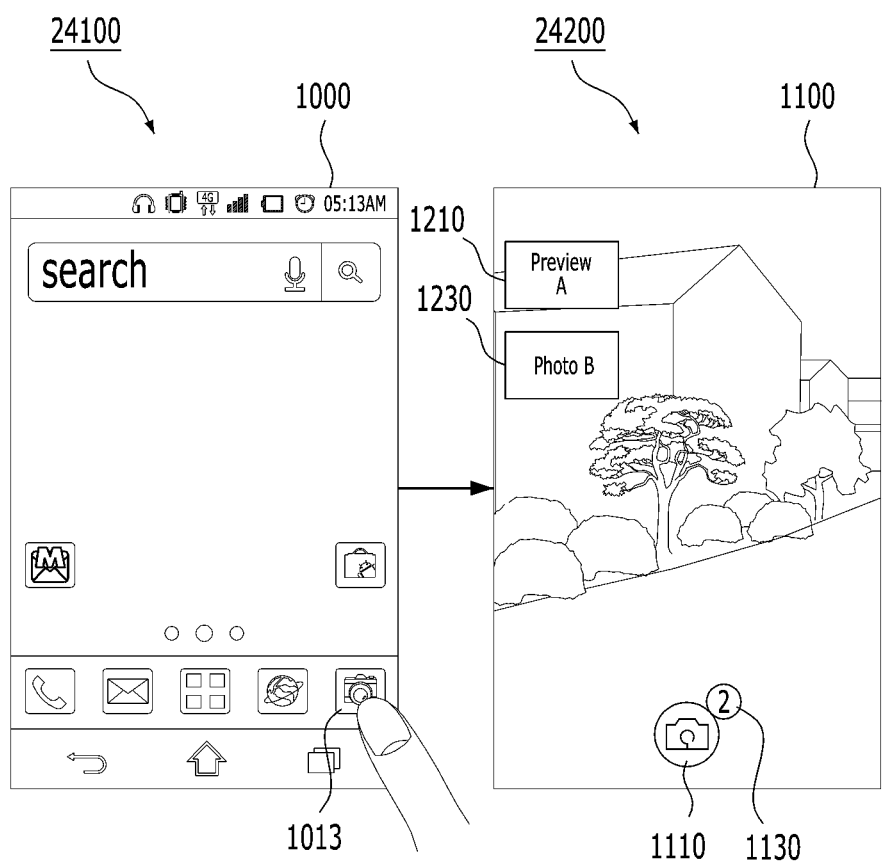
FIG. 24 is a display screen configuration illustrating a method of controlling a mobile terminal according to an embodiment of the present invention.

Referring to the example indicated by the reference number 24100 shown in FIG. 24, the controller 180 can display a camera application icon 1013 on a home screen 1000. Subsequently, referring to FIG. 23, while a user touches the camera application icon 1013, the mobile terminal 100 can physically contact a first counterpart terminal 200. Alternatively, the mobile terminal 100 may physically contact the first counterpart terminal 200 and a second counterpart terminal 300 at the same time or within a prescribed time interval in sequence. In the following description, assume that the mobile terminal 100 physically contacts the first counterpart terminal 200 and the second counterpart terminal 300.

If so, referring to the example indicated by the reference number 24200 shown in FIG. 24, the controller 180 executes the camera application in the group camera mode and can control a preview image 1100 to be displayed on the touchscreen 151. In particular, if the camera application icon 1013 of the mobile terminal 100 is touched and the mobile terminal 100 physically contacts counterpart terminal(s), the grouping of the mobile terminal 100 and the counterpart terminal(s) and the execution of the camera application in the group camera mode can be performed collectively.

If a photo taking icon 1110 is touched and selected from the preview image 1100, as mentioned in the foregoing description, a photo of the preview image 1100 is taken and the captured image can be sent to the first counterpart terminal and the second counterpart terminal. So, the corresponding details are omitted for clarity of the present specification.

According to the above description, a photo taken in the mobile terminal 100 is saved in the mobile terminal 100 and is also sent to counterpart terminal(s). Although the photo is sent to the counterpart terminal, it is not necessary for the photo (or a corresponding image quality) saved in the mobile terminal 100 to be exactly saved in the counterpart terminal(s). This is further described in detail with reference to FIGS. 25 and 26 as follows.

Figure 25:
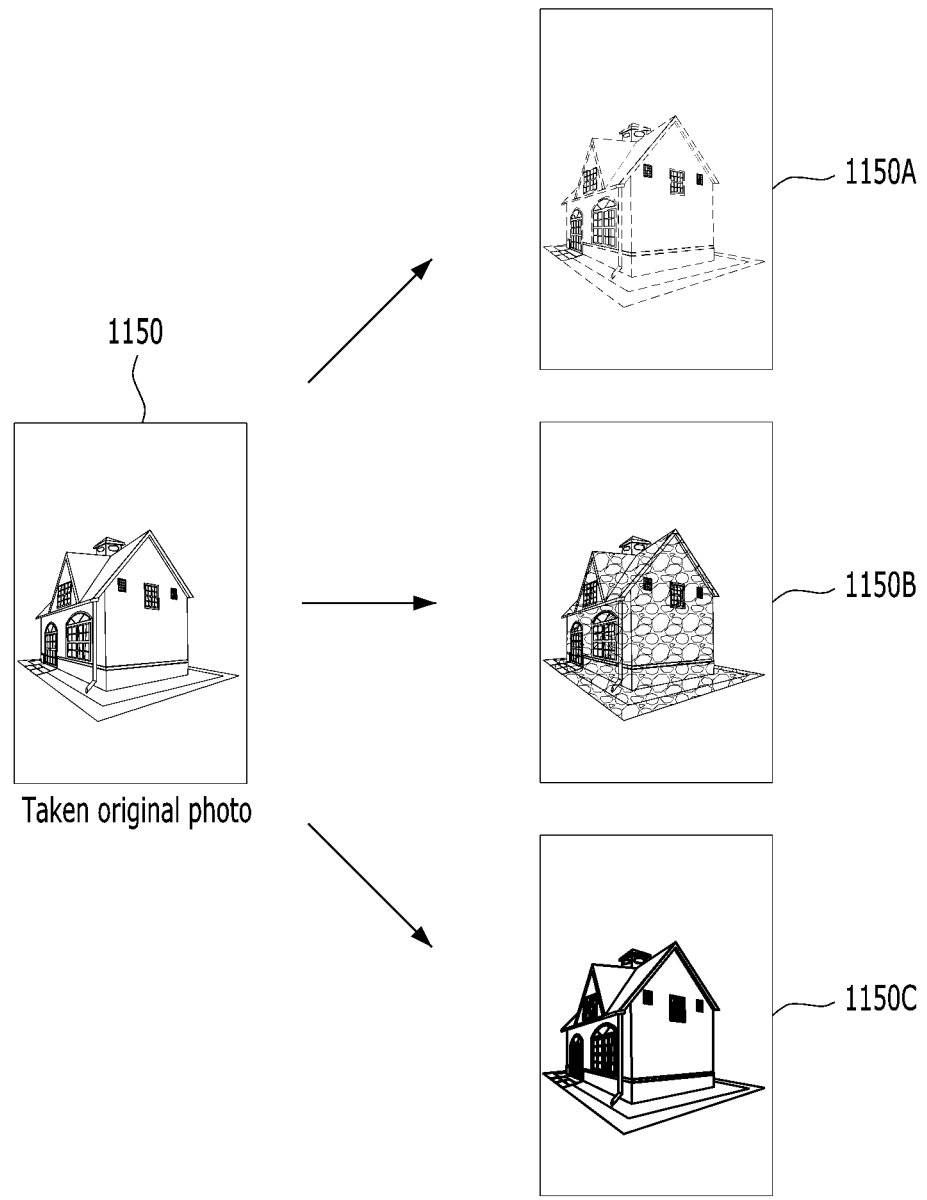
FIGS. 25 and 26 are diagrams of a photo saved by a method of controlling a mobile terminal according to an embodiment of the present invention.
Figure 26:
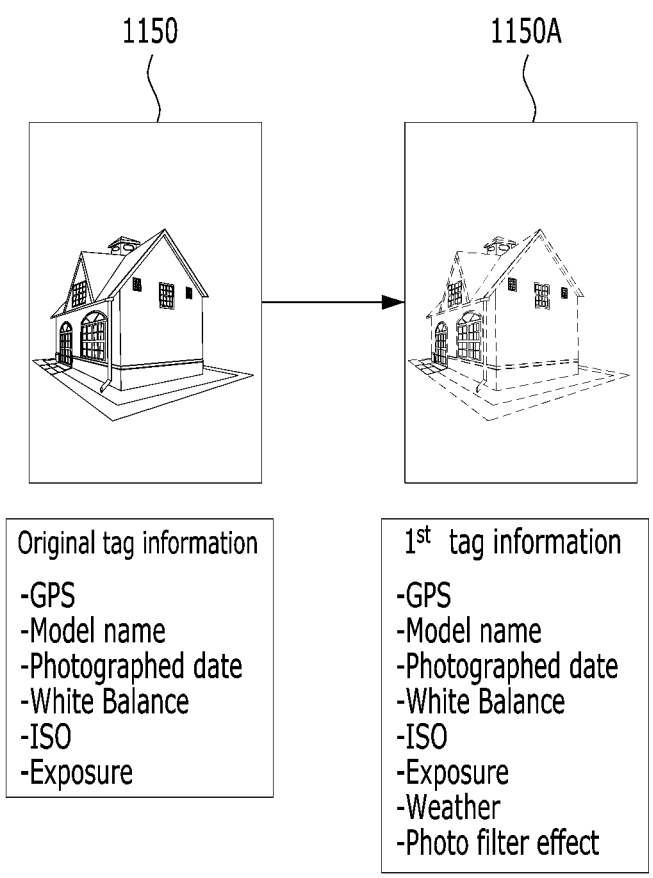

FIGS. 25 and 26 are diagrams of a photo saved by a method of controlling a mobile terminal according to an embodiment of the present invention. Referring to FIG. 25, a photo (hereinafter named an original photo) 1150 taken and saved in the mobile terminal 100 can be sent to a first counterpart terminal 200, a second counterpart terminal 300 and a third counterpart terminal 400.

If the first counterpart terminal 200 receives the original photo 1150, the first counterpart terminal 200 can save the received original photo 1150 as it is. Optionally, the first counterpart terminal 200 corrects an image quality of the received photo 1150 and can then save the corrected photo. For instance, when the controller 180 sends the original photo to the first counterpart terminal 200, the second counterpart terminal 300 and the third counterpart terminal 400, the controller 180 can send a tag information (hereinafter named an original tag information) together with the original photo. In this instance, the tag information may include the setting information (e.g., a filter effect information (e.g., clyde, Avenue, Hass, Arizona, Keylime, etc.), a white balance information, a speed (ISO) information, an exposure information, a shutter speed information, etc.) applied to a camera for a photo taking If so, the first counterpart terminal 200 receives the original photo 1150 and the original tag information and can then compare the received original tag information to a first tag information applied to a camera of the first counterpart terminal 200. If the received original tag information is different from the first tag information, the first counterpart terminal 200 corrects the received original photo to fit the first tag information and can then save the corrected photo 1150A.

The above-mentioned principle is applicable to the second counterpart terminal 300 and the third counterpart terminal

400. In particular, the second counterpart terminal 300 corrects the received original photo to fit a second tag information applied to a camera of the second counterpart terminal 300 and can then save the corrected photo 1150B. In particular, the third counterpart terminal 400 corrects the received original photo to fit a third tag information applied to a camera of the third counterpart terminal 400 and can then save the corrected photo 1150C.

The counterpart terminal(s) having saved the received photo corrected to fit the tag information applied to the corresponding counterpart terminal can correct and save a tag information of the saved photo. This is described in detail with reference to FIG. 26 as follows. For clarity of the following description, the first counterpart terminal 200 is taken as an example only.

Referring to FIG. 26, an original photo 1150 taken and saved in the mobile terminal 100 and an original tag information related to the original photo can be sent to a first counterpart terminal 200. If so, when the first counterpart terminal 200 saves the received original photo by correcting the received original photo to fit a first tag information, the first counterpart terminal 200 can save the first tag information as well.

If the original tag information and the first tag information are compared to each other, first partial information in the first tag information may be exactly identical to the corresponding information in the original tag information. For instance, the first partial information may include a GPS, a photo taking camera model name, a photo taken date, and the like.

Second partial information in the first tag information may be saved by correcting the corresponding information in the original tag information. For instance, the corrected information may include a white balance information, a speed information, an exposure information, and the like. Further, third partial information in the first tag information may not be included in the original tag information. For instance, the third partial information may include a weather of a photo taken date, a filter effect, and the like.

According to the above description, the mobile terminal 100 sends a photo taken in the group camera mode to the counterpart terminal(s), by which the present embodiment is non-limited. For instance, the mobile terminal 100 receives a photo from the counterpart terminal in the group camera mode and may be then able to save the received photo. This is described in detail with reference to FIG. 27 as follows.

Figure 27:
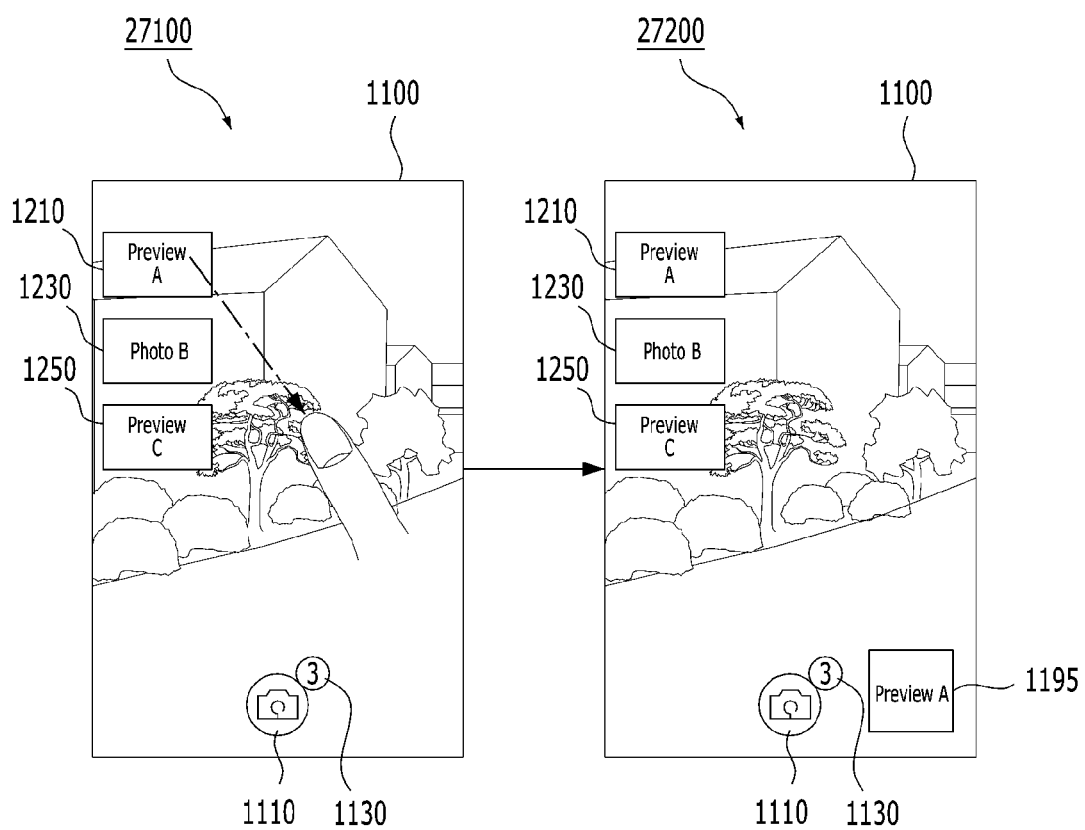
FIG. 27 is a display screen configuration illustrating a method of controlling a mobile terminal according to an embodiment of the present invention.

FIG. 27 is a display screen configuration illustrating a method of controlling a mobile terminal according to an embodiment of the present invention. As mentioned in the foregoing description, a camera application is currently executed in the group camera mode and the mobile terminal 100 can be grouped with a first counterpart terminal 200, a second counterpart terminal 300 and a third counterpart terminal 400.

Hence, referring to the example indicated by the reference number 27100 shown in FIG. 27, as mentioned in the foregoing description, the controller 180 displays a preview image 1100 on the touchscreen 151 and can also display a first counterpart indicator 1210, a second counterpart indicator 1230 and a third counterpart indicator 1250.

As mentioned in the foregoing description, assume that the mobile terminal 100 has established a preset prescribed communication (e.g., a short range communication such as Bluetooth, etc.) with each of the first counterpart terminal 200, the second counterpart terminal 300 and the third counterpart terminal 400. Further, assume that each of the first counterpart terminal 200 and the third counterpart terminal 400 currently runs a camera application.

Hence, assume that a camera preview image received in real time from the first counterpart terminal 200 or a thumbnail of the received camera preview image is displayed as the first counterpart indicator 1210. Further, assume that a camera preview image received in real time from the third counterpart terminal 400 or a thumbnail of the received camera preview image is displayed as the third counterpart indicator 1250. Further, a photo most recently taken in the second counterpart terminal 300 or a thumbnail of the most recently taken photo is received from the second counterpart terminal 300 and can be then displayed as the second counterpart indicator 1230. In particular, the second counterpart indicator 1230 can be displayed by being updated each time a new photo is taken in the second counterpart terminal 300.

It is assumed that although the mobile terminal 100 has established the prescribed communication with the second counterpart terminal 300, the second counterpart terminal 300 does not executed the camera application currently. Further, a fifth touch gesture may be performed on the first counterpart indicator 1210. For instance, the fifth touch gesture may be performed by touching the first counterpart indicator 1210 with the pointer on the touchscreen 151 and then dragging the pointer in a direction of a center part of the touchscreen 151 by maintaining the touch. This is just one example of the fifth touch gesture. Further, the fifth touch gesture is non-limited by the example.

If so, referring to the example indicated by the reference number 27200 shown in FIG. 27, the controller 180 can save a camera preview image, which is received from the first counterpart terminal 200 at the timing point of performing the fifth touch gesture, as a photo image in the memory 160. In particular, in viewpoint of a user, it can be understood that the mobile terminal 100 takes a photo of the preview image of the first counterpart terminal 200. The controller 180 can display a thumbnail 1195 of the saved photo image on the touchscreen 151.

When the preview image of the first counterpart terminal 200 is saved in the mobile terminal 100, the preview image may be saved in the first counterpart terminal 200 or may not. No matter whether the preview image saved in the first counterpart terminal 200, the controller 180 can send a control signal, which indicates that the preview image of the first counterpart terminal 200 is saved in the mobile terminal 100, to the first counterpart terminal 200. In response to the control signal, the first counterpart terminal 200 displays an indicator indicating that the preview image of the first counterpart terminal 200 is saved in the mobile terminal 100 in order to inform a corresponding counterpart that the preview image of the first counterpart terminal 200 is saved in the mobile terminal 100.

When the preview image of the first counterpart terminal 200 is saved in the mobile terminal 100, the preview image is sent from the first counterpart terminal 200 to the second counterpart terminal 300 and the third counterpart terminal 400 and can be then saved in each of the second counterpart terminal 300 and the third counterpart terminal 400. Further, since the preview image is not sent to the second counterpart terminal 300 and the third counterpart terminal 400, it may not be saved in each of the second counterpart terminal 300 and the third counterpart terminal 400.

According to the above description, a photo (i.e., a still image) is received from the first counterpart terminal 200 currently executing the camera application. In the following description, a process for receiving a video from the first counterpart terminal 200 currently executing the camera application is described in detail with reference to FIG. 27 as follows.

Referring to the example indicated by the reference number 27100 shown in FIG. 27, as mentioned in the foregoing description, the controller 180 displays a preview image 1100 on the touchscreen 151 and can also display a first counterpart indicator 1210, a second counterpart indicator 1230 and a third counterpart indicator 1250. As mentioned in the foregoing description, assume that the mobile terminal 100 has established a preset prescribed communication (e.g., a short range communication such as Bluetooth, etc.) with each of the first counterpart terminal 200, the second counterpart terminal 300 and the third counterpart terminal 400. Further, assume that each of the first counterpart terminal 200 and the third counterpart terminal 400 currently runs a camera application.

Further, a long touch can be performed on the first counterpart indicator 1210 before a fifth touch gesture is performed on the first counterpart indicator 1210. In response to the long touch to the first counterpart indicator 1210, the controller 180 receives a preview image from the first counterpart terminal 200 in real time and can then start to save the received preview image as a video. The controller 180 can send a control signal, which indicates that the preview image of the first counterpart terminal 200 is being saved as the video in real time in the mobile terminal 100, to the first counterpart terminal 200. In response to the control signal, the first counterpart terminal 200 displays an indicator indicating that the preview image of the first counterpart terminal 200 is being saved as the video in real time in the mobile terminal 100 in order to inform a corresponding counterpart that the preview image of the first counterpart terminal 200 is being saved as the video in the mobile terminal 100.

Subsequently, referring to the example indicated by the reference number 27100 shown in FIG. 27, a fifth touch gesture can be performed on the first counterpart indicator 1210. If so, referring to the example indicated by the reference number 27200 shown in FIG. 27, the controller 180 ends the reception of the preview image at the timing point of performing the fifth touch gesture and can save the preview image, which has been received between the long touch and the fifth touch gesture, as the video in the memory 160. As mentioned in the foregoing description, the video may or may not be saved in each of the first to third counterpart terminals.

According to the above description, a photo (i.e., a still image) or a video is received from the first counterpart terminal 200 currently executing the camera application. In the following description, a process for receiving a most recently taken photo from the second counterpart terminal 300 not executing the camera application currently is described in detail with reference to FIG. 28.

Figure 28:
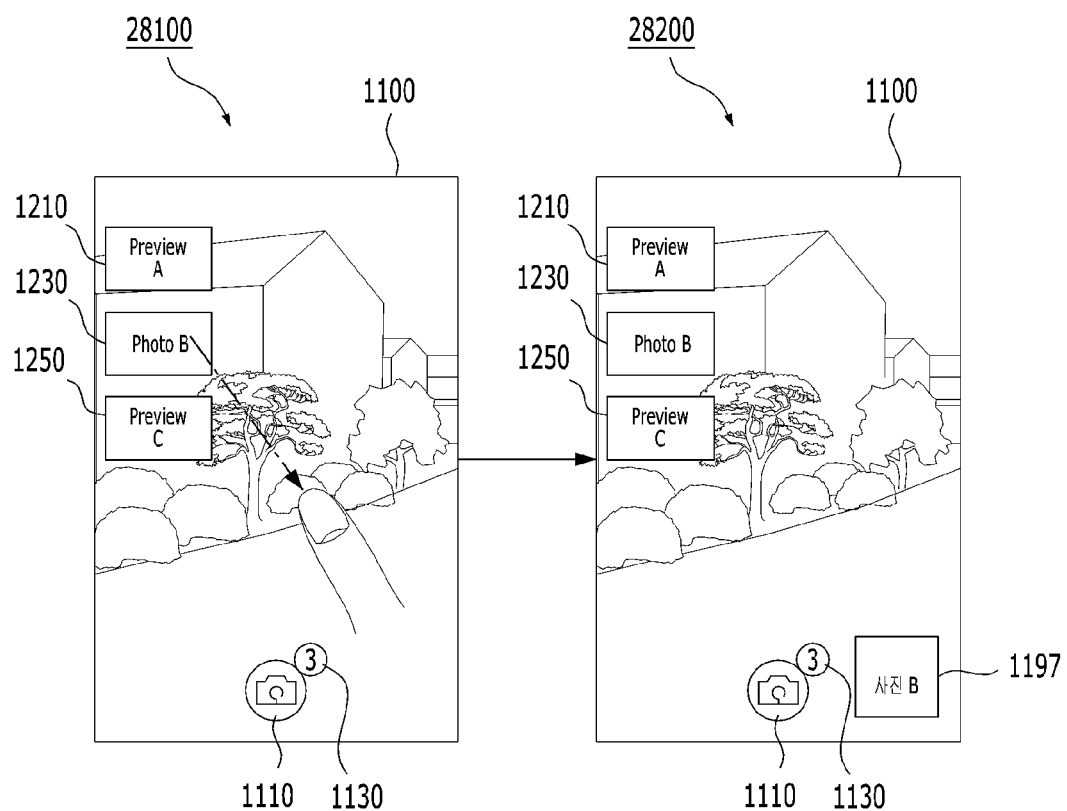
FIG. 28 is a display screen configuration illustrating a method of controlling a mobile terminal according to an embodiment of the present invention.

FIG. 28 is a display screen configuration illustrating a method of controlling a mobile terminal according to an embodiment of the present invention. Referring to the example indicated by the reference number 28100 shown in FIG. 28, when a preview image 1100 is displayed on the touchscreen 151 and a first counterpart terminal 200, a second counterpart terminal 300 and a third counterpart terminal 400 are also displayed on the touchscreen 151, a fifth touch gesture can be performed on the second counterpart indicator 1230.

If so, referring to the example indicated by the reference number 28200 shown in FIG. 28, the controller 180 can receive a most recently taken photo from the second counterpart terminal 300 at the timing point of performing the fifth touch gesture and can then save the received photo. Further, the controller 180 can display a thumbnail 1197 of the saved photo image on the touchscreen 151.

When the received photo is saved in the mobile terminal 100, the corresponding photo is sent from the second counterpart terminal 300 to the first counterpart terminal 200 and the third counterpart terminal 400 and can be then saved in each of the first counterpart terminal 200 and the third counterpart terminal 400. Further, since the corresponding photo is not sent to the first counterpart terminal 200 and the third counterpart terminal 400, it may not be saved in each of the first counterpart terminal 200 and the third counterpart terminal 400.

According to the above description, a most recently taken photo is received from the second counterpart terminal 300 not executing the camera application currently. In the following description, a process for receiving a most recently taken photo from the first counterpart terminal 200 executing (or not executing) a camera application currently is described in detail with reference to FIG. 29.

Figure 29:
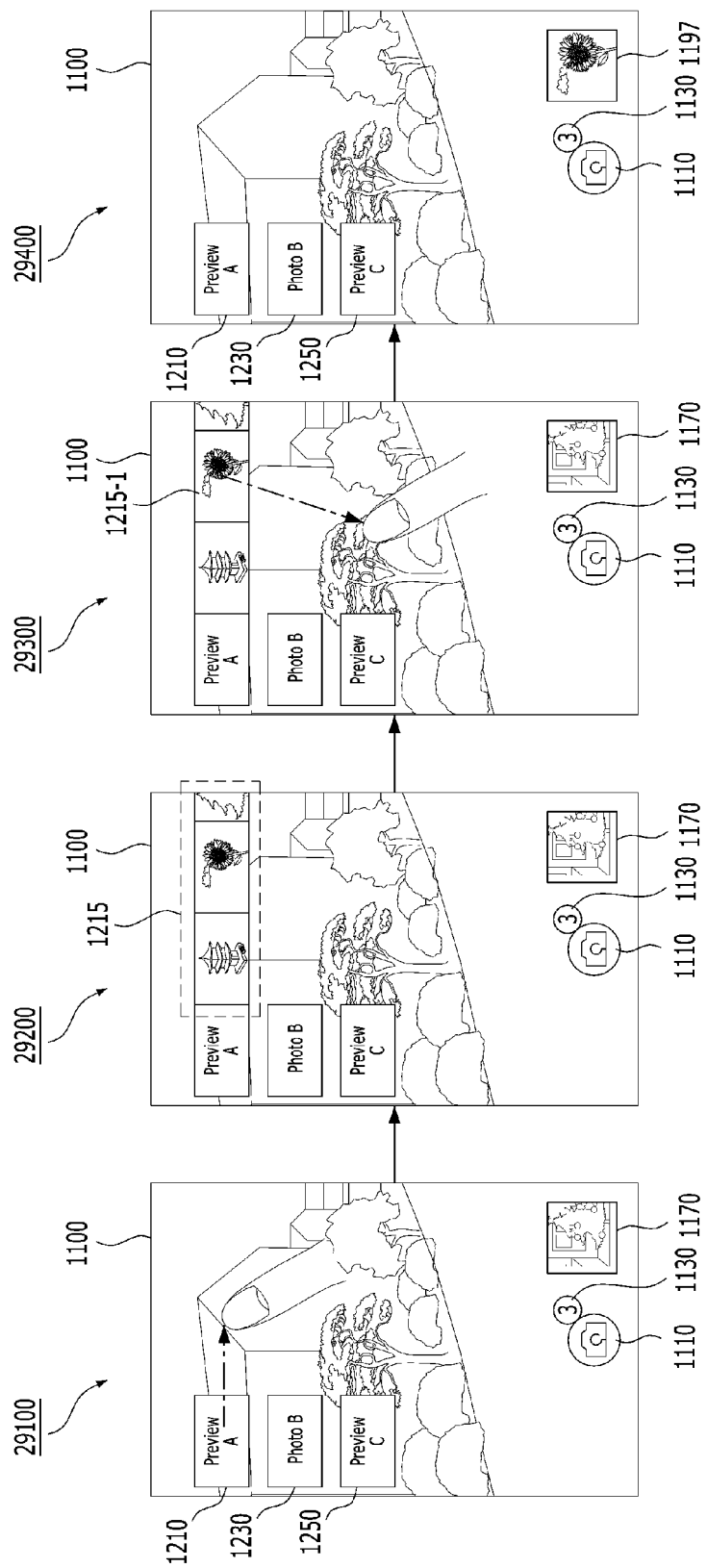
FIG. 29 is a display screen configuration illustrating a method of controlling a mobile terminal according to an embodiment of the present invention.

FIG. 29 is a display screen configuration illustrating a method of controlling a mobile terminal according to an embodiment of the present invention. Referring to the example indicated by the reference number 29100 shown in FIG. 29, when a preview image 1100 is displayed on the touchscreen 151 and a first counterpart terminal 200, a second counterpart terminal 300 and a third counterpart terminal 400 are also displayed on the touchscreen 151, a sixth touch gesture can be performed on the first counterpart indicator 1210.

For instance, the sixth touch gesture may be performed by touching the first counterpart indicator 1210 with a pointer on the touchscreen 151 and then dragging the pointer horizontally in a left-to-right direction by maintaining the touch, by which the sixth touch gesture is non-limited. In FIG. 29, 'horizontal' means a direction in parallel with a short side of the touch screen 151.

If so, referring to the example indicated by the reference number 29200 shown in FIG. 29, the controller 180 receives thumbnails 1215 of a prescribed number of recently taken photos from the first counterpart terminal 200 and can then display the received thumbnails 1215 on the touchscreen 151.

Subsequently, referring to the example indicated by the reference number 29300 shown in FIG. 29, a fifth touch gesture can be performed on a desired thumbnail 1215-1 among the displayed thumbnails 1215. If so, referring to the example indicated by the reference number 29400 shown in FIG. 29, the controller 180 receives a photo corresponding to the desired thumbnail 1215-1 from the first counterpart terminal 200 and can then save the received photo. Further, the controller 180 can display a thumbnail 1197 of the saved photo image on the touchscreen 151.

When the received photo is saved in the mobile terminal 100, the corresponding photo is sent from the first counterpart terminal 200 to the second counterpart terminal 300 and the third counterpart terminal 400 and can be then saved in each of the second counterpart terminal 300 and the third counterpart terminal 400. Further, since the corresponding photo is not sent to the second counterpart terminal 300 and the third counterpart terminal 400, it may not be saved in each of the second counterpart terminal 300 and the third counterpart terminal 400.

Also, if a sixth touch gesture is performed on the second counterpart indicator 1230, the controller 180 receives thumbnails of a prescribed number of recently taken photos from the second counterpart terminal 300 and can then display the thumbnails on the touchscreen 151. When a fifth touch gesture is performed on a desired one of the displayed thumbnails, the controller 180 receives a photo corresponding to the desired thumbnail from the second counterpart terminal 300 and can then save the received photo. This is apparent to those skilled in the art to which the present invention pertains and its details are omitted for clarity of the present specification.

Figure 30B:
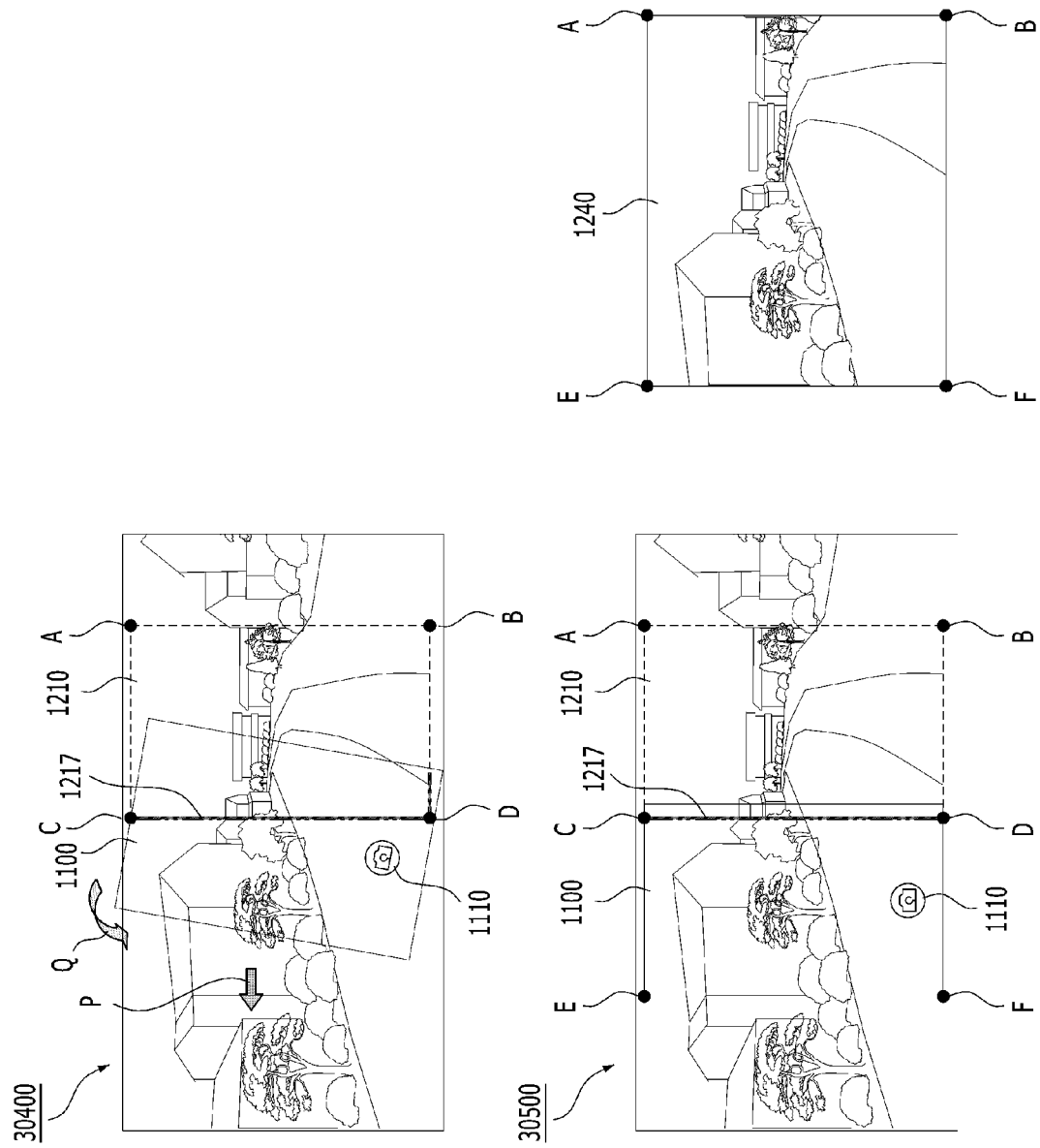

In the following description, a process for taking a panoramic image using a preview image of a first counterpart terminal 200 and a preview image of the mobile terminal 100 are explained in detail with reference to FIGS. 30A and 30B. In particular, FIGS. 30A and 30B are display screen configurations illustrating a method of controlling a mobile terminal according to an embodiment of the present invention. As mentioned in the foregoing description, the mobile terminal 100 is executing a camera application in a group camera mode and can be grouped with a first counterpart terminal 200, a second counterpart terminal 300 and a third counterpart terminal 400.

Hence, referring to the example indicated by the reference number 30100 shown in FIG. 30A, as mentioned in the foregoing description, the controller 180 displays a preview image 1100 on the touchscreen 151 and can also display a first counterpart indicator 1210, a second counterpart indicator 1230 and a third counterpart indicator 1250. As mentioned in the foregoing description, the first counterpart indicator 1210 may include a camera preview image 1210 received in real time from the first counterpart terminal 200 or a thumbnail of the received camera preview image 1210.

When the mobile terminal 100 receives the first counterpart indicator 1210, the mobile terminal 100 can further receive information (e.g., position and orientation information of the first counterpart terminal 200, a camera view angle information of the first counterpart terminal 200, etc.) for configuring a photographic composition in taking a photo through a camera of the first counterpart terminal 200. Hereinafter, such information are named a first counterpart camera information.

The controller 180 receives a first counterpart camera information from the first counterpart terminal 200, analyzes the received first counterpart camera information, and can then determine whether a panoramic image can be configured by combining the preview image 1100 of the mobile terminal 100 and the preview image 1210 of the first counterpart terminal 200 together.

As a result of the determination, if the panoramic image can be configured, in order to inform that the panoramic image can be configured, referring to the example indicated by the reference number 30100 shown in FIG. 30A, the controller 180 can create and display a first panorama indicator 1215 adjacent to the first counterpart indicator 1215. It is not necessary for the first panorama indicator 1215 to be displayed adjacent to the first counterpart indicator 1215. For instance, the first panorama indicator 1215 can be displayed on anywhere of the touchscreen 151. Moreover, the first panorama indicator 1215 may not be displayed.

Further, a fifth touch gesture can be performed on the first counterpart indicator 1210. If so, referring to the example indicated by the reference number 30200 shown in FIG. 30A, the controller 180 receives a preview image 1210 at the timing point of performing the fifth touch gesture from the first counterpart terminal 200, creates a panoramic image 1240 by synthesizing the received preview image 1210 with the preview image 1100 of the mobile terminal 100, and can then save the created panoramic image 1240 in the memory 160.

Alternatively, if the fifth touch gesture is performed on the first counterpart indicator 1210, referring to the example indicated by the reference number 30300 shown in FIG. 30A, the controller 180 can display a popup window 1219, which is provided to query whether to synthesize a panoramic image, on the touchscreen 151.

If a user desires to synthesize a panoramic image through the popup window 1219 (e.g., if an icon 'yes' 1219-1 in the popup window 1219 is touched), the controller 180 receives a preview image 1210 at the timing point of touching the icon 'yes' 1219-1 from the first counterpart terminal 200, creates a panoramic image 1240 by synthesizing the received preview image 1210 with the preview image 1100 of the mobile terminal 100, and can then save the created panoramic image 1240 in the memory 160.

As mentioned in the foregoing description, when the panoramic image 1240 is saved in the memory 160, the panoramic image 1240 is sent to the first counterpart terminal 200, the second counterpart terminal 300 and the third counterpart terminal 400 and can be then saved in each of the first counterpart terminal 200, the second counterpart terminal 300 and the third counterpart terminal 400. Further, since the panoramic image 1240 is not sent to the first counterpart terminal 200, the second counterpart terminal 300 and the third counterpart terminal 400, it may not be saved in each of the first counterpart terminal 200, the second counterpart terminal 300 and the third counterpart terminal 400.

A process for taking the panoramic image in the mobile terminal 100 are described in further detail with reference to FIG. 30B as follows. For clarity of illustration in FIG. 30B, the first counterpart indicator 1210, the second counterpart indicator 1230, the third counterpart indicator 1250 and the first panorama indicator 1215 are omitted from the drawing. Referring to the example indicated by the reference number 30400 shown in FIG. 34, the preview image 1100 (hereinafter named an intra preview image) of the camera 121 of the mobile terminal 100 can be displayed on the touchscreen 151.

Further, as mentioned in the foregoing description, if it can configure the panoramic image using the preview image 1210 (hereinafter named a counterpart preview image) of the first counterpart terminal 200, the controller 180 can display a counterpart preview image guide 1217 indicating a composition of the counterpart preview image 1210 on the intra preview image 1100. In this instance, assume that the counterpart preview image 1210 corresponds to a rectangle having 4 vertexes set to points A, B, C and D. Further, the counterpart preview image guide 1217 may be displayed on the preview image 1100 together with or instead of the first panorama indicator 1215. In this instance, assume that the counterpart preview image 1210 corresponds to the rectangle having 4 vertexes set to points A, B, C and D.

Hence, when a user of the mobile terminal 100 photographs the panoramic image while watching the intra preview image 1100 and the counterpart preview image guide 1217, the user can check whether the intra preview image 1100 is correctly aligned with the counterpart preview image 1210.

For instance, referring to the example indicated by the reference number 30400 shown in FIG. 30B, if the intra preview image 1100 is not correctly aligned with the counterpart preview image 1210, the user can shift the mobile terminal 100 in a direction P by rotating the mobile terminal 100 in a direction Q. If so, referring to the example indicated by the reference number 30500 shown in FIG. 30B, the intra preview image 1100 can be correctly aligned with the counterpart preview image 1210. A user can be aware of the correct alignment by referring to the counterpart preview image guide 1217 displayed on the intra preview image 1100 shown in the drawing indicated by the reference number 30500 shown in FIG. 30B.

Further, a fifth touch gesture can be performed on the touchscreen 151. If so, the controller 180 can create the panoramic image 1240 corresponding to a rectangle having 4 vertexes set to points A, B, E and F by synthesizing the intra preview image 1100 and the counterpart preview image 1210 with each other.

Figure 31:
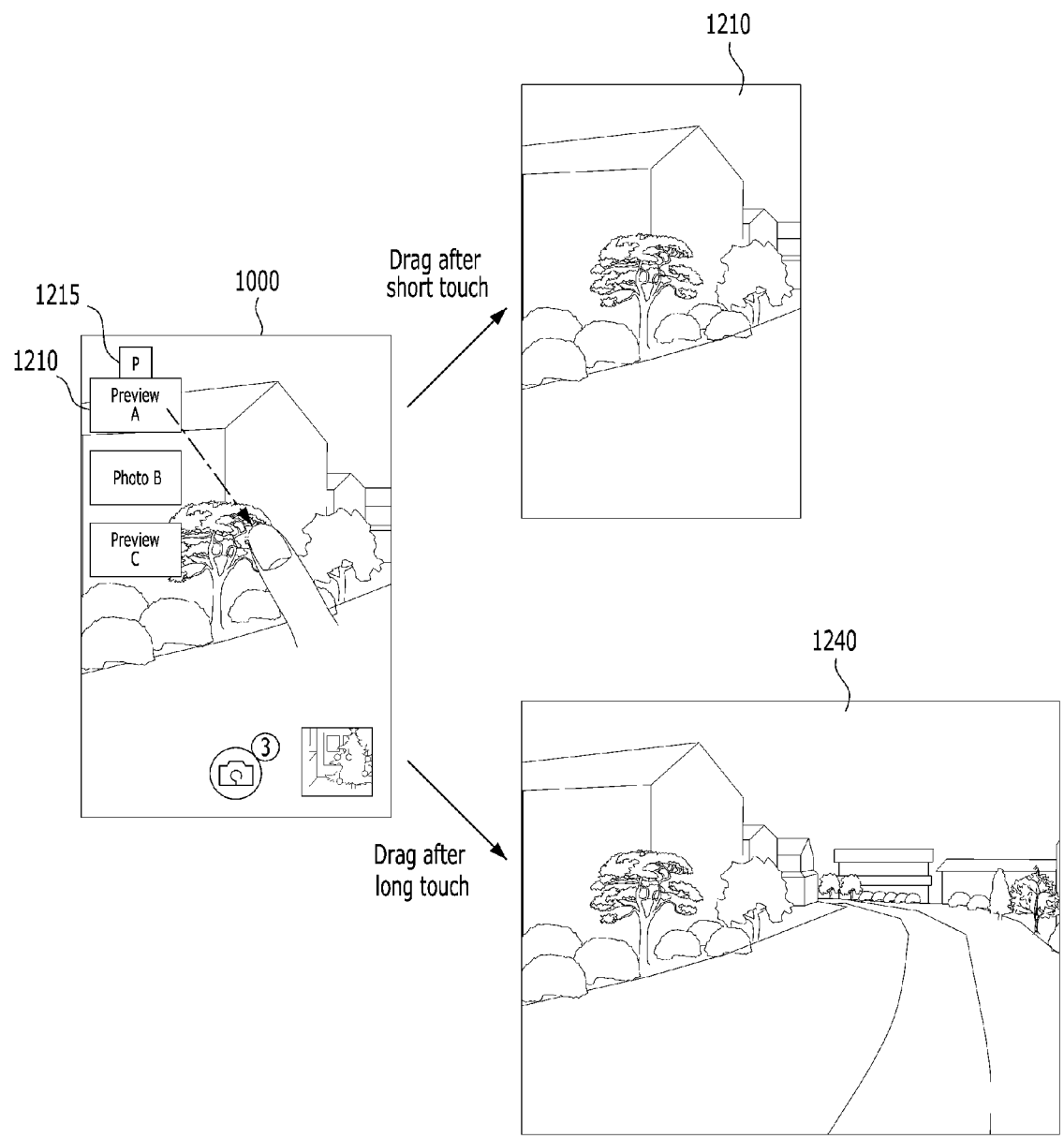
FIG. 31 is a display screen configuration illustrating a method of controlling a mobile terminal according to an embodiment of the present invention.

In the following description, a different method of photographing a panoramic image using a preview image of a first counterpart terminal 200 and a preview image of the mobile terminal 100 is explained in detail with reference to FIG. 31. FIG. 31 is a display screen configuration illustrating a method of controlling a mobile terminal according to an embodiment of the present invention.

As mentioned in the foregoing description, the controller 180 displays a preview image 1100 on the touchscreen 151 and can also display a first counterpart indicator 1210, a second counterpart indicator 1230 and a third counterpart indicator 1250. If a panoramic image can be configured by combining a preview image of a first counterpart terminal 200 and the preview image 1100 of the mobile terminal 100 together, as mentioned in the foregoing description, a first panorama indicator 1215 can be displayed adjacent to the first counterpart indicator 121.

A seventh touch gesture may be performed on the first counterpart indicator 1210. For instance, the seventh touch gesture may be performed by touching the first counterpart indicator 1210 with a pointer and then dragging the pointer to a center part of the touchscreen 151 before an elapse of a prescribed time from a timing point of the touch by maintaining the touch, by which the seventh touch gesture is non-limited. If so, in response to the seventh touch gesture, the controller 180 can save a camera preview image, which is received from the first counterpart terminal 200 at the timing point of performing the seventh touch gesture, as a photo image in the memory 160.

An eighth touch gesture may be performed on the first counterpart indicator 1210. For instance, the eighth touch gesture may be performed by touching the first counterpart indicator 1210 with a pointer and then dragging the pointer to a center part of the touchscreen 151 after an elapse of a prescribed time from a timing point of the touch by maintaining the touch, by which the eighth touch gesture is non-limited.

If so, the controller 180 receives a preview image 1210 at the timing point of performing the eighth touch gesture from the first counterpart terminal 200, creates a panoramic image 1240 by synthesizing the received preview image 1210 with the preview image 1100 of the mobile terminal 100, and can then save the created panoramic image 1240 in the memory 160.

Figure 32:
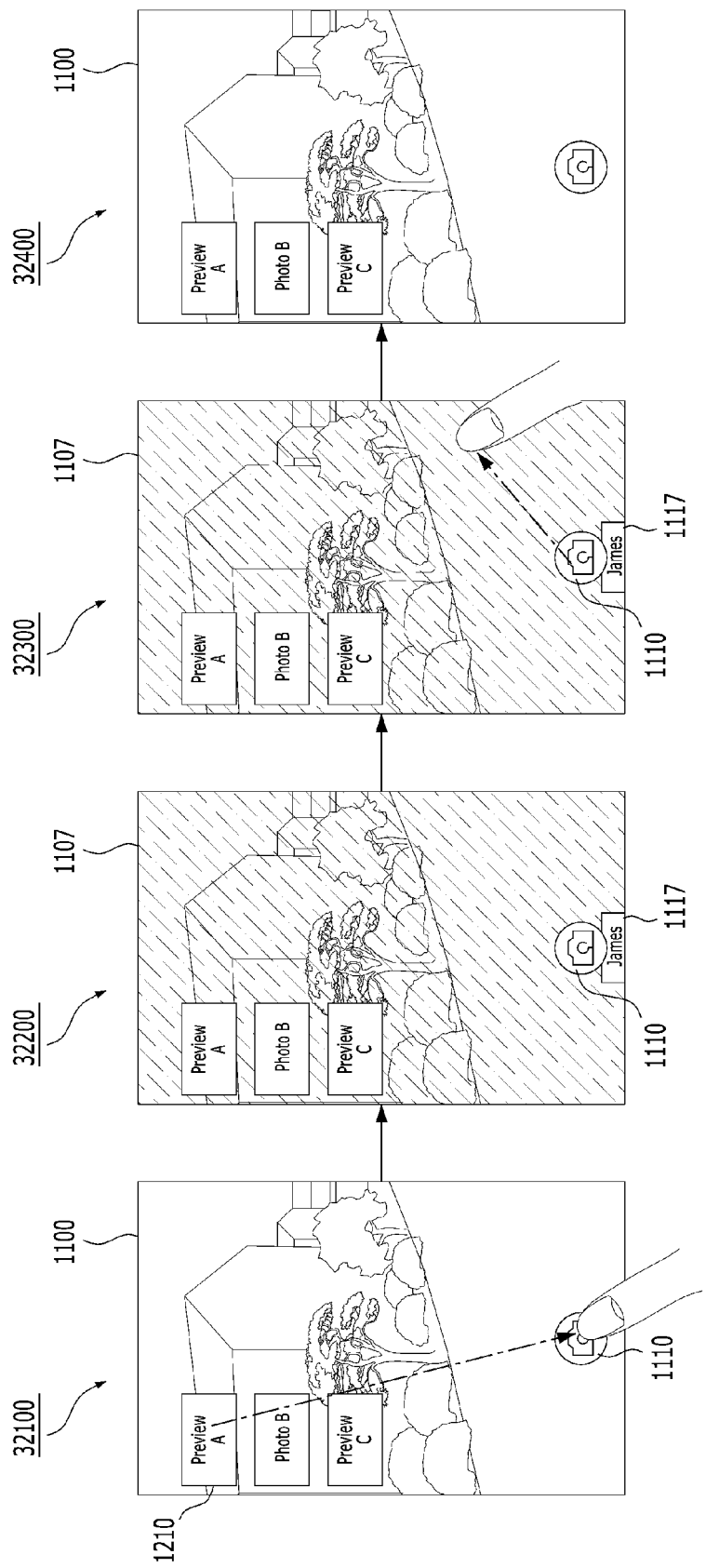
FIG. 32 is a display screen configuration illustrating a method of controlling a mobile terminal according to an embodiment of the present invention.

A process for receiving a camera setting information from a counterpart terminal and then applying the received camera setting information to the mobile terminal 100 is described in detail with reference to FIG. 32 as follows. FIG. 32 is a display screen configuration illustrating a method of controlling a mobile terminal according to an embodiment of the present invention.

Referring to the example indicated by the reference number 32100 shown in FIG. 32, as mentioned in the foregoing description, the controller 180 displays a preview image 1100 on the touchscreen 151 and can also display a first counterpart indicator 1210, a second counterpart indicator 1230 and a third counterpart indicator 1250. For clarity of the following description, the preview image 1100 are named a first preview image.

Further, a ninth touch gesture may be performed on the touchscreen 151. For instance, the ninth touch gesture may be performed by touching the first counterpart indicator 1210 with a pointer and then dragging the pointer to a photo taking icon 1110 by maintaining the touch, by which the ninth touch gesture is non-limited. If so, the controller 180 can receive a camera setting information of the first counterpart terminal 200 from the first counterpart terminal 200. Subsequently, the controller 180 can set the camera 121 of the mobile terminal 100 in accordance with the received camera setting information.

Subsequently, referring to the example indicated by the reference number 32200 shown in FIG. 32, the controller 180 can display a second preview image 1107 by changing the first preview image 1100 into the second preview image 1107 in accordance with the received camera setting information. In this instance, the second preview image 1107 can be distinguished from the first preview image 1100 in aspect of an image quality or effect in which the camera setting information is reflected.

The controller 180 can display an indicator 1117, which indicates that the camera 121 of the mobile terminal 100 is set in accordance with the camera setting information of the first counterpart terminal 200, adjacent to a photo taking icon 1110. The indicator 1117 can be displayed on anywhere of the touchscreen 151. Moreover, the indicator 1117 may not be displayed.

Also, if a simple touch is applied to the photo taking icon 1110, the controller 180 takes a photo according to the second preview image 1107 in accordance with the received camera setting information, and can then save the taken photo. Meanwhile, while the second preview image 1107 is displayed on the touchscreen 151, referring to the example indicated by the reference number 32300 shown in FIG. 32, a tenth touch gesture may be performed on the touchscreen 151.

For example, the tenth touch gesture may be performed by touching photo taking icon 1110 with a pointer and then dragging the pointer to a random location on the preview image 1107 by maintaining the touch, by which the tenth touch gesture is non-limited. If so, the controller 180 can control the camera 121, which is set in accordance with the received camera setting information, of the mobile terminal 100 to return to an original setting information of the camera of the mobile terminal 100. Subsequently, referring to the example indicated by the reference number 32400 shown in FIG. 32, the controller 180 can control the second preview image 1107 to return to the first preview image 1100 in accordance with the received camera setting information.

Figure 33:
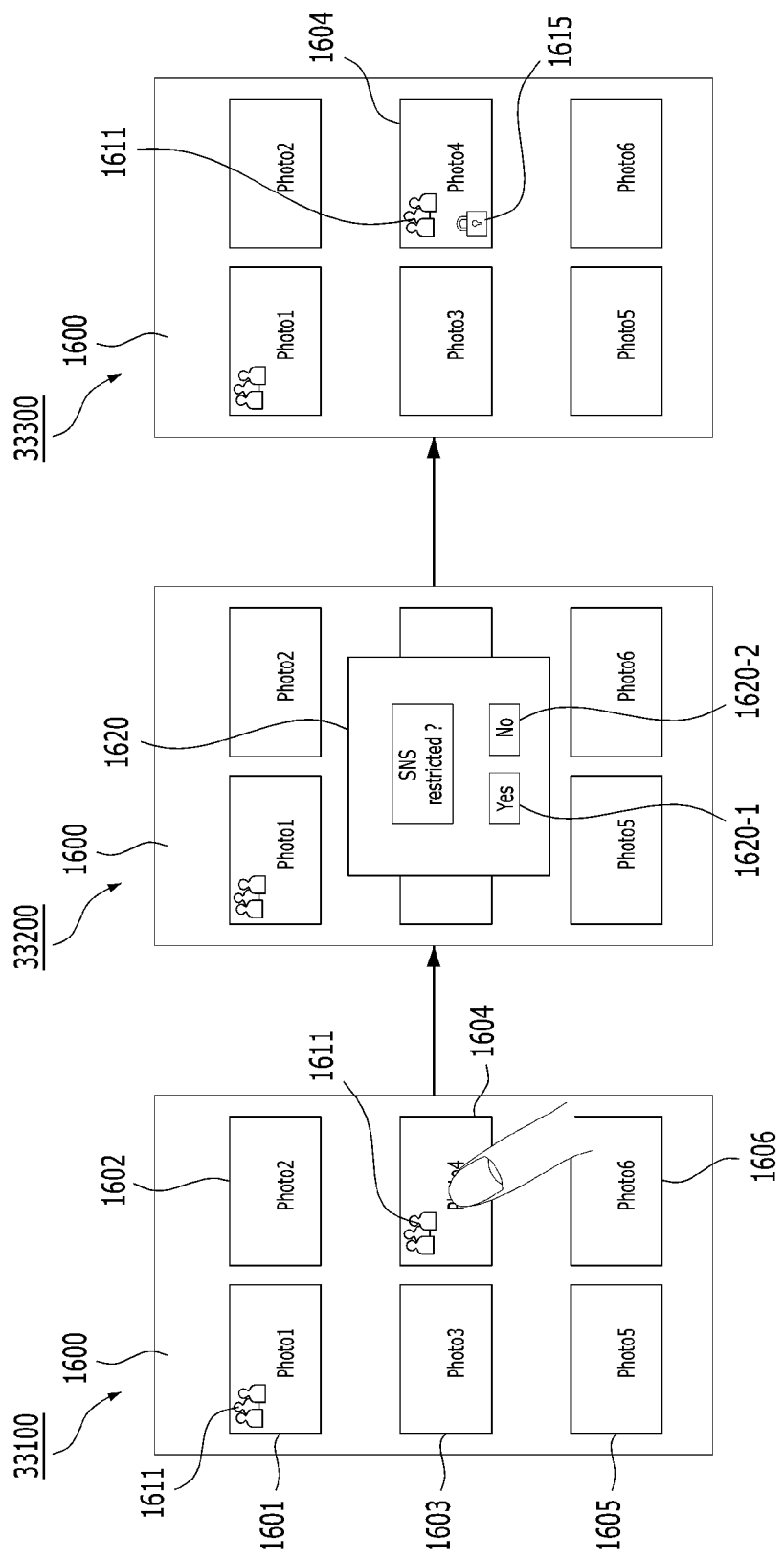
FIG. 33 is a display screen configuration illustrating a method of controlling a mobile terminal according to an embodiment of the present invention.

In the following description, a method of executing a gallery application in the mobile terminal 100 is described in detail with reference to FIG. 33. FIG. 33 is a display screen configuration illustrating a method of controlling a mobile terminal according to an embodiment of the present invention.

Referring to the example indicated by the reference number 33100 shown in FIG. 33, a gallery application is executed in the mobile terminal 100 and a executing screen of the gallery application can be displayed on the touchscreen 151. In this instance, the gallery application may include an application for displaying a photo (e.g., a still image), a captured image and a video saved in the mobile terminal 100. Also, when a home screen is displayed on the touchscreen 151 of the mobile terminal 100, a gallery application icon for executing the gallery application can be displayed on the home screen. If the gallery application icon is touched and selected, the gallery application can be executed in the mobile terminal 100.

According to the example indicated by the reference number 33100 shown in FIG. 33, thumbnails 1601 to 1606 of first to sixth images are displayed on the gallery allocation screen 1600. On a thumbnail (e.g., first image thumbnail 1601, fourth image thumbnail 1604) of an image taken in a group camera mode, a group indicator 1611 indicating that the corresponding image is taken in the group camera mode can be displayed.

For instance, an eleventh touch gesture can be performed on the fourth image thumbnail 1604. In this instance, the eleventh touch gesture may include a double touch applied to the fourth image thumbnail 1604. This is just one example of the eleventh touch gesture only, by which the eleventh touch gesture is non-limited.

If so, the controller 180 can display a popup window 1620, which queries whether to restrict the fourth image from being SNS uploaded by another counterpart terminal, on the touchscreen 151. If it is desired to restrict the corresponding image from being SNS uploaded by another counterpart terminal through the popup window 1219 (e.g., if an icon 'yes' 1620-1 in the popup window 1620 is touched), the controller 180 can deliver an information, which indicates that the fourth image is restricted from being SNS uploaded, to all the grouped counterpart terminals. Subsequently, referring to the example indicated by the reference number 33300 shown in FIG. 33, the controller 180 can display an SNS restriction icon 1615, which indicates that the SNS upload is restricted, together with the fourth image thumbnail 1604.

The restriction from SNS uploading a photo taken in the group camera mode may be identically applicable to other counterpart terminals. In particular, any one of the grouped counterpart terminals can be restricted from SNS uploading the photo taken in the group camera mode. Hence, according to the description with reference to FIG. 33, the fourth image is restricted from being SNS uploaded in the mobile terminal 100. Yet, the fourth image may be restricted by another counterpart terminal from being SNS uploaded. In this instance, the mobile terminal 100 receives an information, which indicates that the SNS upload of the fourth image is restricted, from another counterpart terminal and can control the SNS restriction icon 1615 to be displayed on the thumbnail 1604 of the fourth image. When the SNS upload of the fourth image is restricted by another counterpart terminal, an identifier of the corresponding counterpart terminal restricting the SNS upload can be displayed together with the thumbnail of the fourth image.

Figure 34:
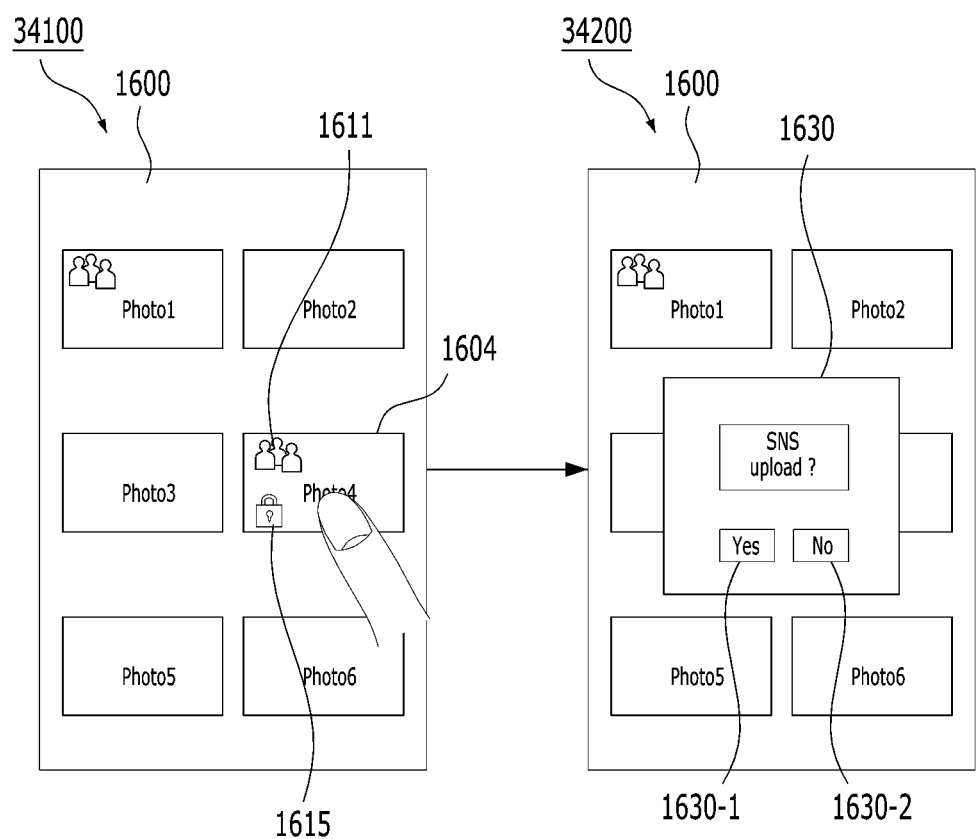

In the following description, a process for uploading the fourth image, of which SNS upload is restricted, is explained in detail with reference to FIGS. 34 and 35. FIGS. 34 and 35 are display screen configurations illustrating a method of controlling a mobile terminal according to an embodiment of the present invention. Referring to the example indicated by the reference number 34100 shown in FIG. 34, the gallery application screen 1600 can be displayed on the touchscreen 151.

Further, the thumbnail 1604 of the SNS upload restricted fourth image can be displayed on the gallery application screen 1600. Assume that the SNS upload of the fourth image is restricted by each of the first counterpart terminal and the third counterpart only among the first to third counterpart terminals. If a user of the mobile terminal 100 desires to SNS upload the fourth image, it does not matter whether the SNS upload of the fourth image is restricted by the mobile terminal 100.

A twelfth touch gesture can be performed on the fourth image thumbnail 1604. For instance, the twelfth touch gesture may include a long touch applied to the fourth image thumbnail 1604. This is just one example of the twelfth touch gesture only, by which the twelfth touch gesture is non-limited.

If so, referring to the example indicated by the reference number 34200 shown in FIG. 34, the controller 180 can display a popup window 1630, which queries whether the fourth image is desired to be SNS uploaded, on the touchscreen 100. For instance, it can request the fourth image to be SNS uploaded by touching an icon 'yes' 1630-1 in the popup window 1630.

If so, referring to FIG. 35, the controller 180 can send a message 1640, which queries whether to agree to the SNS upload of the fourth image, to the first counterpart terminal 200 and the third counterpart terminal 300. If the mobile terminal 100 receives a reply, which agrees to the SNS upload of the fourth image, from each of the first counterpart terminal 200 and the third counterpart terminal 300 in response to the message 1640, the controller 180 can upload the fourth image to the SNS.

A method of deleting a photo taken in a group camera mode is described in detail with reference to FIG. 36 as follows. FIG. 36 is a display screen configuration illustrating a method of controlling a mobile terminal according to an embodiment of the present invention.

Referring to the example indicated by the reference number 36100 shown in FIG. 36, a preview image 1100 is displayed on the touchscreen 151. Further, a thumbnail 1190 of a photo most recently taken in a group camera mode can be displayed on the preview image 1100. Assume that the taken photo is saved and also sent to the first counterpart terminal 200, the second counterpart terminal 300 and the third counterpart terminal 400.

Further, a thirteenth touch gesture can be performed on the touchscreen 151. For instance, the thirteenth touch gesture 1190 may include a long touch applied to the thumbnail 1190. If so, referring to the example indicated by the reference number 36200 shown in FIG. 36, the controller 180 can display a popup window 1650, which is provided to delete the most recently taken photo, on the touchscreen 151.

On the popup window 1650, a first menu 1651 for deleting the captured image from the mobile terminal 100 only, a second menu 1653 for deleting the captured image from the first to third counterpart terminals only, and a third menu 1655 for deleting the taken photo from all of the mobile terminal and the first to third counterpart terminals can be displayed. It is not necessary for all the first to third menus to be displayed on the popup window 1650.At least one of the first to third menus can be displayed on the popup window 1650.

If the first menu 1651 is touched and selected from the popup window 1650, the controller 180 can delete the most recently taken photo from the memory 160. If the second menu 1653 is touched and selected from the popup window 1650, the controller 180 can transmit a control signal, which requests to delete the most recently taken photo, to the first to third counterpart terminals. In response to the control signal, each of the first to third counterpart terminals can delete the most recently taken photo automatically or under the permission of a counterpart.

If the third menu 1655 is touched and selected from the popup window 1650, the controller 180 deletes the most recently taken photo from the memory 160 and can also transmit a control signal, which requests to delete the most recently taken photo, to the first to third counterpart terminals. According to the above example, if the thirteenth touch gesture is performed on the touchscreen 151, all of the first to third menus are displayed on the popup window 1650, by which an embodiment of the present invention is non-limited. For instance, if a timing point of performing the thirteenth touch gesture is before an elapse of a prescribed time from the photographed timing point of the most recently taken photo, all of the first to third menus are displayed on the popup window 1650. In another instance, if a timing point of performing the thirteenth touch gesture is after an elapse of a prescribed time from the photographed timing point of the most recently taken photo, only the first menu can be displayed on the popup window 1650. So far, the first to thirteenth touch gestures are described. These touch gestures may not differ from each other. In some cases, these touch gestures may be identical to each other.

Accordingly, a mobile terminal and controlling method thereof according to embodiments of the present invention provide the following advantages. According to at least one of embodiments of the present invention, if a photo is photographed in a mobile terminal, it is advantageous in that a photographed image (e.g., a still image, a video, etc.) can be shared with a preset counterpart terminal conveniently and promptly. Moreover, it is also advantageous in that an image photographed in the counterpart terminal and a camera preview image of the counterpart terminal can be shared with the mobile terminal conveniently and promptly.

Further, it is advantageous in that a counterpart terminal desired to share a photo with a mobile terminal can be selected conveniently and promptly. Also, it is advantageous in that a panoramic image can be synthesized conveniently and promptly using a camera preview image of a mobile terminal and a camera preview image of a counterpart terminal. In addition, it is advantageous in that a camera setting of a mobile terminal can be performed conveniently and promptly using a camera setting information of a counterpart terminal.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a touchscreen;
a camera;
a memory;
a wireless communication unit; and
a controller configured to:
display a preview image input through the camera on the touchscreen,
capture the preview image and execute a voice recognition function, in response to a first touch gesture performed on the touchscreen, and
control the wireless communication unit to transmit the captured image to at least one counterpart terminal found through the voice recognition function in accordance with a voice input, in response to a release of the first touch gesture from the touchscreen,
wherein if at least two counterpart terminals are found for a same voice input, the controller is configured to display the found at least two counterpart terminals on the touchscreen and control the wireless communication unit to transmit the captured image to the counterpart terminal selected by an additional touch gesture from the displayed at least two counterpart terminals.

2. The mobile terminal of claim 1, wherein the controller is further configured to save the captured image in the memory in response to transmitting the captured image to the at least one counterpart terminal.

3. The mobile terminal of claim 2, wherein the controller is configured to transmit a control signal for deleting the transmitted image to the at least one counterpart terminal, in response to a second touch gesture being performed on the touchscreen.

4. The mobile terminal of claim 3, wherein the controller is configured to delete the captured image from the memory, in response to the control signal being transmitted to the counterpart terminal.

5. The mobile terminal of claim 1, wherein the controller is further configured to display at least one counterpart indicator indicating the at least one counterpart terminal corresponding to the voice input on the touchscreen together with the preview image.

6. The mobile terminal of claim 5, wherein the at least one counterpart indicator comprises a first counterpart indicator, and
wherein the first counterpart indicator comprises a camera preview image received from a first counterpart terminal corresponding to the first counterpart indicator.

7. The mobile terminal of claim 5, wherein the at least one counterpart indicator comprises a second counterpart indicator, and
wherein the second counterpart indicator comprises an image most recently taken through a second counterpart terminal corresponding to the second counterpart indicator.

8. The mobile terminal of claim 6, wherein the controller is configured to receive the camera preview image in real time from the first counterpart terminal and then display the received camera preview image as the first counterpart indicator.

9. The mobile terminal of claim 8, wherein the controller is configured to save the camera preview image received in real time from the first counterpart terminal as a still image or a video in the memory in response to a second touch gesture performed on the touchscreen.

10. The mobile terminal of claim 8, wherein the controller is configured to synthesize a panoramic image using camera preview image received from the first counterpart terminal and the preview image of the camera.

11. The mobile terminal of claim 9, wherein the controller is configured to receive a plurality of images taken through the first counterpart terminal and then display a plurality of the received images on the touchscreen, in response to a third touch gesture performed on the touchscreen.

12. The mobile terminal of claim 11, wherein the controller is configured to, in response to selection of a desired one of a plurality of the images, save the selected image in the memory.

13. The mobile terminal of claim 1, wherein the controller is configured to:
display a popup window for inputting a voice memo on the touchscreen, and
control the wireless communication unit to transmit the input voice memo to the at least one counterpart terminal together with the captured image.

14. The mobile terminal of claim 1, wherein if no counterpart terminal is found in response to the voice input, the controller is configured to control a phone number of a desired counterpart terminal to be input as a voice.

15. A mobile terminal comprising:
a touchscreen;
a camera;
a memory;
a wireless communication unit; and
a controller configured to:
display a preview image input through the camera on the touchscreen,
capture the preview image and execute a voice recognition function, in response to a first touch gesture performed on the touchscreen, and
control the wireless communication unit to transmit the captured image to at least one counterpart terminal found through the voice recognition function in accordance with a voice input, in response to a release of the first touch gesture from the touchscreen,
wherein after a first counterpart terminal has been found in accordance with a first voice, the controller is configured to control a second counterpart terminal to be additionally found in accordance with a second voice.

16. The mobile terminal of claim 15, wherein the controller is configured to cancel the search for the second counterpart terminal, in response to a second touch gesture being performed after the first touch gesture.

17. A mobile terminal comprising:
a touchscreen;
a camera;
a memory;
a wireless communication unit; and
a controller configured to:
display a preview image input through the camera on the touchscreen,
capture the preview image and execute a voice recognition function, in response to a first touch gesture performed on the touchscreen, and
control the wireless communication unit to transmit the captured image to at least one counterpart terminal found through the voice recognition function in accordance with a voice input, in response to a release of the first touch gesture from the touchscreen,
wherein the controller is further configured to receive a camera setting information from a prescribed one of the at least one counterpart terminal and control the camera to be set in accordance with the received camera setting information, in response to a second touch gesture performed on the touchscreen.

18. The mobile terminal of claim 17, wherein as the camera is set in accordance with the camera setting information, the controller is configured to change an image quality or effect of the preview image to be changed.

19. A method of controlling a mobile terminal, comprising:
displaying a preview image input through a camera on a touchscreen;
capturing the preview image and executing a voice recognition function in response to a first touch gesture performed on the touchscreen; and
transmitting the captured image to at least one counterpart terminal found through the voice recognition function in accordance with a voice input in response to a release of the first touch gesture from the touchscreen,
wherein the transmitting comprises:
if at least two counterpart terminals are found for a same voice input, displaying the found at least two counterpart terminals on the touchscreen and transmitting the captured image to the counterpart terminal selected by an additional touch gesture from the displayed at least two counterpart terminals.

* * * * *